United States Patent [19]

Potter et al.

[11] Patent Number: 5,546,575

[45] Date of Patent: Aug. 13, 1996

[54] ENCODING METHOD FOR COMPRESSING A TABULAR DATABASE BY SELECTING EFFECTIVE COMPRESSION ROUTINES FOR EACH FIELD AND STRUCTURE OF PARTITIONS OF EQUAL SIZED RECORDS

[75] Inventors: Basil E. Potter; Marc A. Potter, both of Diamond Bar, Calif.

[73] Assignee: Basil E. Potter & Associates, Inc., Diamond Bar, Calif.

[21] Appl. No.: 247,691

[22] Filed: May 23, 1994

[51] Int. Cl.$^6$ ............................. G06F 17/30; H03M 7/30; H03M 7/42

[52] U.S. Cl. ................ 395/600; 364/715.02; 364/224.1; 364/224.2; 364/246.3; 364/260.6; 364/282.1; 364/282.4; 364/283.1; 364/283.4; 364/284.4; 341/64; 341/67

[58] Field of Search ............................. 395/600; 341/50, 34164, 65, 67; 364/974.6, 715.02, 224.1, 224.2, 246.3, 260.4, 260.6, 255.7, 282.1, 282.4, 283.1, 283.4, 284.4

[56] References Cited

U.S. PATENT DOCUMENTS

| | | | |
|---|---|---|---|
| 3,656,178 | 4/1972 | De Maine et al. | 395/375 |
| 4,782,325 | 11/1988 | Jeppsson et al. | 341/55 |
| 4,803,651 | 2/1989 | Galkowski | 395/500 |
| 4,814,746 | 3/1989 | Miller et al. | 341/95 |
| 4,849,878 | 7/1989 | Roy | 395/600 |
| 4,875,155 | 10/1989 | Iskiyan et al. | 395/425 |
| 4,955,066 | 9/1990 | Notenboom | 382/56 |
| 5,179,711 | 1/1993 | Vreeland | 395/775 |
| 5,280,600 | 1/1994 | Van Maren et al. | 395/425 |
| 5,333,313 | 10/1994 | Helsing | 395/600 |
| 5,339,411 | 9/1994 | Heaton, Jr. | 395/600 |

OTHER PUBLICATIONS

Graffe & Shapiro, "Data Compression And Database Performance", Applied Computing Symposium, pp. 22–27, 1991, IEEE.

"Space and Time Savings Through Large Data Base Compression and Dynamic Restructuring," P. Alsberg, Proceedings of the IEEE, vol. 63, No. 8, pp. 1114–1122, Aug. 1975.
*Computer Data–Base Organization*, Chapters 17–18 and 32, J. Martin, 1977 pp. 307–329 and 572.
"A Survey of Physical Database Design Methodology and Techniques," M. Schkolnick, Fourth International Conference On Very Large Data Bases, Sep. 13–15, 1978, pp. 474–487.
"Compression of Individual Sequences via Variable–Rate Coding," J. Ziv and A. Lempel, IEEE Transactions on Information Theory, vol. IT–24, No. 5, Sep. 1978 pp. 530–536.
"Efficient Access of Compressed Data," S. Eggers and A. Shoshani, Sixth International Conference on Very Large Data Bases, Oct. 1–3, 1980, pp. 205–211.
"Choices in Practical Data Design," W. Kent, Eighth International Conference on very Large Data Bases, Sep. 8–10, 1982, pp. 165–180.
"A Practitioner's Guide to Data Base Compression," D. Severance, Information Systems, vol. 8, No. 1, pp. 51–62, 1983.
*Data Base Management*, F. McFadden, J. Hoffer, Chapter 9, Implementation and Physical Design, 1985, pp. 303–315.
*Data Compression Techniques and Applications*, T. Lynch, Chapter 17, Data Base Compression, 1985, pp. 297–309.
*Advanced Database Techniques*, D. Martin, Chapter 3, Data Representation, Packing, and Protection, 1986, pp. 128–159.
"Transposition Algorithms on Very Large Compressed Databases," H. Wong and J. Li, Twelfth International Conference on Very Large Data Bases, Aug. 25–28, 1986 pp. 304–310.
"A New Compression Method With Fast Searching on Large Databases," J. Li, D. Rotem and H. Wong, Proceedings of the 13th VLDB Conference, 1987 pp. 311–317.
"Physical Database Design Aspects of Relational DBMS Implementations," F. Haberhauer, Information Systems, vol. 15, No. 3, pp. 375–389, 1990.

*Primary Examiner*—Thomas G. Black
*Assistant Examiner*—Jack M. Choules
*Attorney, Agent, or Firm*—Knobbe, Martens, Olson & Bear

[57] ABSTRACT

A method whereby a database storage structure is created by selectively applying one or more data compaction methods to fields of a database. A specific compaction method is applied to a field if the field data characteristics satisfy criteria for that compaction method. The compaction methods used are: single-field encoding, where codes are substituted for data values in a field; multiple-field combining, where a single code is substituted for data values from two or more fields; pattern suppression, where recurring character patterns within data values are removed; numeric substitution, where binary values are substituted for numeric character data; and text compression, where codes are substituted for words and phrases in a text field. These compaction methods create compacted records which are reduced storage equivalents of the database records. Translation tables and auxiliary tables created by the compaction methods allow the compacted data to be retranslated into a user-readable format. The compacted records are grouped into storage partitions, each containing compacted records of the same length, to form a database image. The database image advantageously resides in a computer system's mass storage while the translation and auxiliary tables advantageously reside in the computer system's fast access memory. Along with an accessing subsystem, the database image and tables function as a reduced storage equivalent of the original database.

85 Claims, 73 Drawing Sheets

FIG. 1A

| EMPLOYEE INFO | | | | | | | | | | | |
|---|---|---|---|---|---|---|---|---|---|---|---|
| LAST NAME | FIRST NAME | MI | SSN | BLOCK NO. | STREET NAME | TYPE | ZIP CODE | CITY | SEX | DATE OF HIRE | EID |
| Benjamin | Arnold | | 123869261 | 310 | Wilart | PL | 91766 | Pomona | M | 07/02/93 | 10639 |
| Forsythe | William | | 655143972 | 4110 | Aliso | CL | 91750 | La Verne | M | 07/02/93 | 10007 |
| Grant | Grace | E | 342186371 | 13010 | Amar | RD | 91706 | Baldwin | F | 09/11/93 | 10640 |
| Winter | Marigold | | 123906453 | 11010 | Concert | ST | 91731 | El Monte | F | 10/08/93 | 10641 |
| Panter | Aaron | R | 123807772 | 12510 | 10TH | ST | 91710 | Chino | M | 10/09/93 | 10642 |
| Harrison | George | U | 203049008 | 110 | E 9TH | ST | 91702 | Azuza | M | 10/09/93 | 10643 |
| Kantor | Margorie | C | 123437631 | 3110 | Olinda | LN | 92804 | Anaheim | F | 01/06/94 | 3875 |
| Madison | Mary | | 203976998 | 210 | Birch | LN | 92621 | Brea | F | 01/06/94 | 10644 |

FIG. 1B

WORK_ORDER_INFO

| WO | WRK LOC | EQUIP / SERVICE | WRK DESCPT | ORDER DATE | SCHD DATE | COMPL DATE | DPT NUM |
|---|---|---|---|---|---|---|---|
| QR09823 | PMA | Radio console | Repair | 01/13/94 | 02/15/94 | 02/15/94 | 3 |
| LR09976 | PMA | Antenna, Fixed | Repair | 01/12/94 | 03/10/94 | | 3 |
| BC00011 | HQ | Mobile Antennas | Install | 01/12/94 | 02/15/94 | 02/28/94 | 3 |
| BC00010 | PMA | Control Console | Ship | 01/12/94 | 01/20/94 | | 3 |
| AR09988 | ALH | Trble Shtg Proc | Doc | 01/13/94 | 04/14/94 | | 5 |
| BC00009 | HQ | Radio Equip | Instl | 01/12/94 | 01/15/94 | 01/16/94 | 1 |
| BC00012 | LB | Radio Network | Design | 01/14/94 | 04/20/94 | | 1 |
| AR09989 | ALH | Manuals | Update | 01/16/94 | 05/01/94 | | 5 |
| BC00013 | HQ | FCC Compliance | Consult | 01/15/94 | 06/30/94 | | 2 |
| BR00015 | HQ | Console | MOD | 01/16/94 | 03/20/94 | | 2 |
| BC00014 | PMA | Facsimile | Ship | 01/16/94 | 01/20/94 | 01/20/94 | 4 |
| AR09990 | ALH | Radio Sys Doc | Doc | 02/15/94 | 05/15/94 | | 5 |
| AR09991 | ALH | Mainten Manuals | Doc | 02/14/94 | 06/10/94 | | 5 |
| QD09877 | PMA | Console | Repair | 02/15/94 | 04/20/94 | | 3 |
| BR00016 | HQ | Console | Instl | 02/14/94 | 03/15/94 | | 3 |

FIG. 1C

| EID_WRK_ASSGN | | |
|---|---|---|
| EID | WO | HRS |
| 10591 | BC00012 | 7.8 |
| 10643 | BC00014 | 5.2 |
| 10640 | BC00013 | 43.4 |
| 10569 | BC00011 | 6.2 |
| 8732 | BR00016 | 22.6 |
| 10641 | QR09823 | 2.7 |
| 10643 | LR09976 | 8.9 |
| 10444 | BC00009 | 1.6 |
| 10207 | BC00011 | 4.3 |
| 10639 | AR09987 | 21.8 |
| 10588 | BC00010 | 0.7 |
| 10641 | BC00011 | 37.3 |
| 10643 | BC00002 | 35.9 |
| 10639 | BC00010 | 18.2 |
| 10317 | BR00016 | 7.3 |
| 10597 | BC00012 | 1.8 |
| 7740 | BC00012 | 18.6 |
| 10644 | BR00015 | 40 |
| 10445 | BC00014 | 2.1 |
| 10607 | BC00013 | 5.1 |
| 10642 | BC00012 | 51.3 |
| 9738 | BC00009 | 32.3 |
| 10553 | BR00015 | 13.1 |
| 10359 | BR00015 | 2.5 |

FIG. 1D

| EID_ASSIGN | | | | | |
|---|---|---|---|---|---|
| EID | DPT NUM | WRK LOC | CLASS | ASSIGN DATE | CLASS DATE |
| 10639 | 3 | PMA | B-2 | 7/2/93 | 7/2/93 |
| 10002 | 5 | ALH | C-1 | 12/6/91 | 7/2/93 |
| 8793 | 3 | HQ | A-1 | 9/19/86 | 7/1/93 |
| 10370 | 1 | LB | A-4 | 1/16/93 | 8/1/93 |
| 10462 | 1 | HQ | C-1 | 3/10/93 | 8/15/93 |
| 10261 | 2 | HQ | B-1 | 10/7/92 | 9/15/93 |
| 10641 | 1 | HQ | C-2 | 10/8/93 | 10/8/93 |
| 10640 | 2 | HQ | A-2 | 10/11/93 | 9/11/93 |
| 3781 | 4 | PMA | C-2 | 7/14/72 | 10/20/93 |
| 10642 | 1 | LB | A-1 | 11/11/93 | 11/11/93 |
| 9738 | 4 | PMA | C-3 | 9/9/89 | 10/30/93 |
| 8317 | 4 | PMA | C-4 | 7/14/76 | 11/14/93 |
| 10000 | 1 | LB | B-1 | 11/20/91 | 11/14/93 |
| 10643 | 3 | PMA | C-3 | 1/3/94 | 10/9/93 |
| 8414 | 5 | ALH | C-2 | 1/9/77 | 1/3/94 |
| 10644 | 3 | HQ | B-3 | 1/6/94 | 1/6/94 |

FIG. 1E

| FACILITIES | |
|---|---|
| WRK LOC | LOCATION |
| PMA | Pomona |
| LB | Long Beach |
| ALH | Alhambra |
| HQ | Corona |

FIG. 1F

| Character Value | Numeric Equivalent |
|---|---|
| BC00012 | 0 |
| BC00011 | 1 |
| BR00015 | 2 |
| BC00009 | 3 |
| BC00010 | 4 |
| BC00013 | 5 |
| BC00014 | 6 |
| BR00016 | 7 |
| QR09823 | 8 |
| LR09976 | 9 |
| BC00002 | 10 |
| AR09987 | 11 |

Fig. 1G

| Column 1 Value | Column 2 Value | Column 3 Value | Multiple-Position Pattern Percentage |
|---|---|---|---|
|  | R | 0 | 6 |
| A | R | 0 | 31 |
| A |  | 0 | 3 |
| A | R |  | 0 |
| B | R | 0 | 11 |
| B |  | 0 | 35 |
| B | R |  | 0 |
| Q | R | 0 | 7 |
| Q |  | 0 | 5 |
| Q | R |  | 0 |
|  |  | TOTAL | 98 |

FIG. 1H

| PATTERN | PATTERN PERCENTAGE |
|---------|--------------------|
| ARO     | 31                 |
| BRO     | 11                 |
| B_O     | 35                 |
| _RO     | 13                 |
| Q__     | 5                  |
| TOTAL   | 95                 |

FIG. 1I

| ORIGINAL FIELD VALUE | PATTERN ASSOCIATED WITH WO FIELD VALUE | REMAINING OF WO FIELD VALUE AFTER APPLYING PATTERN SUPPRESSION | REMAINING FIELD VALUES TO BE STORED AFTER APPLYING NUMERIC PATTERN SUPPRESSION | RECORDS FOR WHICH NUMERIC SUBSTITUTION APPLIES |
|---|---|---|---|---|
| QR09823 | _R0 | Q9823 | Q | |
| LR09976 | _R0 | L9976 | L | |
| BC00011 | B_0 | C0011 | C | |
| BC00010 | B_0 | C0010 | C | |
| AR09988 | AR0 | 9988 | | X |
| BC00009 | B_0 | C0009 | C | |
| BC00012 | B_0 | C0012 | C | |
| AR09989 | AR0 | 9989 | | X |
| BC00013 | B_0 | C0013 | C | |
| BR00015 | BR0 | 15 | | X |
| BC00016 | B_0 | C0016 | C | |
| AR0990 | AR0 | 9990 | | X |
| AR09991 | AR0 | 9991 | | X |
| QD09877 | Q_ | D09877 | D0 | |
| BR00016 | BR0 | 16 | | X |

FIG. 2
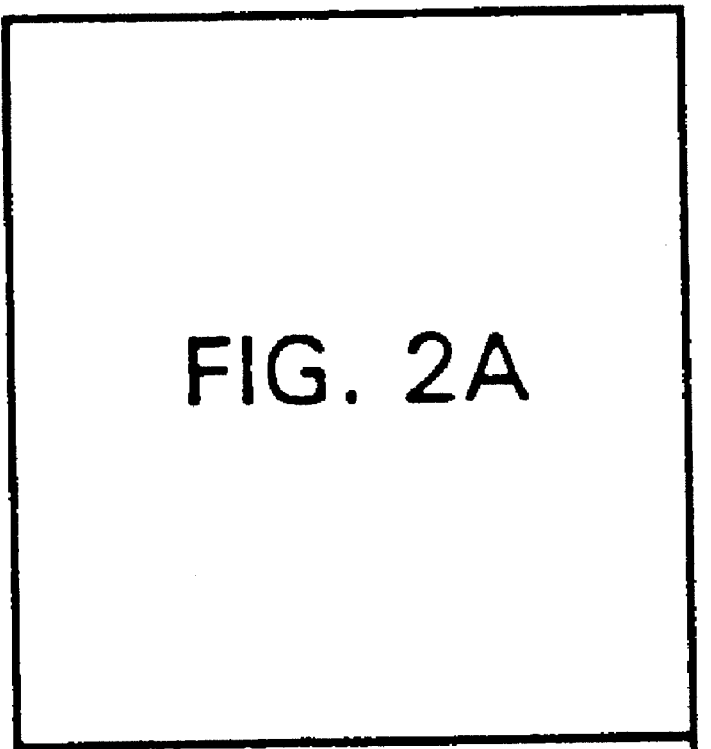
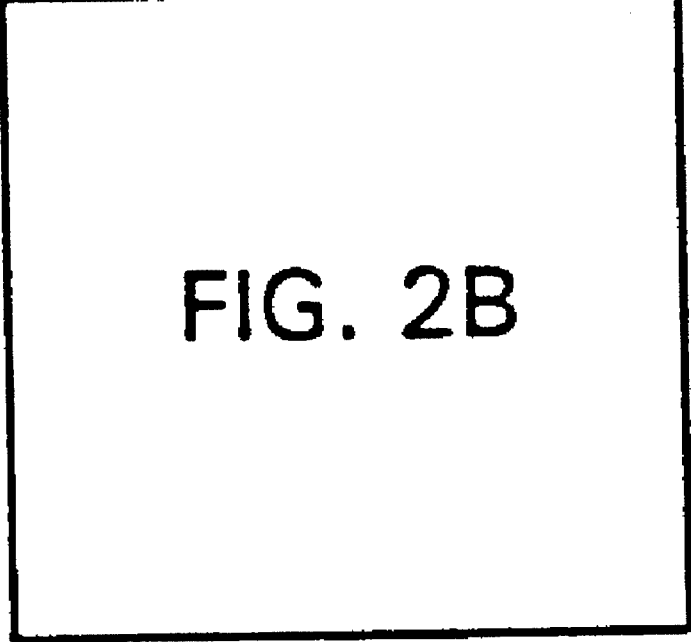

FIG. 2A

| EID | WO | HRS |
|---|---|---|
| 7740 | BC00012 | 18.6 |
| ⋮ | | |
| 8732 | BR00016 | 22.6 |
| ⋮ | | |
| 9738 | BC00009 | 32.3 |
| ⋮ | | |
| 10207 | BC00011 | 4.3 |
| ⋮ | | |
| 10317 | BR00016 | 7.3 |
| ⋮ | | |
| 10359 | BR00015 | 2.5 |
| ⋮ | | |
| 10444 | BC00009 | 1.6 |
| 10445 | BC00014 | 2.1 |
| ⋮ | | |
| 10553 | BC00015 | 13.1 |
| ⋮ | | |
| 10569 | BC00011 | 6.2 |
| ⋮ | | |
| 10588 | BC00010 | 0.7 |
| ⋮ | | |
| 10591 | BC00012 | 7.8 |
| ⋮ | | |
| 10597 | BC00012 | 1.8 |
| ⋮ | | |
| 10607 | BC00013 | 5.1 |

FIG. 2B

| | | |
|---|---|---|
| 10639 | AR09987 | 21.8 |
| 10639 | BC00010 | 18.2 |
| 10640 | BC00013 | 43.4 |
| 10641 | QR09823 | 2.7 |
| 10641 | BC00011 | 37.3 |
| 10642 | BC00012 | 51.3 |
| 10643 | LR09976 | 8.9 |
| 10643 | BC00002 | 25.9 |
| 10643 | BC00014 | 5.2 |
| 10644 | BR00015 | 40.0 |

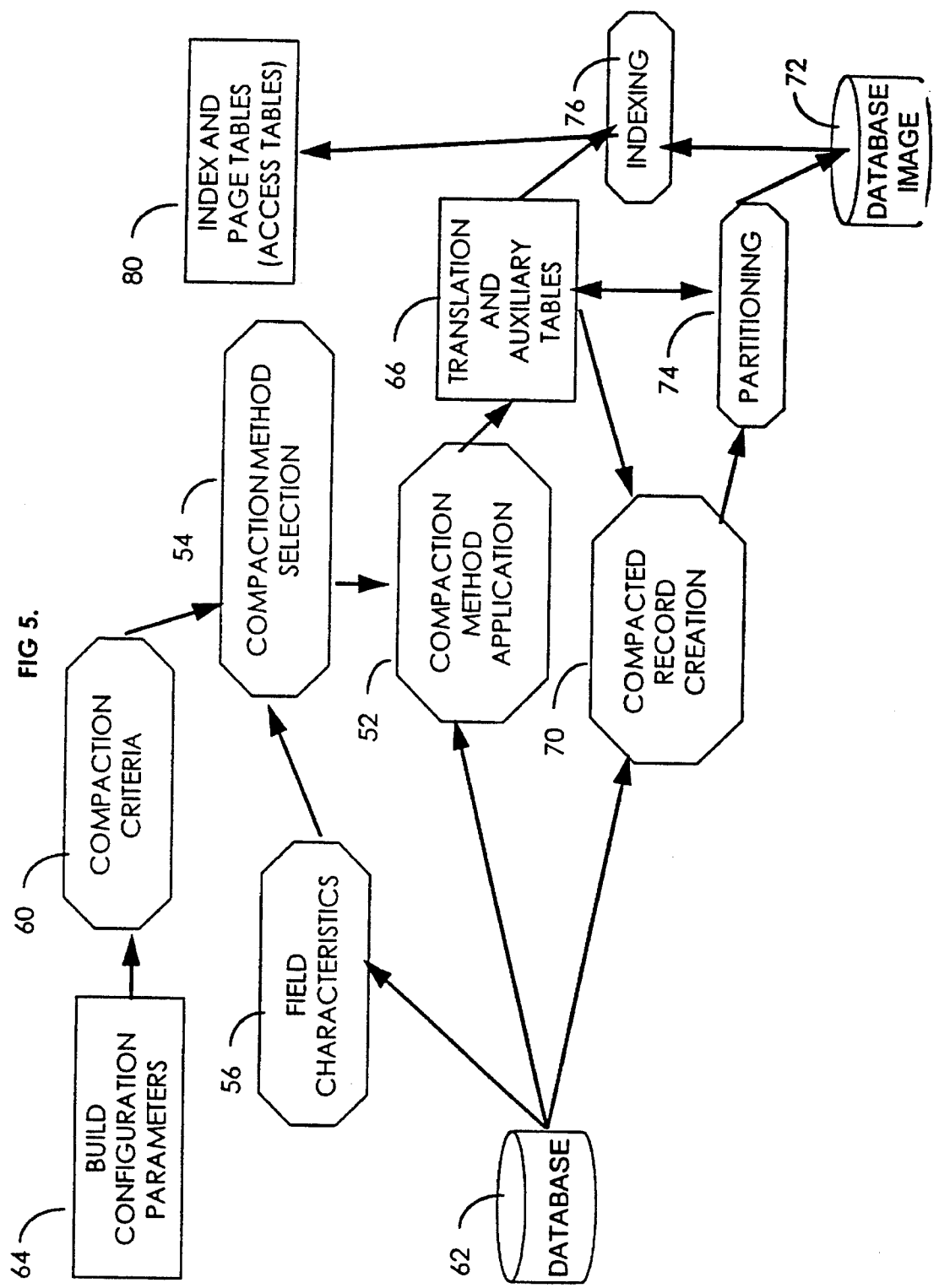

| FIG. 6 | | | | |
|---|---|---|---|---|
| FIG. 6A | FIG. 6B | FIG. 6C | FIG. 6D | FIG. 6E |

FIG. 6A

| Compaction Method or Subprocess | Build Configuration Parameter Symbol and Preferred Embodiment | Description of Parameter's Usage | Field Characteristics/ Compaction Criteria and Comments |
|---|---|---|---|
| Single Field Encoding | $C_1 = 31.623$ ($= 1000^{0.5}$) | Maximum Number of Slots Allowed in a Translation Table | Maximum Number of Slots = $C_1 X^{0.5}$ X = Total number of Database Records |
| Partial | $C_2 = 256$ | Partial Translation | |
| | $C_3 = 0.33$ | Fraction of Total Number of Records that must be Represented in $C_2$ Number of Slots | Minimum Number of Records = $C_3 X$ X = Total number of Database Records |

FIG. 6B

| Compaction Method or Subprocess | Build Configuration Parameter Symbol and Preferred Embodiment | Description of Parameter's Usage | Field Characteristics / Compaction Criteria and Comments |
|---|---|---|---|
| Multiple Field Combining and Sampling | $C_4 = 31.623$ ($= 1000^{0.5}$) | Sample Size Computation | Sample Size = $C_4 X^{0.5}$<br>$\lambda$ is the Sample Interval<br>$\lambda = \text{INT}[X / \text{Sample Size}]$<br>$= \text{INT}[X^{0.5} / C_4]$<br>The INT function returns the largest integer less than the argument<br>X = Total number of Database Records |
|  | $C_5 = 0.0056$ ($= 1/1000^k$)<br>$k = 0.75$ | Criteria for Determining Acceptability of Combined Fields | $\theta$ = Threshold value<br>$\mu_s$ = Mean Number of Records per Slot for Sample Database<br>$\sigma_s$ = Standard Deviation of Records per Slot for Sample Database<br>$\Gamma$ = Figure of Merit<br>$\lambda \mu_s > \theta / 2$<br>$(\lambda \mu_s + \lambda^{0.5} \sigma_s) > \theta$<br>$\mu_s > \sigma_s$<br>$\Gamma = \lambda \mu_s / \lambda^{0.5}$<br>$\Gamma = \lambda \mu_s + \lambda^{0.5} \sigma_s$<br>$\theta = C_5 X^k$ ; $k < 1$ |

$$\mu_s = \frac{\text{Sample Size}}{\text{Number of Sample Slots}}$$

$$\sigma_s = \sqrt{\sum_{\substack{all\ sample\\ slots}} \frac{(\text{Slot Occurance Count in Sample database})^2}{(\text{Number of Sample Slots})} - \mu_s^2}$$

FIG. 6C

| Compaction Method or Subprocess | Build Configuration Parameter Symbol and Preferred Embodiment Value | Description of Parameter's Usage | Field Characteristics / Compaction Criteria and Comments |
|---|---|---|---|
| Pattern Suppression | $C_6 = 4$ | Maximum Number of Patterns for a postion of a field | |
| | $C_7 = 10\%$ | Minimum Percentage of Records Containing a Specific Character in a Postion of a Field to Define that Character as a Pattern | Per Character Percentage $= 100 * \dfrac{(Records\ With\ Char)}{X}$<br>X = Total number of Database Records |
| | $C_8 = 50\%$ | Minimum Sum of Acceptable Per Character Percentages Required to Define a Position as a Pattern | Single-Position Pattern Determination Percentage $= \Sigma_{c_6}$ Per Char. Percentage |
| | $C_9 = 10\%$ | Minimum Percentage of Records in which a Specific Set of Pattern Characters Occur for Acceptance as a Multi-Position Pattern | Multiple-Position Pattern Determination Percentage $= 100 * \dfrac{(Records\ With\ Char\ Set)}{X}$<br>X = Total number of Database record |

FIG. 6D

| Compaction Method or Subprocess | Build Configuration Parameter Symbol and Preferred Embodiment Value | Description of Parameter's Usage | Field Characteristics / Compaction Criteria and Comments |
|---|---|---|---|
| Numeric Substitution | $C_{10} = 90\%$ | Minimum Percentage of Field Values that must be Numeric in Order to Declare Field as Mostly Numeric | Numeric Record Percentage = $100 * \frac{\text{(Num Numeric Value)}}{X}$<br>X = Total number of Database Records |
| Text Compression | $C_{11} = 63.246$<br>$(= 2 * 1000^{0.5})$ | Maximum Number of Different Words Allowed in a Text Translation Table | Maximum Number of Different Words = $C_{11}$ (Number of Delimiters)$^{0.5}$ |
| | $C_{12} = 63.246$<br>$(= 2 * 1000^{0.5})$ | Maximum Number of Phrases Allowed in a Text Translation Table | $\Phi$ = Maximum Number of Phrase Components<br>$\Phi = C_{12}$ (Number of Delimiters)$^{0.125}$ |
| | $C_{13} = 10\%$ | Minimum Percentage of Words Represented by the First $\Phi$ Entries in a Text Translation Table Required to Perform Phrase Determination | |

FIG. 6E

| Compaction Method or Subprocess | Build Configuration Parameter Symbol and Preferred Embodiment Value | Description of Parameter's Usage | Field Characteristics / Compaction Criteria and Comments |
|---|---|---|---|
| Storage Method Determination | $C_{14} = 973$ | Maximum Number of Entries in a Translation Table in Order to Use Single-Byte Code Storage | |
| | $C_{15} = 0.30$ | Fraction of Total Records Represented in Translation Table Slots 256 – 511 Required to Use Combination-Code Storage | Minimum Number of Records in 256-511 Range = $C_{15} X$<br>X = Total number of Dtabase Records |
| Paging Determination | $C_{16} = 0.80$ | Initial Fill Ratio = [Initial Number of Entries on Pages] [Maximum Number of Entries on Page] | Initial number of entries on each page = $C_{16}$ int $\left[\dfrac{X}{65536}\right]$<br>Initial Number of Pages = int $\left[\dfrac{X}{(C_{16} \, 65536)}\right]$<br>(the int function returns the least integer value GREATER than the value within the brackets)<br>X = Total number of Database Records |

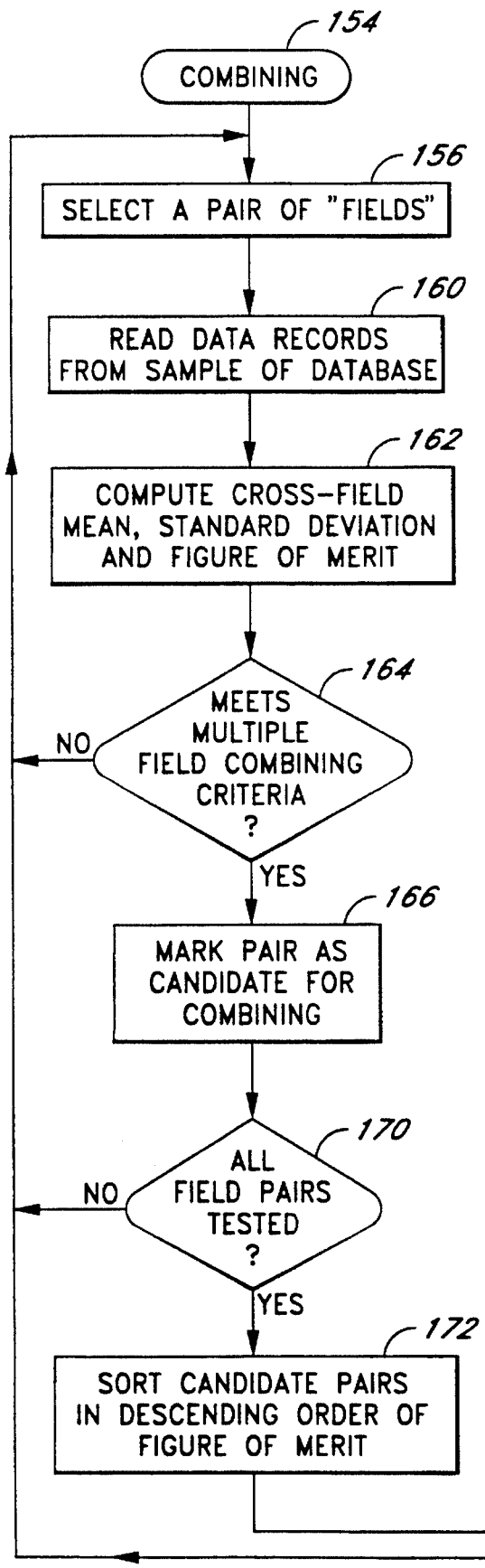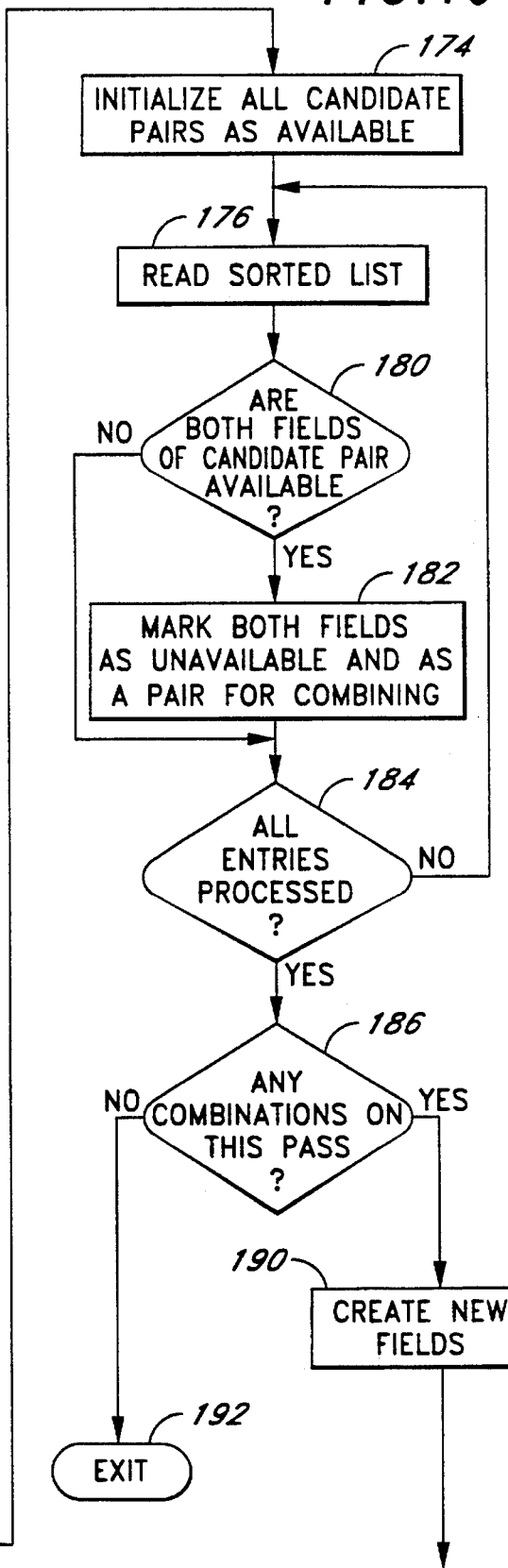
FIG. 10

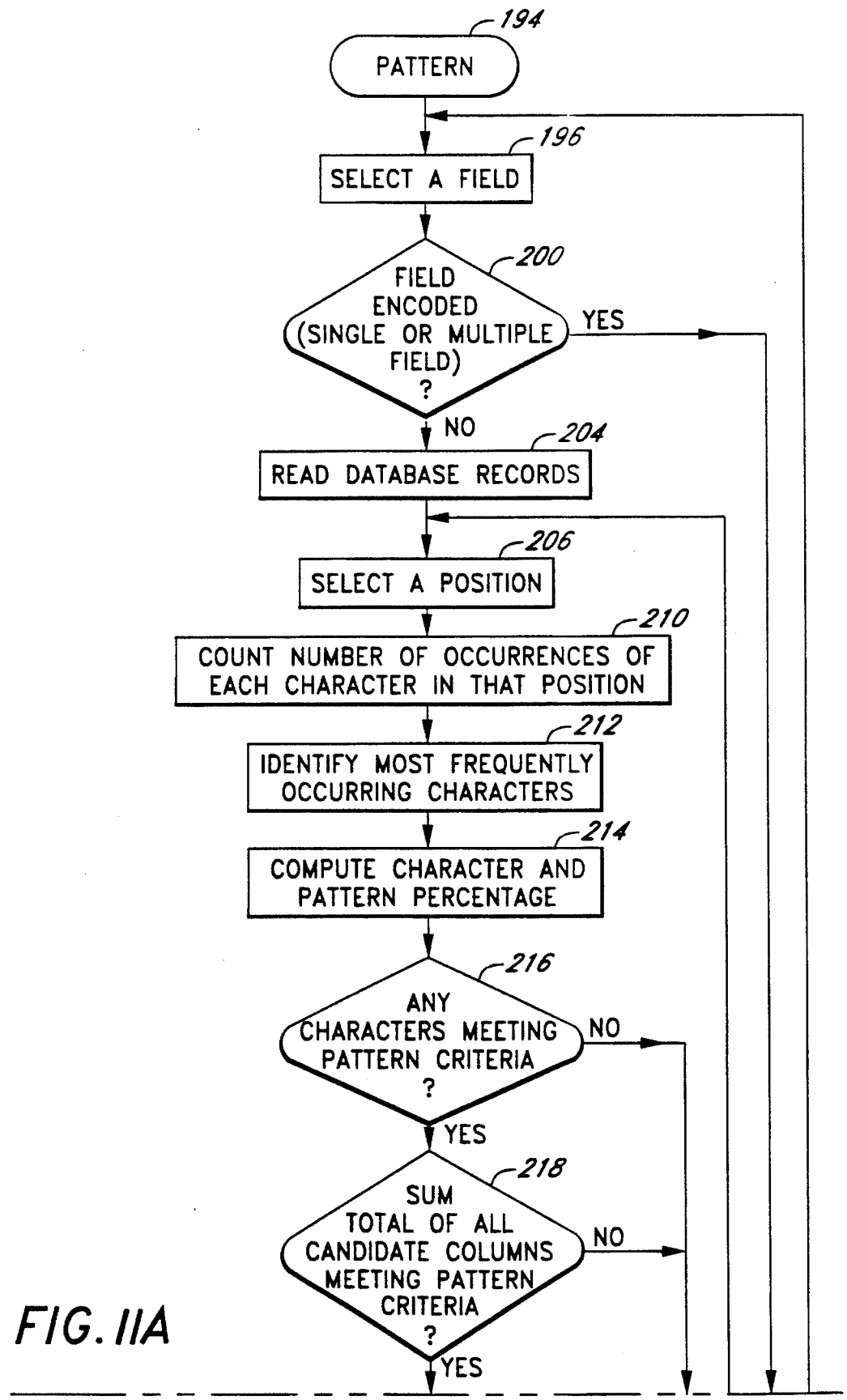
FIG. IIA

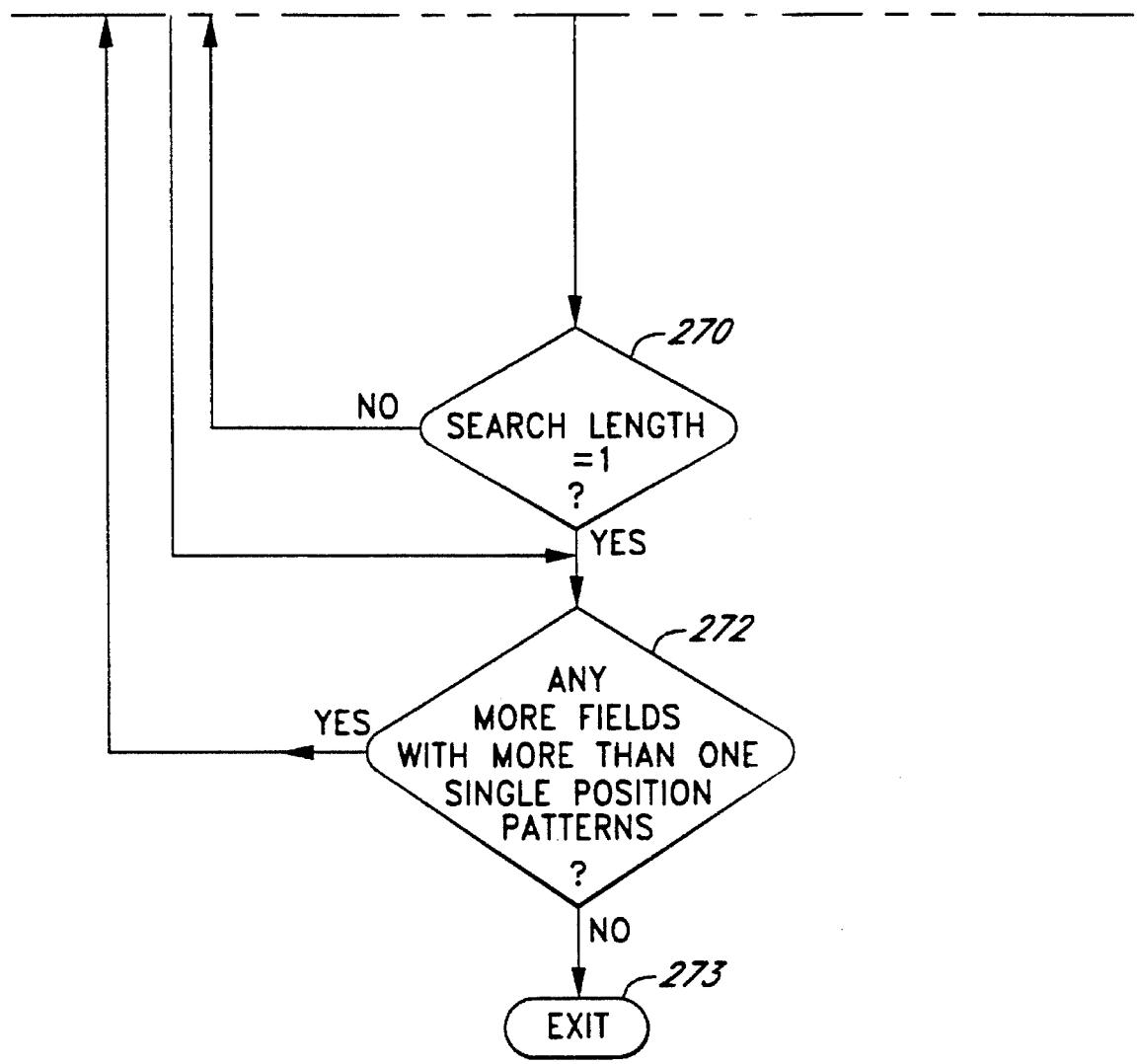
FIG. IIE

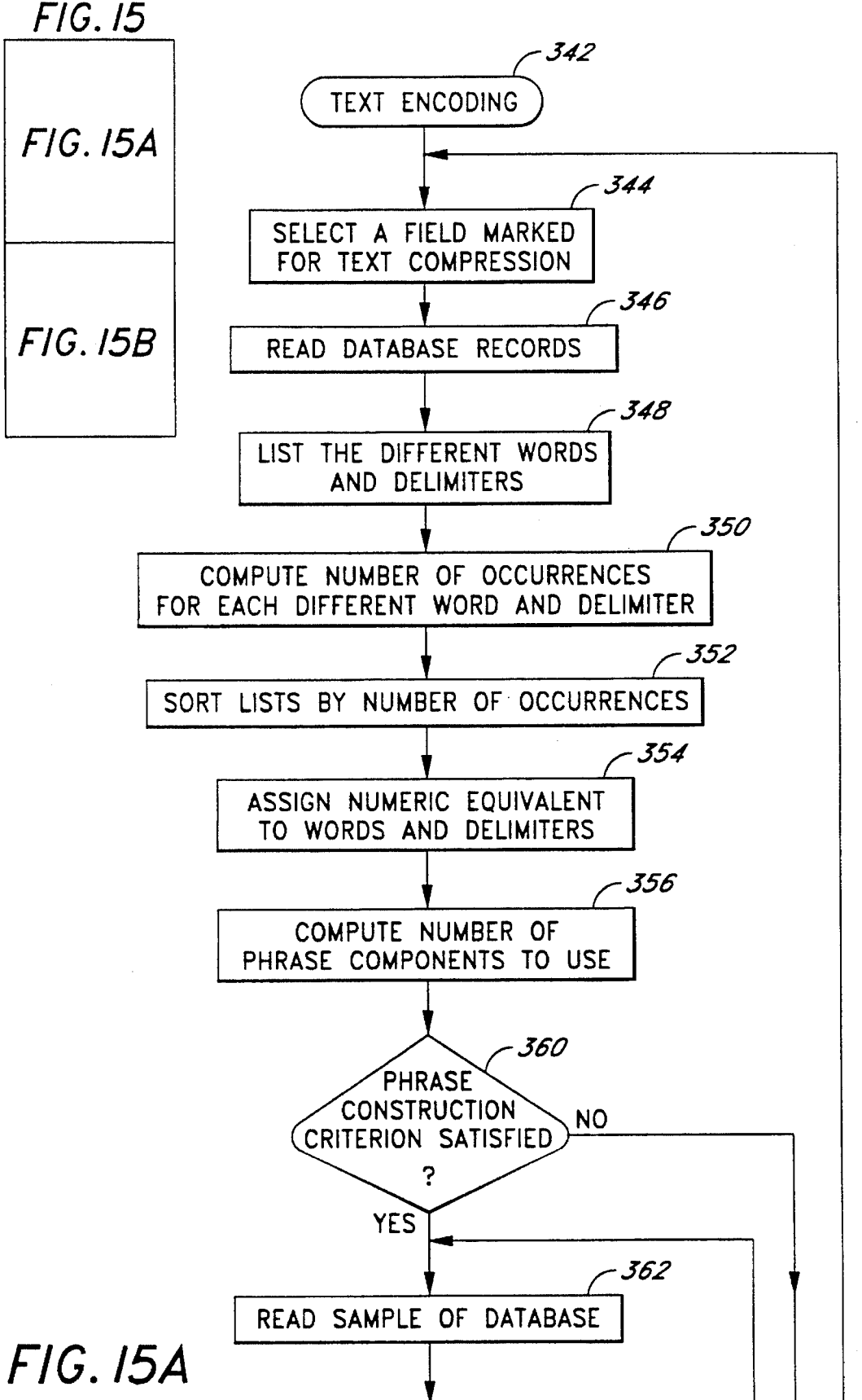

| Four bit value | Meaning |
|---|---|
| 0 | The following data is unpacked, the remaining four bits in the byte define the number of bytes of unpacked data. This represents values of 1 to 16 bytes. |
| 1 | The following data is unpacked, the next twelve bits (four from this byte plus the next byte) define the number of bytes of unpacked data. This represents values of 17 to 4,112 bytes. |
| 2 | This is a word from the Text Translation Table. The remaining four bits of this byte are the numeric equivalent from the table. This represents values from 0 to 15. |
| 3 | This is a word from the Text Translation Table. The next twelve bits of this byte are the numeric equivalent from the table. This represents values of 16 to 4,111. |
| 4 | This is a word from the Text Translation Table. The next twenty bits of this byte are the numeric equivalent from the table. This represents values of 4,112 to 1,052,687. |
| 5 | This is a phrase from the Text Translation Table. The remaining four bits of this byte are the numeric equivalent from the table. This represents values from 0 to 15. |
| 6 | This is a phrase from the Text Translation Table. The next twelve bits of this byte are the numeric equivalent from the table. This represents values of 16 to 4,111. |
| 7 | This is a phrase from the Text Translation Table. The next twenty bits of this byte are the numeric equivalent from the table. This represents values of 4,112 to 1,052,687. |
| 8 | This is an entry from the Delimiter Definition Table. The remaining four bits of this byte are the numeric equivalent from the table. This represents values of 1 to 16 (zero is not represented). |
| 9 | This is an entry from the Delimiter Definition Table. The next twelve bits are the numeric equivalent from the table. This represents values of 17 to 4,112. |
| 15 | This is the termination of the field. Used for fields that are allocated more space than is required for the minimum record length. |

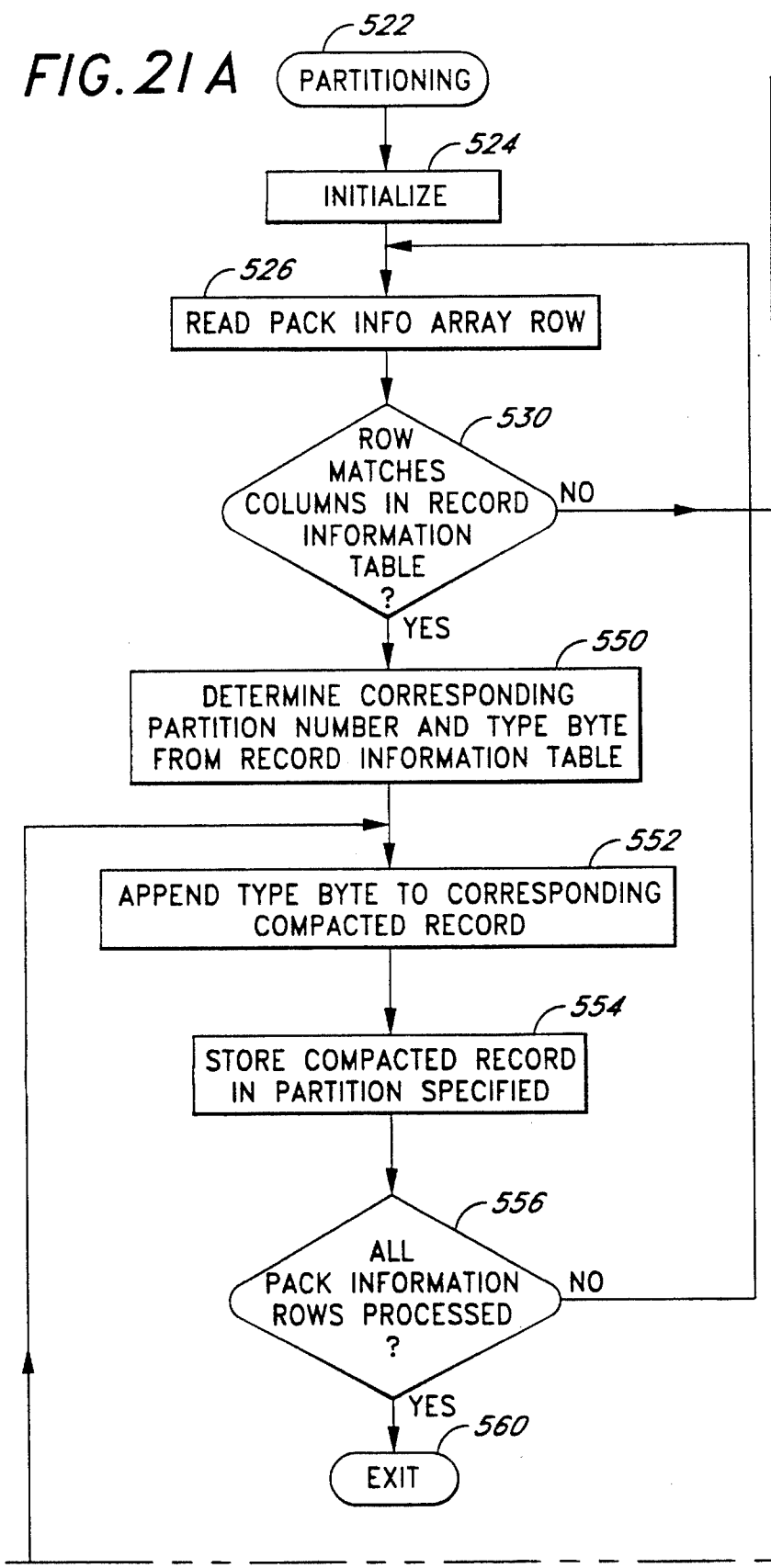

| SINGLE FIELD TRANSLATION TABLE | |
|---|---|
| Numeric Equivalent | Street Name |
| 0 | Valley |
| 1 | Harbor |
| 2 | Grand |
| 3 | South |
| 4 | Figueroa |
| 5 | Santa Anita |
| 6 | Victory |
| 7 | Broadway |
| 8 | Stagg |
| 9 | Central |
| 10 | Chestnut |
| 11 | Lemon |
| 12 | West |

FIG 23C

| MULTIPLE-FIELD TRANSLATION TABLE | | |
|---|---|---|
| Numeric Equivalent | Last Name | Zip Code |
| 0 | Smith | 91766 |
| 1 | Johnson | 91746 |
| 2 | Smith | 91790 |
| 3 | Lee | 91744 |
| 4 | Garcia | 92670 |
| 5 | Kim | 91765 |
| 6 | Miller | 91766 |
| 7 | Williams | 91790 |
| 8 | Johnson | 91790 |
| 9 | Hernandez | 92670 |
| 10 | Nguyen | 91744 |
| 11 | Lopez | 92686 |
| 12 | Smith | 91790 |

FIG 23D

| PARTIAL TRANSLATION TABLE | |
|---|---|
| Numeric Equivalent | Value |
| 0 | Ship |
| 1 | Install |
| 2 | Repair |
| 3 | MOD |
| 4 | Doc |
| ... | ... |
| 253 | Instl |
| 254 | Rpr |
| 255 | Update |

FIG 23E

TEXT PHRASE TRANSLATION TABLE

| Numeric Equivalent | Word or Phrase |
|---|---|
| 0 | Radio |
| 1 | Console |
| 2 | Com |
| 3 | Antenna |
| 4 | System |
| 5 | Equip |
| 6 | Proc |
| 7 | Manuals |
| 8 | Radio Console |
| 9 | Comply |
| 10 | Radio Network |
| 11 | Control Console |
| 12 | Sys |

FIG 23F

TEXT DELIMITER TRANSLATION TABLE

| Numeric Equivalent | Delimiter Value |
|---|---|
| 0 | SPACE |
| 1 | SPACE SPACE |
| 2 | DASH |
| 3 | SPACE SPACE SPACE |
| 4 | SEMICOLON |

FIG 23G

FIELD COMBINATION TABLE

| Field Number In Record | Combination Field that Contains this Field (0 means not in Combo) |
|---|---|
| 0 | 0 |
| 1 | 1 |
| 2 | 1 |
| 3 | 1 |
| 4 | 0 |

FIG 23H

| MOSTLY NUMERIC TABLE | |
|---|---|
| Field Number In Record | Mostly Numeric Status (Yes, No) |
| 0 | Yes |
| 1 | No |
| 2 | Yes |
| 3 | No |
| 4 | No |

FIG 23I

PATTERN DEFINITION TABLE

| Pattern Number | Position 1 Value | Position 2 Value | Position 3 Value |
|---|---|---|---|
| 1 | A | R | 0 |
| 2 | B | R | 0 |
| 3 | B |   | 0 |
| 4 |   | R | 0 |
| 5 | Q |   |   |

FIG. 23J

| FIELD NUMBER IN RECORD | PARTITION NUMBER / TYPE BYTE | | | | | | |
|---|---|---|---|---|---|---|---|
| | $0000_{16}$ | $0001_{16}$ | $0E17_{16}$ | $0E18_{16}$ | $0F00_{16}$ | $263B_{16}$ |
| 0 | $00_{16}$ | $04_{16}$ | $01_{16}$ | $02_{16}$ | $04_{16}$ | $03_{16}$ |
| 1 | $01_{16}$ | $01_{16}$ | $02_{16}$ | $03_{16}$ | $01_{16}$ | $02_{16}$ |
| 2 | $11_{16}$ | $51_{16}$ | $22_{16}$ | $B4_{16}$ | $33_{16}$ | $90_{16}$ |
| 17 | $0A_{16}$ | $01_{16}$ | $01_{16}$ | $05_{16}$ | $01_{16}$ | $09_{16}$ |
| 26 | $00_{16}$ | $00_{16}$ | $00_{16}$ | $00_{16}$ | $00_{16}$ | $00_{16}$ |
| 27 | $00_{16}$ | $00_{16}$ | $28_{16}$ | $18_{16}$ | $40_{16}$ | $38_{16}$ |

FIG 23K

| INDEX TABLE | |
|---|---|
| INDEX VALUE | PAGE ACCESS POINTER |
| Central | $00000000_{16}$ |
| Chestnut | $00010100_{16}$ |
| Figueroa | $0100A300_{16}$ |
| Grand | $010048B00_{16}$ |
| Harbor | $0100DB600_{16}$ |
| Lemon | $012B7B00_{16}$ |

FIG 23L

| PAGE TABLE (PAGE NUMBER 0) |
|---|
| 52428 |
| $00000000_{16}$ |
| $01000000_{16}$ |
| $10000020_{16}$ |
| $02000100_{16}$ |

FIG 23M

| | STORAGE METHOD NUMBERS |
|---|---|
| 0 | Unmodified (Stored in Original Form) |
| 1 | 1 Byte Numeric, First Single-Byte Code, or One Byte Combination Code |
| 2 | Two Byte Numeric Value or Variable-Byte Code (from 256 to 65791) |
| 3 | Three Byte Numeric Value or Variable-Byte Code (from 65792 to 16843007) |
| 4 | Four Byte Numeric Value or Variable-Byte Code (from 16843008 to 4311810304) |
| 5 | Second Single-Byte Code (256-511) |
| 6 | Third Single-Byte Code (512 - 767) |
| 7 | Fourth Single-Byte Code (768-1023) |
| 8 | Entry from a Partial Translation Table |
| 9 | Two Byte Combination Code (512 to 66047) |
| 10 | Three Byte Combination Code (66048 to 16843263) |

FIG. 25A
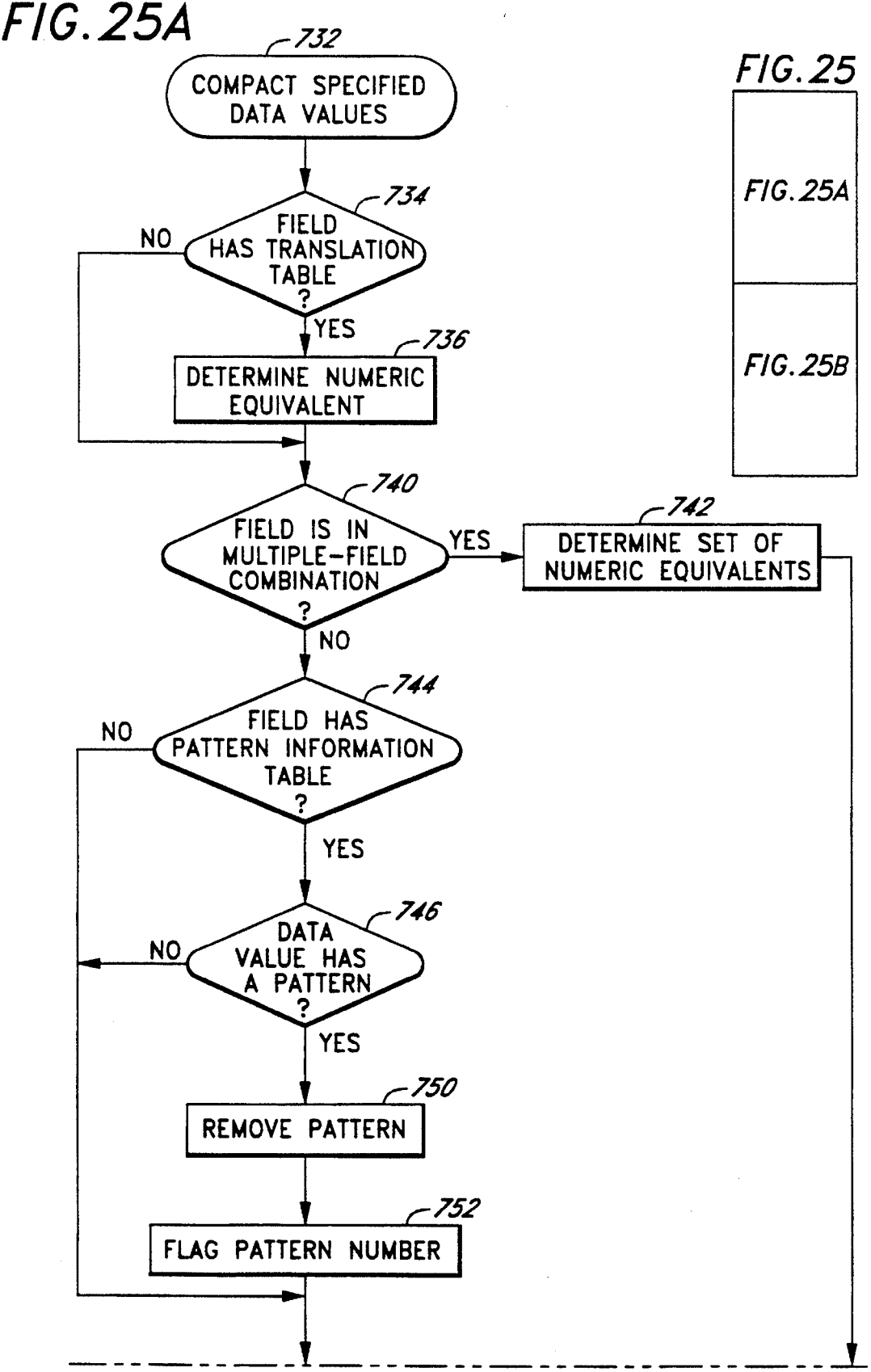

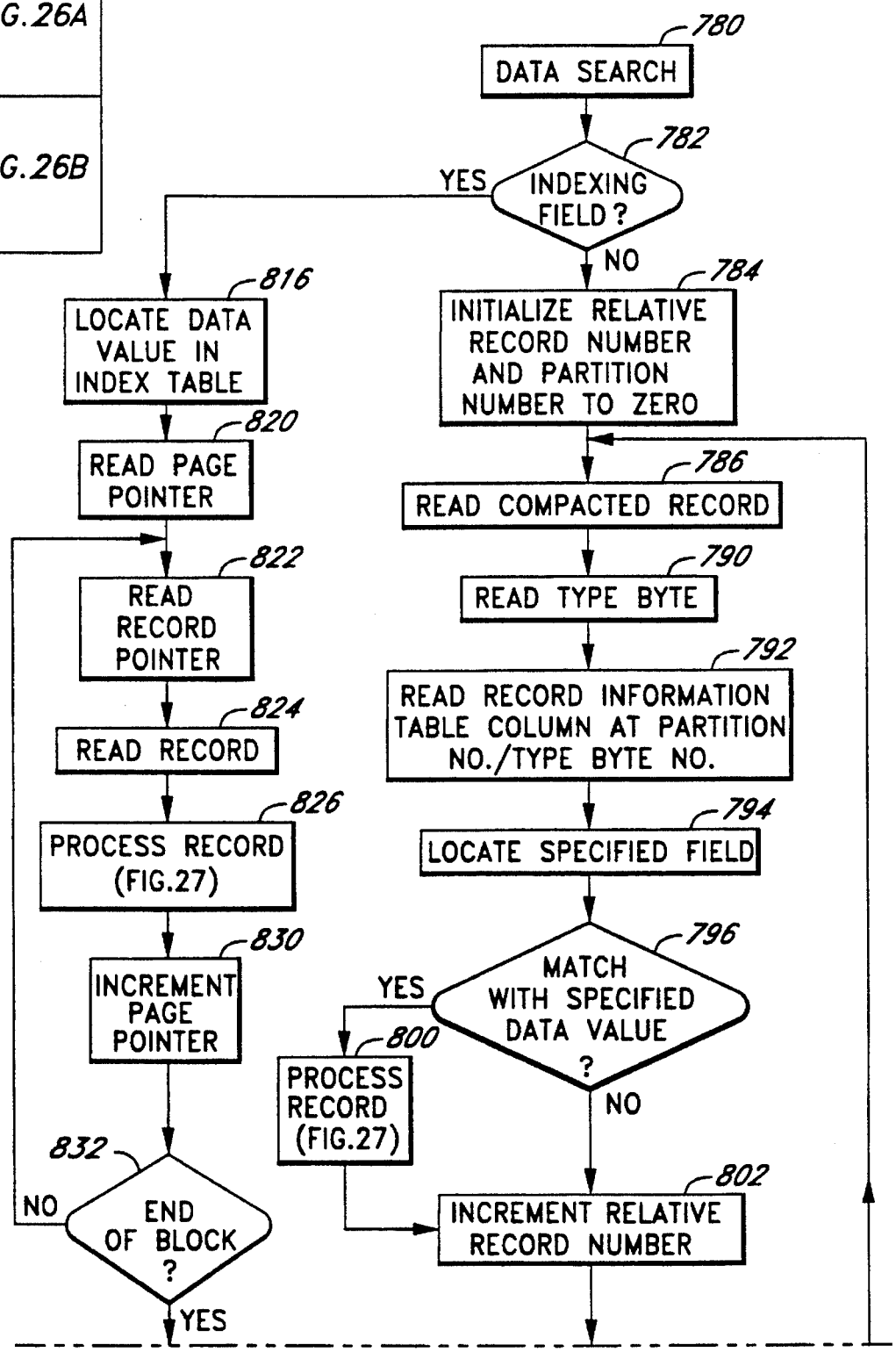

ENCODING METHOD FOR COMPRESSING A TABULAR DATABASE BY SELECTING EFFECTIVE COMPRESSION ROUTINES FOR EACH FIELD AND STRUCTURE OF PARTITIONS OF EQUAL SIZED RECORDS

BACKGROUND OF THE INVENTION

This invention relates to databases. In particular, this invention relates to an improved database storage structure.

A database is a collection of interrelated data, typically stored on a computer, to serve multiple applications. Data in a database is logically represented as a collection of one or more tables, composed of a series of rows and columns. Each row in the table, called a record, represents a collection of related data. Each column in the table, called a field, represents a particular type of data. Thus, each row is composed of a series of data values, one data value from each field.

A database is organized from two perspectives. A logical perspective describes how the database is organized from a user's viewpoint. A physical perspective describes how data is actually recorded in computer storage. The prior art describes various techniques designed to alter the physical organization of a database while maintaining the same logical perspective, in order to reduce computer storage requirements. One technique, data compression, is well-known in the prior art. Peter Alsberg's paper, "Space and Time Savings Through Large Database Compression and Dynamic Restructuring," Proceedings of the IEEE, Vol. 63, No. 8, August 1975, pp. 1114–1122, describes the use of binary number codes to represent data consisting of character strings. Alsberg noted that when specific data values occur repeatedly, it is feasible to use a variable-length compression code for that field. Using shorter codes for the frequently occurring data values and longer codes for the infrequently occurring data values achieves greater compression. The paper by Dennis Severance, "A Practitioner's Guide to Database Compression," Information Systems, Vol. 8, No. 1, 1983, pp. 51–62, describes a similar binary encoding compression scheme. Severance outlines a method where the data values are ordered by probability of occurrence and then assigned a variable-bit-length binary code using Huffman coding, a well-known optimum code for this purpose.

Besides data compression, pattern recognition can also be used to reduce the data storage requirements of a database without altering the logical organization of the database. In Fred McFadden's book, "Database Management," 1983, Benjamin/Cummings Publishing Company, a technique called pattern substitution is described. This technique first identifies repeating sequences of characters that occur within a particular field, then replaces these sequences of characters by a single character which represents the pattern.

Besides reducing data storage size, other techniques for altering the physical organization of a database to allow faster data access have been described. For example, data records may be grouped in a way which allows data items which are accessed more frequently to be stored on the fastest storage devices. This can be achieved by splitting the stored records into separate segments and allocating separate segments to separate physical storage devices, some of which permit faster data access than others. As another example, records can be physically grouped together if they are frequently accessed together, such as grouping records on the same disk sector or disk track. In this manner, fewer disk accesses are needed to transfer data to or from the main computer memory for a particular application. This technique is described in McFadden's book, "Database Management," cited above.

The prior art also describes techniques for altering the logical organization of a database in order to create a more efficient physical organization. As an example, W. Kent, in his paper, "Choices in Practical Data Design," Proceedings: Very Large Data Bases, Sep. 8–10, 1982, pp. 165–180, describes field design options. Kent describes alternative representations of the same data relationships. Each specific data type can be represented by a separate field or grouped with other data types into a combined field. In Kent's article, data types are either combined into a single field or separated into distinct fields based on the known relationships between the data types. For example, "date" can be a single field, or date information can be represented by three separate fields: "month," "day" and "year."

SUMMARY OF THE INVENTION

The present invention is directed to an improved physical structure for databases which are logically composed of a series of rows and columns and a method for creating the structure. A conventional database typically makes inefficient use of computer storage space and requires a significant amount of data access time. By redesigning the physical structure of such a database, the same information can be recorded in less space and can be accessed faster. In accordance with the present invention, this redesign is accomplished, in part, by the automatic selection or rejection of one or more compaction methods to be applied to individual database fields. In a preferred embodiment, there are five compaction methods which can be applied to the database fields: single-field encoding, multiple-field combination, pattern suppression, numerical substitution and text compression. A particular compaction method is applied to a particular field only if the benefit from storage savings is sufficiently large to offset the penalty in overhead storage and increased storage complexity. The overhead storage is mostly due to translation tables needed to convert compacted data back to original form. A favorable tradeoff between storage savings and overhead is achieved by setting criteria for each compaction method which must be satisfied by the data within a particular field. That is, various data-dependent characteristics are calculated for each field, and these field characteristics are then compared to specific compaction method criteria to determine which compaction methods are applicable to which fields. In this manner, a system is provided whereby a compaction method or methods for each field are automatically selected to yield favorable results. The method or methods are then applied to each record of the database to create equivalent compacted records, requiring less storage.

In accordance with another aspect of this invention, data access performance can be improved over a conventional database by a method of grouping compacted records according to record length, where record length is the number of storage bytes required for a compacted record. Each equal record-length group is written to a common storage area, called a partition. This results in a "database image" containing multiple partitions, each partition containing records of the same record length. This same-length record structure simplifies the data processing required to read, modify, delete and add records and speeds database access.

In accordance with a further aspect of this invention, various compaction methods convert data values into equivalent compacted data values which require less storage space. The single-field encoding method accomplishes this by assigning a code to each different data value in a field. A field which can be encoded is also a candidate for the multiple-field combining method. The multiple-field combining method combines two or more fields into a single field by assigning a unique code to each different combination of data values which occur in a single record, within the fields to be combined. The code assigned to a data value combination is a reduced storage equivalent of the data value combination. The data value combination can be reconstructed from the code, and the code requires less storage space in the database. That is, the codes generated by the multiple-field combining method become compacted data values that replace each of the data value combinations from the fields to be combined, creating a single combined field.

A field which cannot be encoded might be compacted by the pattern suppression method. For pattern suppression, a single character repeatedly occurring in the same position within a field is identified as a pattern. Also, multiple characters that repeatedly occur together in a single record in the same positions within a field are identified as a pattern. These characters need not be contiguous within the field. A pattern is removed from each record in which it occurs and a designation of the pattern removed is associated with the record. In a preferred embodiment, a "type byte" at the end of each compacted record, used to specify the storage method for each field, is used to designate which patterns have been removed from each field. This saves the storage space required by the pattern and there is no need to use a substituted character.

A method of encoding using integral-byte length codes is used in the single-field encoding and multiple-field combination compaction methods. Hence, an item to be encoded can be a data value (single-field encoding) or a data value combination (multiple-field combination). Encoding begins by selection of a field to be encoded. A field may be a combined field containing data value combinations as a result of the multiple-field combining. The different items to be encoded are identified, and the relative frequency of occurrence of the items within the field is determined. A unique variable-byte length code is then assigned to each different item, where the more frequently occurring items are assigned smaller codes. The codes then replace all occurrences of the items in the field to be encoded.

It should be noted that run-length encoding schemes, such as Huffman codes, have variable-bit length codes and are often used to encode data streams. In databases, the database records may consist of many fields. If a number of these fields are encoded using a variable-bit length code, the overall bit length or storage length of each record will vary widely. The partitioning of compacted records is impractical if the number of possible record lengths is not limited. Hence, a tradeoff exists between the optimum compaction achieved by variable-bit length codes and the resulting widely variable record lengths. In accordance with a preferred embodiment of the present invention, the partitioning of compacted records is made practical by using a variable-length code of integral-byte length.

Another aspect of this invention relates to a database structure which includes a database image and various tables for uncompacting the data in the database image. The database image is made up of partitions. Each partition contains compacted records of the same length. Within each partition are subpartitions of compacted records using the same storage configurations for each field in the records. The compacted records are all of integral-byte length and contain the compacted data values created by the various compaction methods. This database structure resides on a readable computer storage medium, and is a reduced storage version of a conventional database.

A further aspect of this invention relates to a complete database system which is implemented on a conventional computer system using the database structure described above. The database image resides in the computer system's mass storage, and the tables reside in the computer system's random access memory. A conventional operating system controls conventional computer system functions such as program execution and input/output. An access program is required to interpret and perform user requests such as data reads, insertions, deletions and updates.

Further features and advantages of the present invention will become apparent from the detailed description of preferred embodiments which follow, when taken together with the appended figures and claims.

BRIEF DESCRIPTION OF THE DRAWINGS

FIGS. 1A–E show an example of a database from a logical perspective and FIGS. 1F–I show the results of applying an embodiment of the present invention to this database;

FIG. 2 comprising views shown in FIGS. 2A–B are an illustration showing a physical data structure for a database using the example database of FIGS. 1A–E;

FIG. 5 is a top-level functional flow diagram showing an embodiment of the database image build process according to the present invention;

FIG. 6 comprising views shown in FIGS. 6A–E are tables summarizing compaction methods, preferred field characteristics and compaction criteria according to the present invention;

FIG. 10 is a detailed flowchart of a preferred field characteristic test pertaining to the multiple-field combining compaction method;

FIG. 18B is a chart of a preferred text compression encoding scheme;

FIGS. 23B–L show examples of the tables referenced in FIG. 23A;

FIG. 23M is a table of a storage method identification scheme;

DESCRIPTION OF THE PREFERRED EMBODIMENTS

Figure 3:
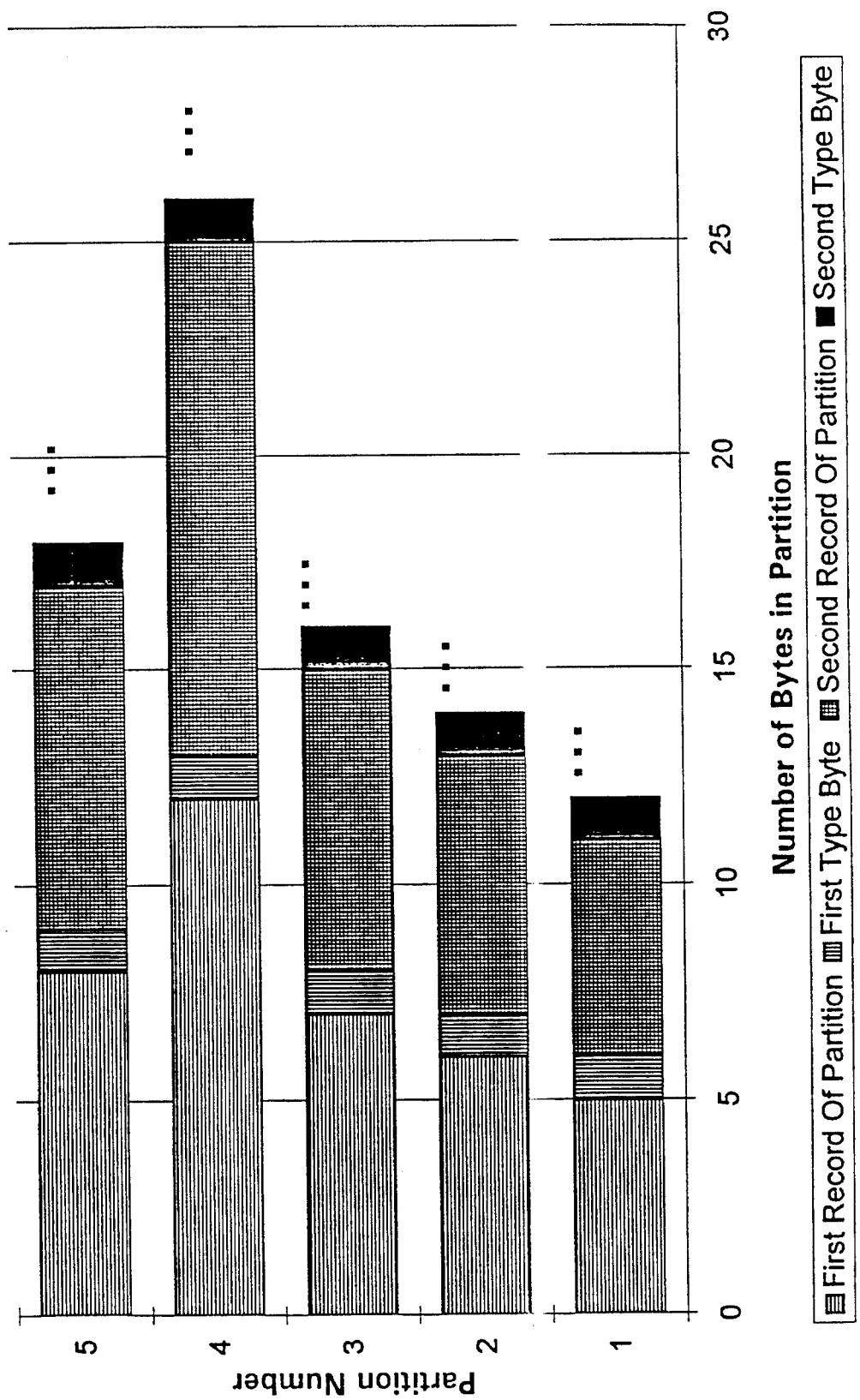
FIG. 3 is an illustration of the physical data structure of an example of the database image created according to the present invention.

In accordance with the present invention, a database image is created from a database logically organized as one or more tables of rows and columns. Shown in FIGS. 1A–E are tables for the database "COMPANY." Each table contains a collection of related data. The dashed lines at the bottom of the tables indicate that just the first few entries of each table are shown. For example, the table "EMPLOYEE_INFO," contains all data related to Company employees. Each row of a table contains data on one specific member of the related data collection. For example, row 1 of the table "EMPLOYEE_INFO" contains all data describing employee Arnold Benjamin. The columns of a particular table contain a specific type of data common to the entire data collection. For example, the column "SSN" contains the social security numbers for all employees. The intersection of a particular row and column contains a data value describing a very specific aspect of one member of the related data collection. For example, in FIG. 1A, column "EID" of row 1 of table "EMPLOYEE_INFO" specifies "the employee identification number of Arnold Benjamin." The associated data value is the character string "10639." Note that a blank is also a data value. For example, in FIG. 1A, employee "Arnold Benjamin" does not have a middle initial. Hence, a blank is a data value in the "MI" field. Tables like FIGS. 1A–E represent the logical or human perspective of a database. There are various ways to logically represent the same data relationships. FIGS. 1A–E show multiple, interrelated tables. For simplicity, the preferred embodiments of the database structure and method are described here in terms of a single table. These operations can be extended to multiple tables in a manner described below.

An example of the type of physical data structure which might be used by a conventional database is shown in FIG. 2. FIG. 2 corresponds to the logical database structure of the EID_WRK_ASSGN table of FIG. 1C. In this particular example, data records, which correspond to the table rows, are ordered numerically by a particular field, which corresponds to a table column. The dots between records represent records which are not shown in the figure. The field used for the ordering is "EID," and the records are stored sequentially in blocks of disk storage. The length of each record, that is, the amount of storage the record requires, varies from record to record. The means of storage of data in the original database from which the database image is created is unimportant. For example, the data may be stored in a user specific file or in a commercial database. The database may already be in existence, or data can be directly input into a preprocessor which compiles data and creates a database image when sufficient data is available. The nature of the database fields is also unimportant. These may be numeric or alphanumeric, fixed form or free form. The database, however, must be capable of being logically organized in a row-column format.

An example of the physical structure of a database image made in accordance with a preferred embodiment of the present invention is shown in FIG. 3. This figure illustrates that all records in a partition are of equal length. The vertical axis labels the various partitions by partition number. The horizontal axis shows the length (storage required) for each record, including the type byte, in a particular partition. The dots at the end of the records indicate additional records in each partition which are not shown in the figure. Additional data structures, which include translation, auxiliary and access tables, are described below. The database image consists of compacted records, each of which is a reduced storage version of a database record. The compacted records contain fields which may be fewer in number than those in the original database due to field-combinations during the database image build. The data within a particular field of the database image may be character strings, binary codes, binary numbers or a combination of these. The database image records are organized into computer-storage partitions, where each partition contains records of equal length.

Figure 4:
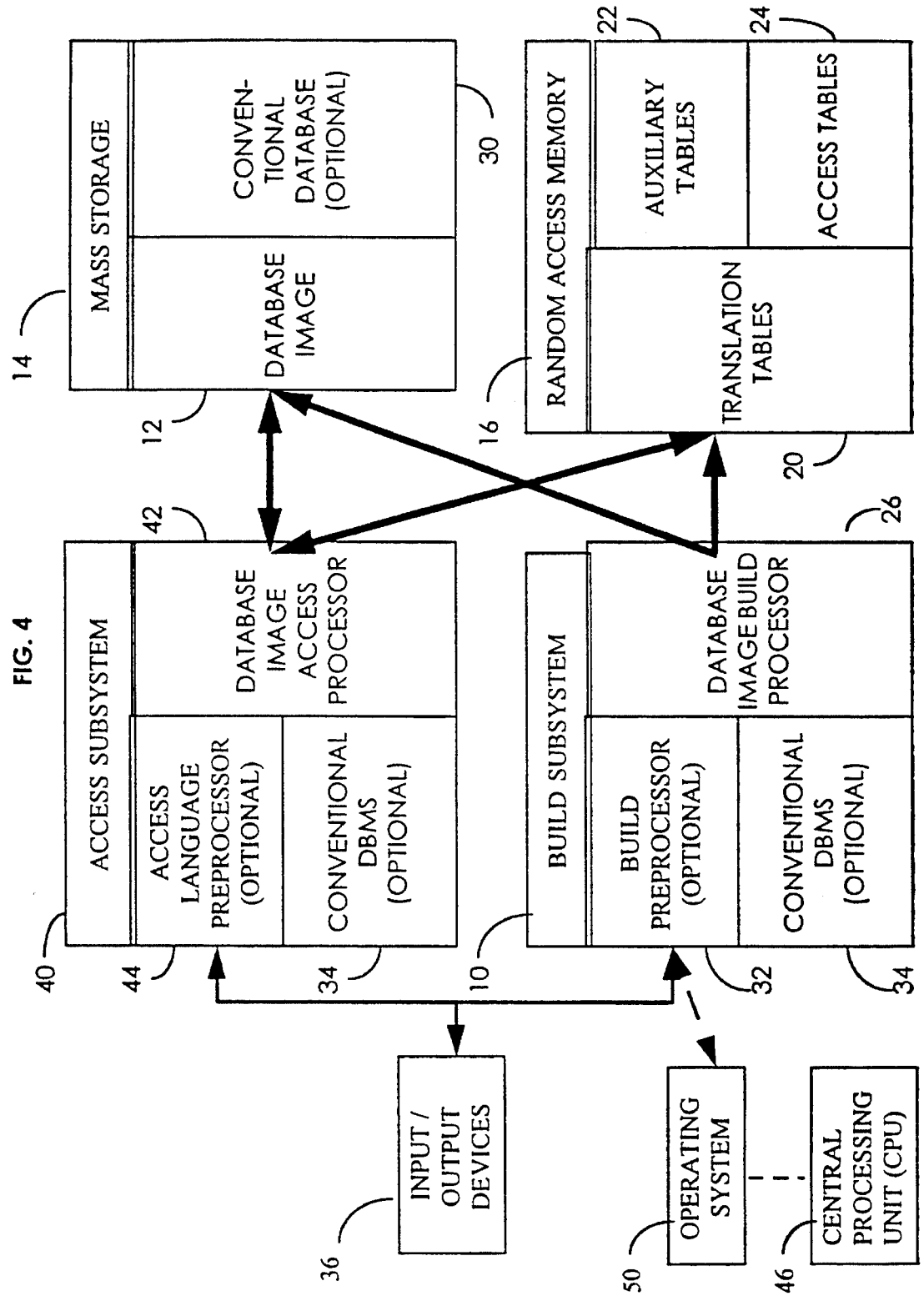
FIG. 4 is a top-level block diagram showing an embodiment of a computer-implemented database system according to the present invention.

FIG. 4 illustrates a preferred embodiment of the database structure, which includes the database image, as configured for a typical computer system. The build subsystem 10 creates a database image 12 in mass storage 14 and a variety of tables in random access memory (RAM) 16. These tables include translation tables 20, auxiliary tables 22 and access tables 24. The build subsystem consists of a database image build processor 26. The database image build processor 26 assumes the existence of a database 30 from which to create the database image 12. Optionally, the database image build processor 26 is interfaced to a build preprocessor 32 used for constructing an initial database 30 if none exists. Alternatively, a conventional database management system (DBMS) 34 can be used to initially construct a database 30. The database image build processor 26 need not remain on the system after the initial build is complete. A rebuild, however, may be necessary after many data insertions, deletions and updates are done on the database image. Such operations may eventually change the frequency of occurrence of data values in a field to the extent that the order of data values in the corresponding translation table is incorrect (i.e. some of the more frequently occurring data values are assigned greater length codes). This may result in degraded performance characteristics for the database image. The database image build processor 26 would be needed to perform a rebuild in these circumstances.

FIG. 4 also illustrates the access substructure for the database. A user interface is achieved through input/output devices 36. The access subsystem 40 provides the means of accessing the database image 12, the translation tables 20, auxiliary tables 22, and access tables 24 and transferring data to and from the input/output devices 36. The translation tables 20 consist of single-field encoding translation tables, multiple-field encoding translation tables, partial translation tables and text field translation tables. The auxiliary tables 22 consist of the record information table, pattern information tables, the mostly numeric fields table, and the combined fields table. The access tables 24 consist of index tables and page tables. The access subsystem 40 is the database image access processor 42. Optionally, the database image access processor 42 is interfaced to an access language preprocessor 44 which provides the database image user with a standardized data access language, such as SQL (Structured Query Language). As part of the access subsystem 40, the DBMS 34 might remain on the system to operate on the database 30 in parallel to the database image access processor 42 operating on the database image 12. In this mode, the database image access processor 42 might serve as a background process for the DBMS 34, providing quick access for routine data queries while the DBMS 34 provides more sophisticated data reports. Alternatively, the database image 12 might provide a backup role, providing the capability of regenerating the database 30 in the event of a system failure. Also shown in FIG. 4 is the CPU 46 which provides the hardware processing function for all database operations. This processing function is generally under the control of the operating system 50. The input/output devices 36 include such devices as a keyboard, printer, and cathode-ray tube (CRT). The mass storage 14 would include such devices as hard disk, floppy disk or compact disk - read only memory (CD-ROM).

Although the database image 12 typically resides in mass storage 14, if small enough, the database image may reside in RAM 16. Translation tables 20, auxiliary tables 22 and access tables 24, which are critical to fast data access, are preferably stored in RAM 16, but, if too large for RAM 16, the translation tables 20 might be split between RAM 16 and mass storage 14. In that case, translation table entries corresponding to the most frequently occurring data would still reside in RAM 16. All data structures (the database image 12, translation tables 20, auxiliary tables 22 and access tables 24) are permanently stored in mass storage, and those data structures which reside in RAM 16 during operation of the database are loaded into RAM 16 upon start-up of the computer system.

FIG. 5 shows that the database image is built by selectively compacting database fields. A particular compaction method is selected 54 by comparing field characteristics 56 to compaction criteria 60. The field characteristics 56 are derived from a specific database 62 and are features of the data in a particular field that determine whether a particular compaction method 54 will be beneficial. The criteria 60 are compaction-method dependent limits placed on specific field characteristics 56. A particular compaction method will be applied 52 to a particular field only if the field characteristics 56 satisfy the criteria 60 for applying that compaction method. Five compaction methods 54 are possibly applied 52 to each field in the database 62: single-field encoding, multiple-field combining, pattern suppression, numeric substitution and text compression. More than one compaction method 54 may be applied 52 to the same field. By selectively compacting 52, a favorable tradeoff is achieved between data compaction and overhead storage due to the compaction method itself. The build configuration parameters 64 are constants which are given a value by the user or are given a default value and which affect the criteria 60 described above.

Figures 6, 6A:
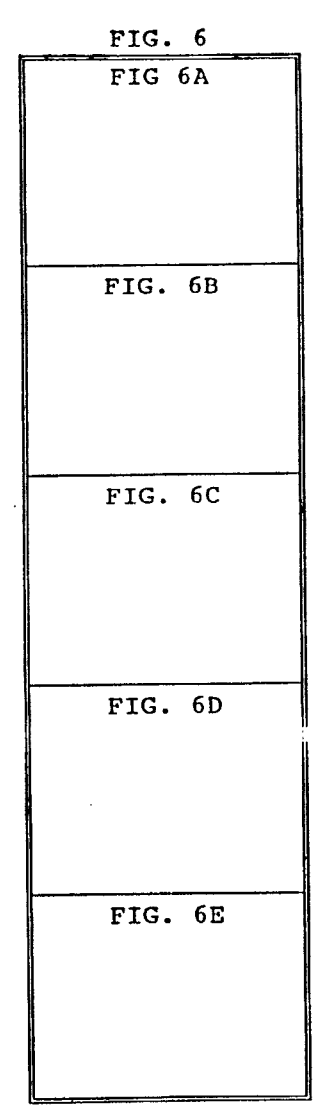

FIG. 6 summarizes the build configuration parameters, field characteristics and compaction criteria used for each compaction method. The preferred values for these constants, given in FIG. 6, are starting points for creating a database image. After the database image is built using these initial criteria, there is nothing to prevent alteration of the criteria and one or more rebuilds of the database image to determine if overall compaction can be improved. One of ordinary skill in the art could easily achieve desired tradeoffs in a specific database application by using other build configuration parameters or other criteria that may work as well or possibly even better than those given in FIG. 6. It is contemplated that such other build configuration parameters or other criteria fall within the scope of the present invention.

Referring back to FIG. 5, applying the compaction method selected 52 creates translation and auxiliary tables 66 used to create compacted records 70 and to interpret database image data. The database image 72 is generated by partitioning 74, which groups compacted records according to the number of bytes of compacted data they contain. Each group is assigned a separate area of computer storage, called a "partition."

A method of accessing the data in the database image is also required. This involves constructing an index access structure. Indexes are additional data structures which make the data searches more efficient by referencing certain fields, called indexing fields. For example, in the database table of FIG. 1A, the field containing last names may be made an indexing field. This field would be sorted alphabetically and pointers to records containing each last name would be created. In this manner, records containing a specific last name could be quickly located without searching the entire database. The database image partitioning structure easily accommodates indexing because same-length records are grouped together, allowing simple algorithms to be used to locate individual records.

Referring back to FIG. 5, a preferred embodiment uses indexing 76 to create access tables 80 consisting of index and page tables for each specified indexing field. The access tables 80 are derived from the database image 72 and the translation tables 66. The index table consists of a page pointer associated with each index value, where an index value is a unique data value in the indexing field. A page pointer specifies a block of entries in the page table. Each page table entry is a record pointer. A record pointer specifies a partition number and a relative location within the partition where a record is located. In summary, specifying an index value specifies a page pointer which, via blocks of record pointers in the page table, specifies the location of records containing this index value within the database image. The database image 72, translation and auxiliary tables 66 and access tables 80 form the reconfigured physical structure of the original database 62.

Figure 7:
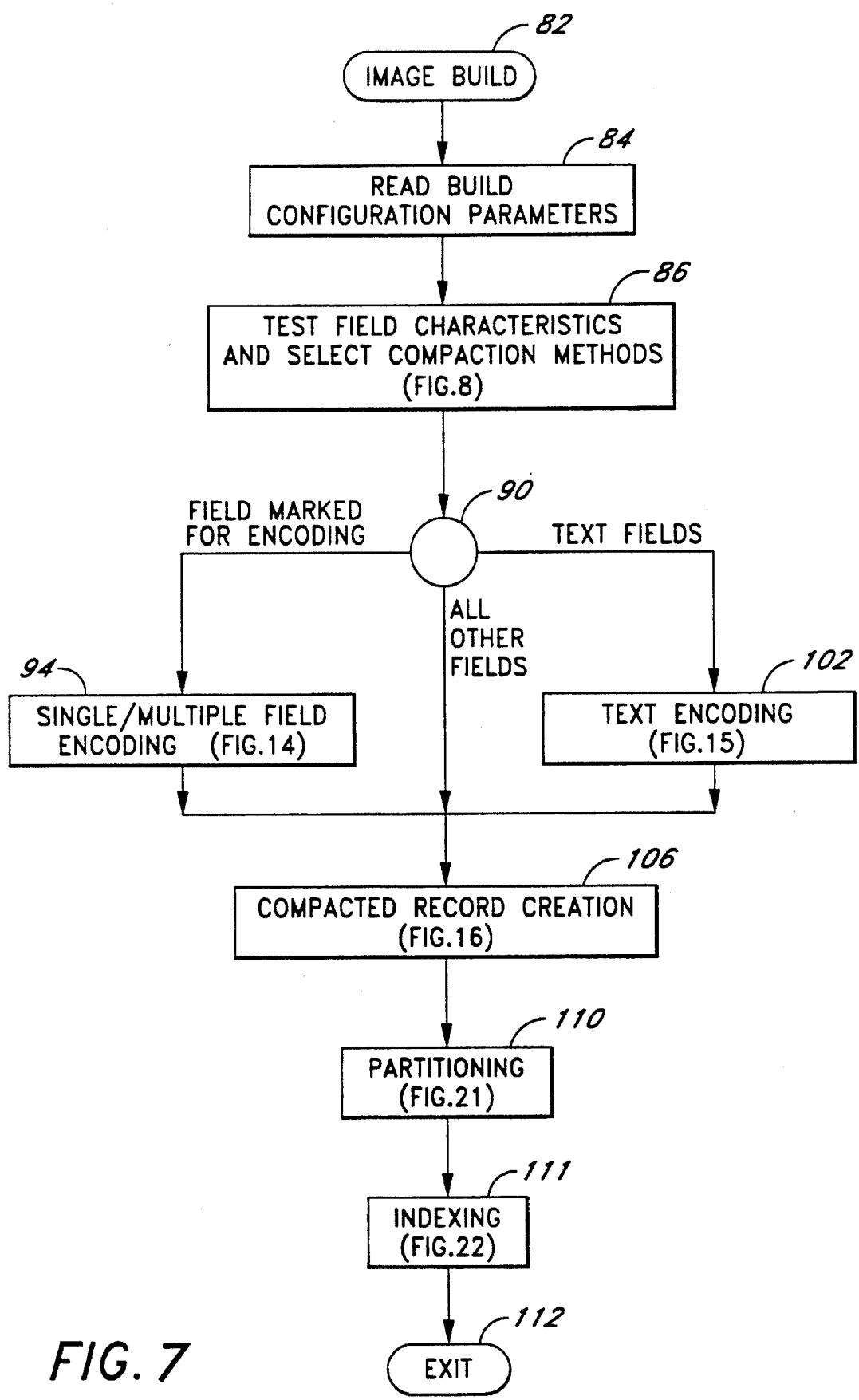
FIG. 7 is a top-level flowchart of a database image build process in accordance with a preferred embodiment of the invention.

As shown in FIG. 7, the database image build 82 begins by reading the build configuration parameters 84 and then testing field characteristics and selecting compaction methods 86. Then, translation tables are created 90 for fields marked for encoding 94 or fields marked for text compression 102. Next, compacted records are created 106 and grouped into partitions 110 to form the database image. The final build step creates an access structure for the database image by indexing 111, completing the build process 112.

Figure 8:
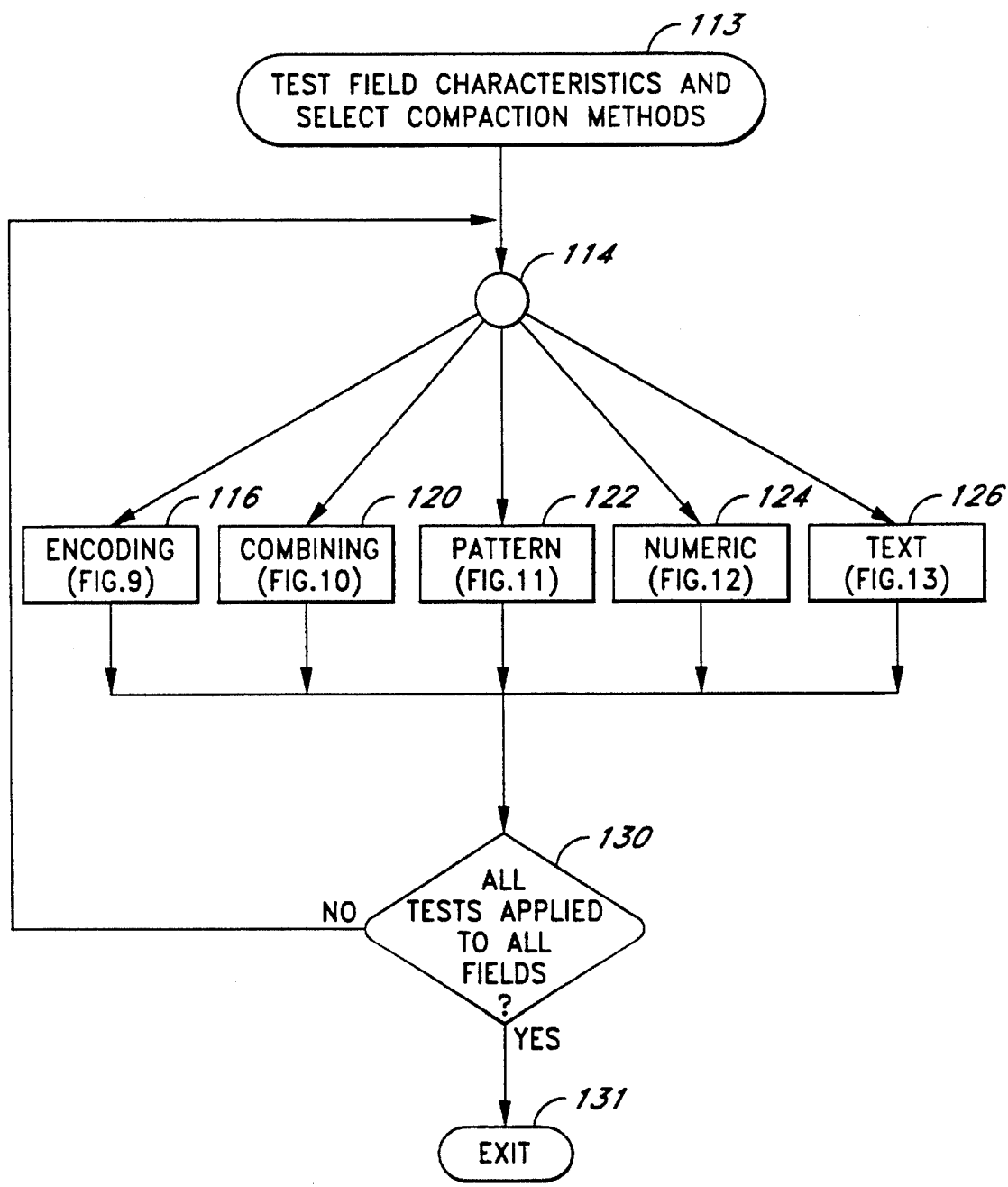
FIG. 8 is a top-level flowchart of a preferred field characteristic test process used to determine which fields are amenable to particular compaction methods.

Referring to FIG. 8, the field characteristic test process begins by selecting one of five tests 114. Each of the five tests, encoding 116, combining 120, pattern 122, numeric 124 and text 126 correspond to the five compaction methods. For each test, the field characteristics for the specific compaction method are calculated, these characteristics are compared with the applicable compaction criteria and the fields satisfying the criteria are marked for compaction by that method. The encoding test 116 determines which fields have data values which can feasibly be replaced by a code. The combining test 120 determines which encoded fields are sufficiently related with other fields to be combined into a single field. The pattern test 122 determines which fields contain one or more patterns which can be removed from the data values containing patterns. The numeric test 124 determines which fields contain mostly numeric data and the text test 126 determines which fields contain text which can be compressed. After it is determined that all tests have been performed on all fields 130, the field characteristic test procedure is finished 131.

Single-field encoding substitutes a numeric code for each data value in a particular field, with shorter-length codes substituted for the most frequently occurring data values. For ease of description, the records containing each data value of a field can be envisioned as being sorted into cubbyholes or "slots," where there is a slot allocated for each different data value occurring in the field. A record is envisioned as being placed in a slot if the record contains the data value associated with that slot. The single-field encoding method can then be described as assigning a numeric equivalent to these slots, representing the numeric equivalent with a unique binary code and substituting the code for the data value in every record contained in the slot. A translation table is constructed which equates data values with numeric equivalents.

Single-field encoding is performed on a field if the field's characteristic satisfies the encoding criterion. The relevant field characteristic for single field encoding is the number of slots, or different data values, in the field. The corresponding criterion to satisfy is a maximum allowed number of slots. There is a translation table entry for each unique code assigned to each slot and the single-field encoding criterion ensures that storage overhead resulting from translation table size does not cancel the compaction benefit from encoding.

FIG. 1C illustrates, by example, the concept of slots, records contained in slots and numeric equivalents. In FIG. 1C, the table "EID_WRK_ASSGN" has a field "WO" containing work order codes. The records for work orders from BC00009 through BC00014, BR00015 and BR00016 are included in this figure. There are four records in the slot BC00012, three records each in slots BC00011 and BR00015, and two records each in slots BC00009, BC00010, BC00013, BC00014, and BR00016. A numeric equivalent is sequentially assigned to each slot in decreasing order of the number of records in a slot. Assuming the sample shown in FIG. 1C of the EID_WRK_ASSGN table represents all records, the resulting translation table would be as shown in FIG. 1F. To complete the single-field encoding process, these numeric equivalents would be represented with binary codes. Shorter-length codes could be used to represent the smaller value numeric equivalents.

In the example, when a sufficient number of records are associated with work orders, the entries in the WO field can be replaced with an equivalent binary code. The condition where many employees are assigned to work on a specific job is common in several industries. Thus, in practice, the number of records in these work order slots could be significantly higher than demonstrated in FIG. 1C, as denoted by the dashed line at the bottom of the table. In such cases, replacement of the work order value in the EID_WRK_ASSGN table with a binary code is justified.

If a database is logically represented as multiple, interrelated database tables, the translation table for a field which is common to several database tables can be handled in a variety of ways. The field may have a translation table for each occurrence in a database table, a single translation table which covers all occurrences or a few translation tables, some of which are multiply used by several database tables. Multiple-usage depends on a given translation table meeting the criteria for several database tables.

For single-field encoding, the relevant field characteristic, as shown in FIG. 6, is the number of different data values, or slots, in the field. Also shown in FIG. 6 is the compaction criteria for single-field encoding, which is the maximum allowed number of slots. This criteria limits the number of entries in the corresponding translation table. In a preferred embodiment, this maximum equals $C_1 \times (\text{number of records})^k$, k<1, where $C_1$ is a build configuration parameter. With this criteria, the translation table size grows with larger databases, but not in direct proportion to the size of the database. In the most preferred embodiment, $C_1$ equals 31.623 and k=0.5. This value sets the translation table size for a 100,000 record database to 10,000 entries or 10 percent of the total number of database records. For a 100 million record database, the translation table size would be 316,228 entries or 0.3 percent of the database size. In a preferred embodiment, $C_1$ is in the range of 10 to 100, and k is in the range of 0.25 to 0.75. Other values for the build configuration parameter $C_1$ and k can be used in this formula, and other completely different formulas can be used to achieve different tradeoffs. For example, the single-field encoding criterion might be made proportional to the number of bytes in system RAM, where the translation tables would normally reside. As another example, this criterion might be made dependent on the number of fields in the database. One of ordinary skill in the art will recognize that the criteria design for single field encoding may be modified in a number of ways, dependent on the particular system resources and the particular application.

Figure 9:
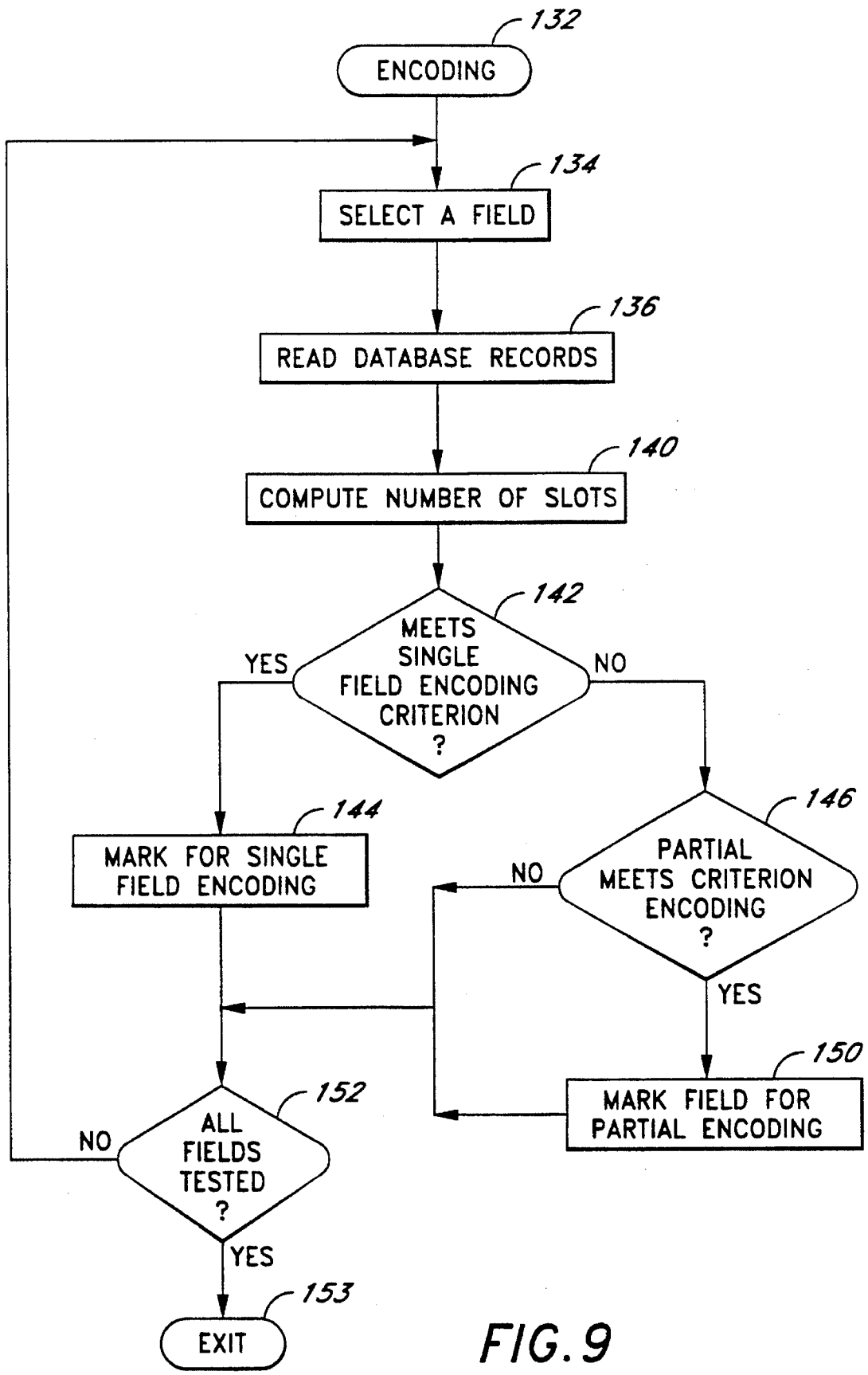
FIG. 9 is a detailed flowchart of a preferred field characteristic test pertaining to the single-field encoding compaction method.

As shown in FIG. 9, the encoding test 132 begins by selecting a particular field 134, reading the data values from the database records 136 and computing the number of slots 140, that is, the number of different data values in the field. At this point, the field characteristic for the single-field encoding method has been determined. This characteristic is compared to the criterion 142, a maximum. If the number of slots is less than this maximum, then this field is marked for encoding 144. Otherwise, the field is rejected for this compaction method. If a field is rejected for single-field encoding, it is tested to see if the partial encoding criterion is met 146. If so, the field is marked for partial encoding 150. When all fields are tested in this manner 152, the encoding test process is complete 153.

Partial encoding associates codes for most of a field's data values and leaves the remaining data values unencoded. Partial encoding is feasible if the largest slots, those containing the most records, account for a significant portion of the total number of records in the database. Hence, the field characteristic for partial encoding, as shown in FIG. 6, is the total number of records contained in the first $C_2$ largest slots. In a preferred embodiment, $C_2$ is 256. This value of $C_2$ is chosen because a one byte code can then be associated with these largest slots. Also shown in FIG. 6 is the partial encoding criterion, a minimum number of records. In a preferred embodiment, this criterion is $C_3 \times$(total number of records in the database). That is, the $C_2$ largest slots in a field must contain a minimum fraction, $C_3$, of all records in the database. In a preferred embodiment, $C_3$ is 0.33. This value is chosen because one-third is a large enough fraction of the database to make partial encoding overall worthwhile. Other values for $C_2$ and $C_3$ can be used. For example, $C_2$ can be set to 512. Then the first and second bytes of the single-byte code could be used for encoding. Thus, using the same one-byte code length and using only a 512 entry translation table, the likelihood that a field is partially encoded is increased. Another example which increases the likelihood that a field rejected for encoding would be partially encoded is to lower $C_3$ to 0.25. Then the $C_2$ largest slots would only have to contain one fourth of the total database records. For a large database, this may still result in significant compaction. The partial encoding criterion need not be a constant. For example, the criterion may be made proportional to: (total number of database records)$^{1/2}$. In this manner, the total number of partially encoded records does not have to increase in direct proportion to the database size. As noted above with respect to the single-field encoding criterion, one of ordinary skill in the art will recognize other values for $C_2$ and $C_3$, other characteristics and other criteria may be chosen to achieve other system tradeoffs.

The multiple-field combining method creates a single field from two or more fields by substitution of a numeric code for each data value combination occurring in two or more fields within the same record. Shorter-length codes are substituted for the most frequently occurring data value combinations. For ease of description, the records containing each data value combination can be envisioned as being sorted into slots, where there is a slot allocated for each different data value combination occurring in the same record, within the fields to be combined. The multiple-field combining method can then be described as assigning a code to each slot and substituting the slot code into every record contained in the slot. Combining fields, however, may result in so many different slots that the combined field cannot practically be encoded. The tradeoff involved is similar to that for single-field encoding discussed above—compaction benefit versus the storage penalty due to the translation table.

Potentially, the number of different slots from two fields is the smaller of: (1) the product of the number of slots for each individual field; or (2) the total number of records in the database. Combining two or more fields into one compacted field, however, is practical if these fields are sufficiently related. Fields are related, in this context, when there is a relatively limited number of different data value combinations or slots for these fields. For example, in a database consisting of the physical characteristics of individual persons, "Height" and "Weight" might be two fields, consisting of the recorded individual heights and weights, respectively. The possible combinations of recorded height and weight are numerous. However, there is a strong relationship between height and weight. It is unlikely that there are any individuals in the slot "5 feet tall, 200 pounds" or the slot "6 feet tall, 90 pounds." Therefore, if these fields were combined into a field "Height/Weight," the resulting number of slots is likely to be such that an individual's recorded height and weight could be represented by a single code. In a preferred embodiment of the present invention, the field characteristics used to determine if two fields are sufficiently related to combine are based on record per slot statistics. Specifically, the characteristics for a field combination are the mean, $\mu$, and the standard deviation, $\sigma$, of the number of records per slot. The corresponding criteria are: $\mu > \theta/2$; $\mu + \sigma > \theta$; and $\mu > \sigma$, where the threshold $\theta$ is a function of database size. Together, these three criteria restrict the distribution of records per slot. Field pairs are only combined if the greatest concentration of records in the fewest slots result. This simplifies coding because shorter codes are used for the largest slots, as noted below. The multiple-field combination characteristics are tested two fields at a time, for all possible field pairs in the database. However, overlapping field pairs may satisfy the criteria, so a figure-of-merit is used to decide which of these field pairs to combine. The figure-of-merit, $\Gamma = \mu + \sigma$, is a measure of the concentration of records per slot and is computed for each field pair which satisfies the criteria. Pairs having the largest $\Gamma$ are combined, maximizing the total $\Gamma$. After fields are combined, repeated "passes" must be made to determine if these new combined fields can be combined with other fields.

For multiple-field combination, a pair of fields would be combined and encoded as a single field if the number of records per slot for the two fields is sufficiently concentrated. Unfortunately, it is impractical to simply determine the number of different data value pairs, or slots, for every pair of fields in the database and then compute the number of records per slot. There are many combinations of field pairs to consider in even a small database. For example, at least 7 of the 12 fields of the EMPLOYEE_INFO table shown in FIG. 1 demonstrate properties which often result in single-field encoding. There are $N!/(n!(N-n)!)$ different combinations of N items taken n items at a time. Hence, for 7 fields taken 2 at a time, there are $7!/(2!5!)=21$ unique field pairs. This means 21 characteristic tests for the first pass alone. Subsequent passes treat a field pair satisfying the criteria as a single field. All field pairs are re-tested, where a field "pair" would be either two single fields; a single field and a combination field; or two combination fields. These passes continue until no more field pairs satisfy the combining criteria. The straightforward computation of records per slot would involve a very large amount of computer processing time. Instead, a preferred embodiment of this invention uses statistical field characteristics derived from a sample of the database, rather than performing direct computations on the entire database.

A sample database is a subset of the records contained in the full database. One method of sampling is to only process every Mth record of the full database, where M is the sample interval. This uniform sampling of the full database has a disadvantage in that a single event may be responsible for a number of contiguous records in the database. In a preferred embodiment, in order to provide a good statistical sample of the full database, staggered sampling is performed. For staggered sampling, the requirement is that the average sample interval, $\lambda$, equals M. For example, if M is 16, then the number of records skipped might be the repeating sequence 1, 2, 4, 7, 14, 28, 56, 1, 2, 4, 7, 14, 28, 56, . . . . The average number of records skipped is (1+2+4+7+14+28+56)/7=16. The average sample interval, $\lambda$, is defined as: Int[(number of records)/sample size]; where Int[ ] is the largest integer less than the quantity inside the brackets [ ]. Sample size is the number of records in the sample database. In a preferred embodiment, as shown in FIG. 6, the sample size is $C_4 \times$(number of records)$^{1/2}$, where $C_4$ is a build configuration parameter. The sample size grows with larger databases, but not in direct proportion to the size of the database. In a preferred embodiment, $C_4$=31.623. This value sets the sample size for a 100,000 record database to 10,000 sample records, corresponding to 10 percent of the total number of records in the database. For a 100 million record database, the sample size is 316,228 sample records, corresponding to 0.3 percent of the total number of records in the database.

As shown in FIG. 6, the field characteristics for the multiple-field combination method are the mean, $\mu$, and standard deviation, $\sigma$, of the number of records per slot for a field pair. The criteria, also shown in FIG. 6, are: $\mu > \theta/2$; $\mu + \sigma > \theta$; $\mu > \sigma$, where $\theta$ is a specified minimum threshold. Also as shown in FIG. 6, the figure-of-merit for deciding between field combination choices is $\Gamma = \mu + \sigma$. In this embodiment, $\mu$ is projected from the sample mean, $\mu_s$, and $\sigma$ is projected from the sample standard deviation, $\sigma_s$: $\mu = \mu_s \times \lambda$; $\sigma = \sigma_s \times (\lambda)^{1/2}$. These projections hold true for slot distributions satisfying the criteria above.

In a preferred embodiment, as shown in FIG. 6, $\theta = C_5 \times$(number of records)$^k$; k<1. If the relative distribution of records per slot remains constant as the database size increases, the average records per slot will increase proportionally. In this embodiment, however, the threshold, and hence the mean records per slot, does not increase in direct proportion with database size. Thus, for larger databases, a wider distribution of records per slot is allowed. This is analogous to single-field encoding where a preferred embodiment allows the translation table to increase somewhat with larger databases. Here, a wider allowed distribution of records per slot implies the percentage of records encoded with the shortest codes is allowed to decrease somewhat with larger databases. For the most preferred embodiment, k=0.75 and $C_5=(1/1000)^k$. For a database ranging in size from 100,000 to 100,000,000 records, this results in $\theta$ ranging from about 30 to about 5,000 records per slot. In a preferred embodiment, $C_5$ is in the range of 0.001 to 0.01 and k is in the range of 0.5 to 0.99. Other values of $C_5$ can be chosen to allow fewer or greater numbers of field combinations and hence greater or fewer records per slot. The dependency of record distribution per slot on database size can be altered with other values of k. Also, other functionally different criteria might be chosen. For example, if $\mu > \sigma$ and $\mu > \theta/2$, the number of sample database slots is a good projection of the number of database slots. Fields also could be combined based on minimization of the number of database slots rather than maximization of the figure-of-merit $\Gamma$. This would result in control over the translation table size, as in single-field encoding, rather than control over the concentration of records per slot. One of ordinary skill in the art will recognize that the parameters and criteria disclosed above for multiple-field combination may be modified in a number of ways to achieve various tradeoffs for specific database applications.

As shown in FIG. 10, the combining test 154 begins by selecting a pair of fields marked for single-field encoding 156. Then the database is read by sampling 160, that is, skipping an average of $\lambda$ records at a time, where $\lambda$, the sample interval, is given in FIG. 6. Next, the sample mean, standard deviation and figure of merit $\mu_s$, $\sigma_s$ and $\Gamma$ for this field pair are computed 162 using the formulas of FIG. 6. If these characteristics meet the combining criteria 164, the pair is marked as a candidate for combining 166. Otherwise, the pair is rejected for this translation and another field pair is selected 156. All pairs of fields are tested in this manner 170. When all possible combinations of fields are tested, a list of candidate pairs is sorted in descending values of $\Gamma$ 172. By first sorting all candidate pairs by $\Gamma$, the most favorable pair combinations can be made. To do this, all fields are initially set as being available for combining 174. The sorted list is read 176 beginning with the candidate pair having the largest $\Gamma$. If both fields are available for combining 180, the candidate pair is marked for combining and both fields are marked as hereafter unavailable 182. If either or both fields are unavailable, the candidate pair is not marked for combining and the availability status of the fields is unchanged. If all entries in the list have not been processed 184, the next candidate pair from the sorted list is selected for combining 176. All candidate pairs are processed in this fashion. If any candidate pairs were marked for combining 186, fields marked for combination are combined as a new field 190, and a new pass is started 156. Further passes are initiated until no new pairs are marked for combining 192. In this manner, two or more fields can eventually be combined into a single field. The field combination table is then created by listing the groups of fields which are part of each combination. The sorted list of $\Gamma$ values for each pass can be printed and would provide insight into database field relationships which might otherwise be unknown or unsuspected.

Pattern suppression compaction is a feasible method to apply to fields that have not been encoded and that at least have single-position patterns, that is, the same characters occurring in the same character positions for many records. A field is first tested for single-position patterns in each character position of the field. Then a field is tested for multiple-position patterns, that is, combinations of single-position patterns occurring together in many records.

The characteristics for pattern suppression, shown in FIG. 6, are: the "per character percentage," which is the percentage of record occurrences for each of the $C_6$ most frequently occurring single-position patterns; the "single-position pattern determination percentage," which is the total percentage of record occurrences for all of the $C_6$ most frequently occurring single-position patterns; and the "multiple-position pattern determination percentage," which is the percentage of record occurrences for combinations of single-position patterns. The first two characteristics are determined for each character position of a field for single-position patterns. The last characteristic is determined for each different multiple-position (multi-position) pattern which occurs in a record. The corresponding compaction criteria, also given in FIG. 6, are the specified minimums, $C_7$, $C_8$ and $C_9$, for these three percentages, respectively. $C_6$ through $C_9$ are build configuration parameters.

Characters meeting the criteria for a single-position pattern are stored as a single-position pattern and are also considered for multiple-position pattern formation. In the most preferred embodiment, $C_6=4$, $C_7=10\%$ and $C_8=50\%$. That is, only the 4 most frequently occurring characters in each position are considered for pattern determination, and each of these characters must occur in at least 10% of the records. The characters satisfying the first criterion together must occur in 50% of the records to be stored as a pattern. As an example, in the work order field WO of the WORK_ORDER_INFO table, FIG. 1B, in the first character position, "A" occurs in 26.7 percent, "B" occurs in 53.3 percent and "Q" in 13.3 percent of the records for a total percentage of 93.3 percent of the records. Hence, the values "A", "B" and "Q" in the first character position each satisfy the 10% per character percentage and in total satisfy the 50% pattern determination percentage. The character "R" occurs in the second character position in more than 50 percent of the records, thus satisfying both criteria. The value in the third character position is always a "0," also satisfying both criteria. No values in any other character position meet the single-position pattern suppression criteria. Hence "A", "B" and "Q" are the single-character pattern values for column 1, "R" is the single-character pattern value for column 2 and "0" is the single-character pattern value for column 3.

A combination of single-position pattern characters might be a multiple-position pattern. Each of these character combinations must occur in a minimum $C_9$ percentage of the records. In the most preferred embodiment, $C_9=10\%$.

Continuing the example from above, the percentage of occurrences determined for all multiple-position patterns for the work order WO field in the WORK_ORDER_INFO table is shown in FIG. 1G. The patterns which have multiple-position pattern percentages greater than 10 percent are advantageously stored as multiple-position patterns. These patterns are "AR0," "BR0," and "B_0," where the "_" refers to any character value. Note that the combinations "AR_," "BR_" and "QR_" do not exist because 0 always occurs in the third character position.

Combinations of single-position pattern characters which are rejected as not satisfying the multiple-position pattern criterion, can be used as component combinations to create a new combination which does satisfy the criterion. A new combination is formed by intersecting two or more component combinations, such that the new combination contains the columns and values that the component combinations have in common, with the new combination's multiple-position pattern percentage being the sum of the component combination's multiple-position pattern percentages. These new combinations are tested to determine if the multiple-position pattern criterion is satisfied. Testing is started by considering the component combinations that result in new combinations with the most characters. Testing continues, considering component combinations that result in new combinations with fewer numbers of characters, until all possible intersections of component combinations greater than a single character are considered. Note that the number of characters in a combination is defined as the number of single-position pattern characters which compose the combination. Thus, for example, "B_0" is a two character combination.

When component combinations create a new acceptable multiple-position pattern, the components cannot be used to intersect with other components. If two new combinations exist with the same number of characters and they contain one or more component combinations in common, the new combination with the largest multiple-position pattern percentage is saved. Acceptability of a multiple-position pattern formed by intersecting component combinations is the same as for a multiple-position pattern formed directly from combinations of single-position patterns. The multiple-position pattern percentage must be greater than $C_9$ percentage of all records. In the most preferred embodiment, $C_9=10\%$.

Continuing the example from FIG. 1G, the component combinations from rejected single-position pattern combinations are "_R0," "A_0," "QR0" and "Q_0.". Of all possible intersections of these components, only the intersections of components "_R0" with "QR0" and "Q_0" with "QR0" create new combinations with more than a single character. The pattern "_R0," composed of "_R0" and "QR0," has a multiple-position pattern percentage of 6+7= 13 percent, while the pattern "Q_0," composed of "Q_0" and "QR0" has a multiple-position percentage of 5+7=12 percent. Thus "_R0" is saved as an additional multiple-position pattern. FIG. 1H summarizes the patterns which are accepted for pattern suppression in this example. A data value is tested for the existence of a pattern by comparing it first with patterns containing the most characters. FIG. 1H is presented in this order, that is by descending number of characters. The single-position pattern value "Q" in FIG. 1H has been maintained because it was not used in any multiple-position pattern. This pattern could be discarded because its percentage is less than the per character percentage $C_7$. For this example, FIG. 1I illustrates how the records shown in the WORK_ORDER_INFO table of FIG. 1B are affected by pattern suppression compaction.

$C_6$ through $C_9$ are chosen as a tradeoff between the storage savings achieved by pattern suppression and the penalty of compacted record complexity. This record complexity is due to the number of subpartitions (different type byte values within a partition) and partitions created by pattern suppression. Each removed pattern must be noted by a different type byte, and pattern removal causes variations in record length which may generate additional partitions. Hence, these constants are chosen to reject patterns unless they are prevalent. In a preferred embodiment, the $C_6$ is in the range of 3 to 5, $C_7$ is in the range of 5% to 20%, $C_8$ is in the range of 40 to 60% and $C_9$ is in the range of 5 to 20%. Other values for these parameters, however, can be used to increase or decrease the number of patterns recognized. Alternatively, the pattern suppression criteria might be made dependent on specific system or database characteristics, such as the number of fields or number of records. One of ordinary skill in the art will recognize that the criteria and parameters disclosed above may be modified in a variety of ways.

During the pattern test, a field is also tested for the existence of a numeric pattern. A numeric pattern exists when at least two positions in the field have digits for all records. A number is formed by combining these positions and this "numeric pattern" is converted to its binary equivalent. Positions do not have to be adjacent for a numeric pattern to be identified. The binary equivalent of a numeric pattern is stored with the original form of the remaining positions. For example, suppose the first, third and fifth positions in a field are all digits, and a record contains the data value 8a4x1npq for the field. The number 841 would be converted to its binary equivalent and stored with axnpq as the field's data value for that record.

The presence of an alphanumeric "wild card" character in any position in the pattern table for a field indicates that numeric values occupy all other positions within the field which are not included in the pattern table. For example, if positions 6, 7 and 9 of a particular pattern in a pattern table are shown as wild cards, and no other characters are included in that particular pattern, then the first three bytes of a compacted data value with this pattern are the character values (e.g. in ASCII format) for positions 6, 7 and 9. The remaining portion of the compacted data value is a binary number, which when translated to ASCII yields the numeric characters which occupy all other positions of the uncompacted data value. Using FIG. 23I as another example, if the position 2 value of pattern number 3 was a wild card (rather than blank as shown), all compacted data values with this pattern number would have "B" and "0" suppressed from positions 1 and 3. Also, the first byte of the compacted data value would be the character in position 2 of the uncompacted data value. The remainder of the compacted data value would be the binary equivalent of the numeric characters in the remaining positions of the uncompacted data value.

As inferred above, a numeric pattern may be combined with single-position or multi-position patterns or may exist by itself. Also, numeric pattern conversion differs from the numeric substitution compaction method in that numeric substitution applies to every position in a field. Note that a numeric pattern is also distinguished from a single-position or multi-position pattern containing a digit, where a digit is treated like any other character. That is, a digit which frequently occurs in a position that is not all digits may be a single-position pattern or part of a multiple-position pattern. Whereas a numeric pattern only requires two or more positions of all digits.

FIG. 1I illustrates numeric pattern conversion applied to the work order "WO" field of the WORK_ORDER_INFO table of FIG. 1B. The third column of the table shows that the third through sixth positions of the WO field, after pattern suppression, comprise a numeric pattern. The fourth column of the table shows the data values that are not part of the numeric pattern. Each number associated with the numeric pattern is converted to its binary equivalent and stored with the remaining data values shown in the fourth column. Although the preferred embodiment of numeric pattern conversion requires that a position considered as part of the numeric pattern must contain all digits in all records, one of ordinary skill in the art will recognize that the same concept will work if less than all records contain digits in the positions considered as part of the numeric pattern. In that case, only those records containing the numeric pattern would be converted.

Figure 11:
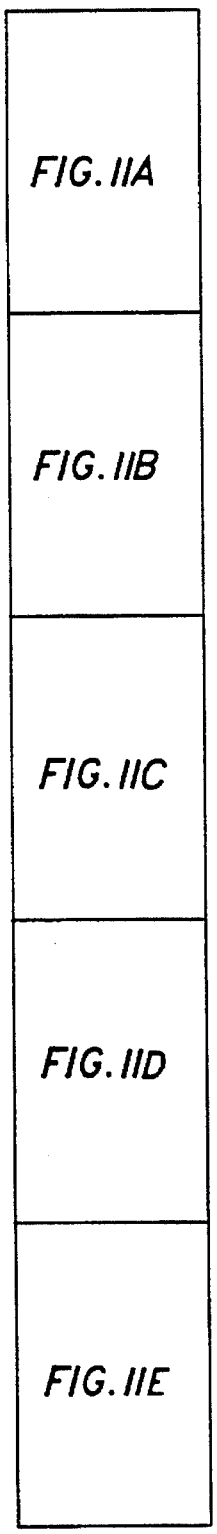
FIG. 11 comprising views shown in FIGS. 11A–E show a detailed flowchart of a preferred field characteristic test pertaining to the pattern suppression compaction method.
Figure 11B:
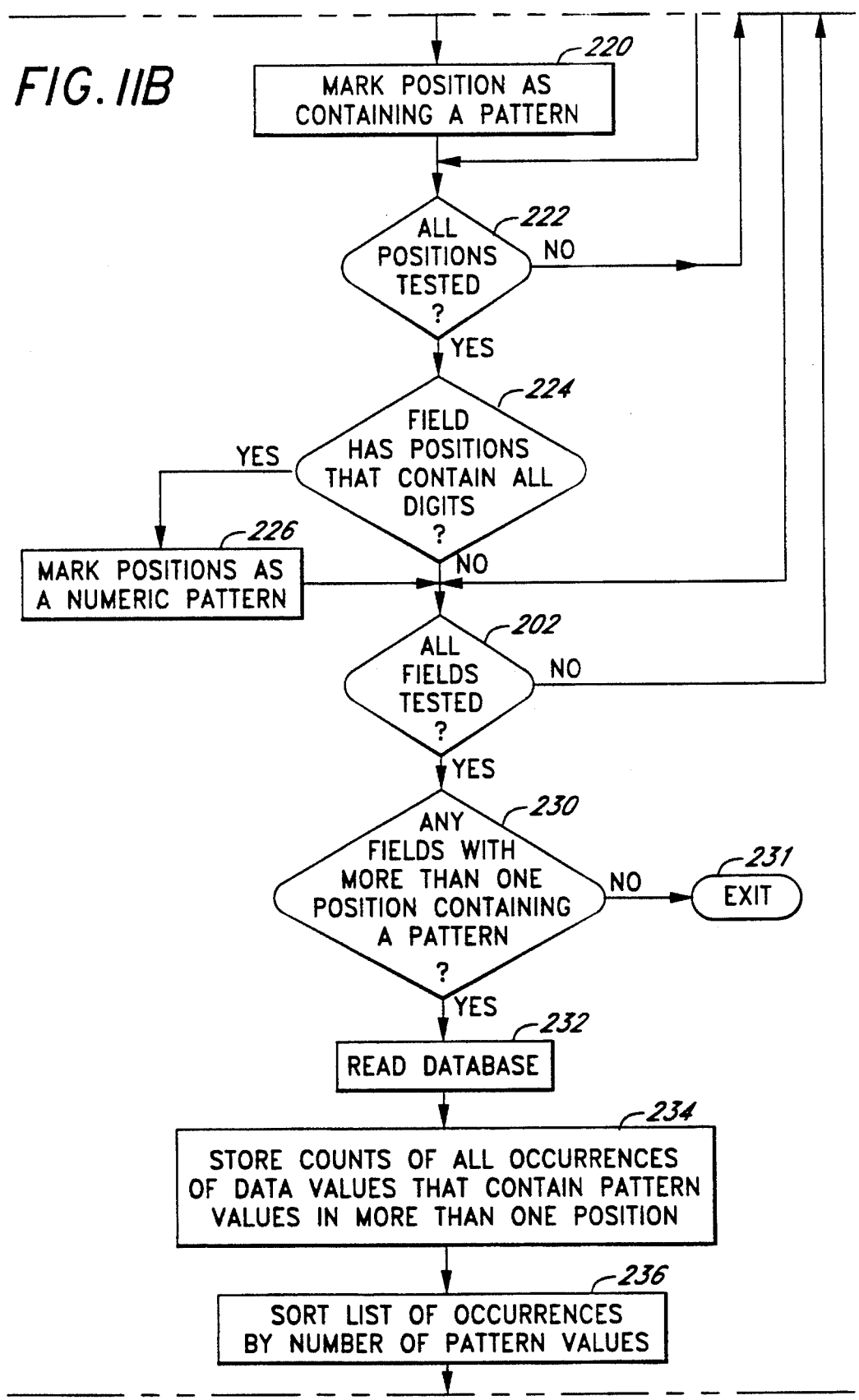
Figure 11C:
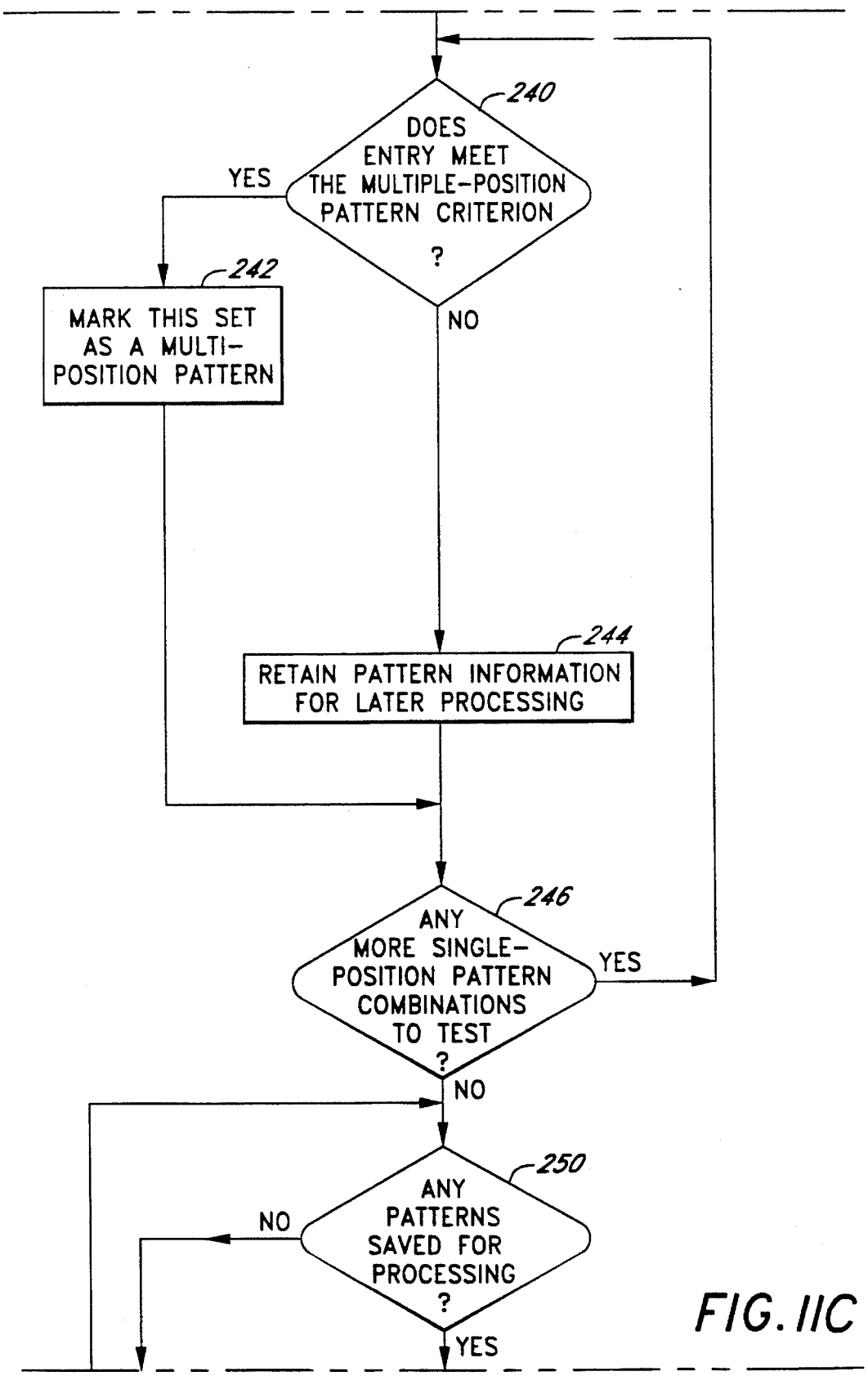
Figure 11D:
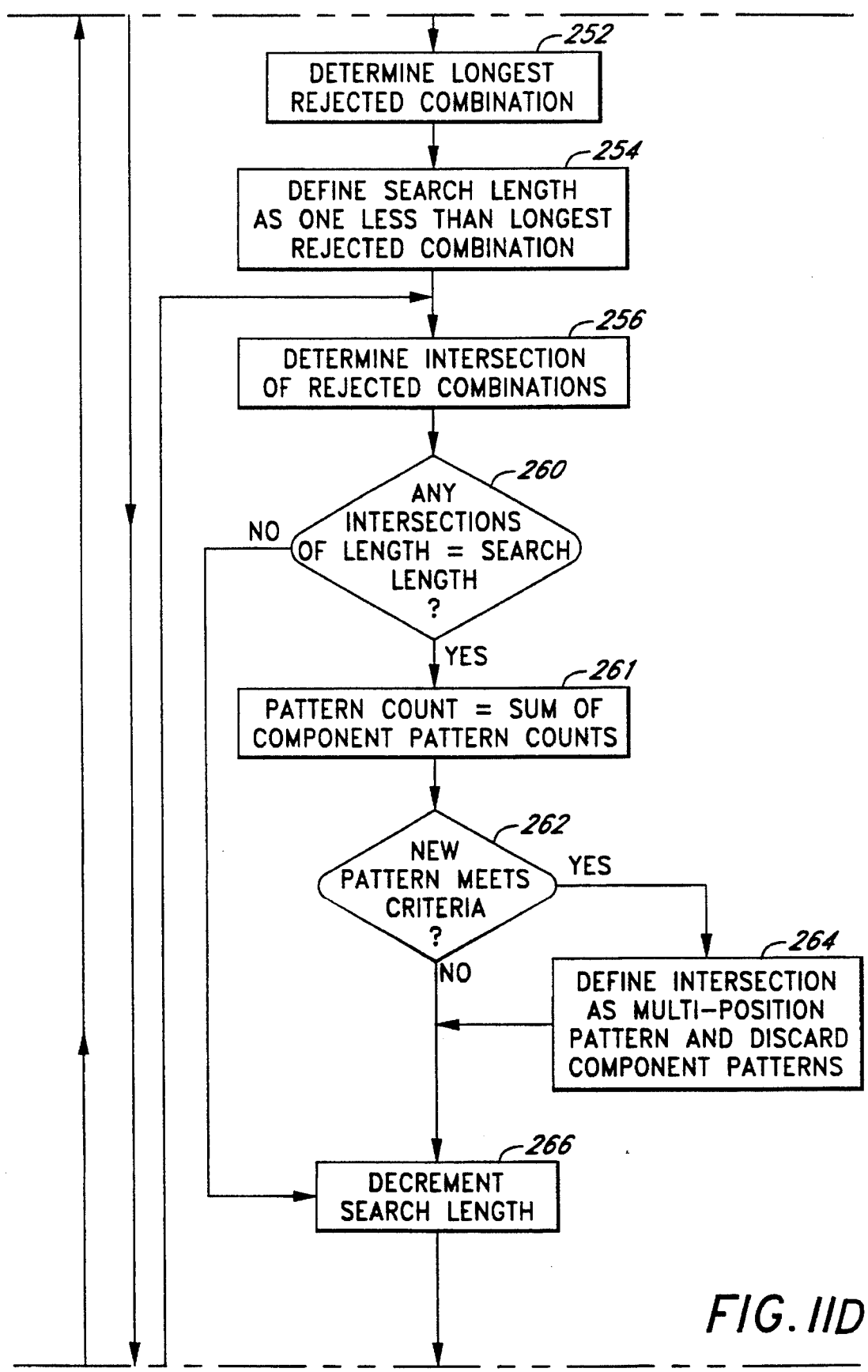

As shown in FIG. 11, for the pattern test 194, a field is selected 196 and checked to determine if it is marked for encoding 200. If so, pattern suppression is inapplicable, and if all fields have not been tested 202 another field is selected 196. If the field is not to be encoded, the database records are read for this field 204. Next, all character positions are scanned for pattern characters. This is done by first selecting a particular position within the field 206, and then counting the number of occurrences of each character in that position 210. For a particular position, the $C_6$ most frequently occurring characters are identified 212. The field characteristics for that position are determined next by computing the per character percentage and pattern determination percentage 214. It is determined whether any of these characters satisfy the per character criterion 216, and if so, it is determined if the pattern determination criterion is satisfied 218. If the position satisfies both criteria, the position is marked as containing a pattern 220. All positions are tested in this fashion 222. If at least two positions are all digits 224, these positions are marked as a numeric pattern 226. After all fields are tested in this manner 202, the multiple-position test is begun.

Continuing with FIG. 11, the multiple-position test starts by selecting a field which contains more than one single-position pattern 230. If there are none, the process ends 231. Otherwise, the database records are read 232. The number of occurrences of each different combination of single-position patterns which occur together in a record is determined for the field 234. These combinations are sorted by length 236, where the length is the number of single-position patterns in the combination. Going down the list from the longest to shortest combination, each combination is compared with the multiple-position pattern determination criterion 240. If a combination satisfies the criterion, then it is marked as a multi-position pattern 242. If a combination does not satisfy the criterion, it is nevertheless retained for further processing 244. All occurring combinations are tested in this manner 246. Combinations which did not satisfy the pattern determination criterion 250 are intersected with other rejected combinations to see if there is a smaller common pattern which meets the pattern determination criterion. First, the longest rejected combination is determined 252, and a search length for intersection patterns is initialized at one less than the longest rejected combination 254. A search is made for a pattern in common with two or more component combinations equal to the search length 256. If any intersections of this length are found 260, then the occurrence count of each rejected component combination is added 261 and the total is compared with the multiple-position pattern determination criterion 262. If this intersection combination satisfies the criterion, the component combinations are discarded and the intersection is saved as a multi-position pattern 264. Otherwise, the search length is reduced by one 266. Until all component combinations have been considered 270, the intersection searches continue 256. All fields with more than one single-position pattern are processed in this fashion 272. For each field, the identified multi-position patterns and the single-position patterns which are not part of a multi-position pattern are stored in each field's pattern table and assigned a pattern number.

A field which cannot be encoded might be compacted by numeric substitution. Numeric substitution is applied on fields in which most of the values are numeric. The numeric values of these fields are encoded with the binary rather than the character string representation. The remaining values in these fields, those containing values other than digits, are stored in their original character representation. Each digit in a numeric field represented by character strings typically requires a byte of storage. In binary form, however, one byte can represent up to 3 digits (numbers 0 through 255), two bytes can represent up to 5 digits (numbers 0 through 65,536), three bytes can represent up to 8 digits (numbers 0 through 16,774,216), and so on. Hence, there can be considerable compaction by this substitution.

For numeric substitution, unencoded fields with many records containing only numeric character strings would have each of those data values represented by a binary equivalent. The criterion for numeric substitution, shown in FIG. 6, is a minimum $C_{10}$ percentage of records containing all numeric characters. This criterion determines the tradeoff between achievable compaction versus partition complexity. Each character string would be replaced by a 1 to 4 byte number. The type byte at the end of each compacted record must specify the number of bytes substituted by this method. This potentially quadruples the number of subpartitions. However, a 4-byte number can represent the character string 4294199296, which would otherwise require ten bytes (one byte per character). This reduces storage by many bytes per substituted record. In the most preferred embodiment, $C_{10}$ is 90%. That is, at least 90% of the records for a particular field must contain numeric data values before numeric substitution is applied. In a preferred embodiment, $C_{10}$ is in the range of 75% to 100%. Other values for this build configuration parameter are possible, with smaller values of $C_{10}$ allowing this method to be applied to more fields. Alternatively, the criterion may be chosen to vary with specific database or system parameters. For example, the criterion for numeric substitution may be made proportional to the number of fields, because fewer fields would tend to generate fewer subpartitions. One of ordinary skill in the art would recognize other variations in the parameter and criterion for numeric substitution for achieving different tradeoffs. As an example, FIG. 1I shows the records of the WO field of the WORK_ORDER_INFO table of FIG. 1B for which numeric substitution can be applied.

Figure 12:
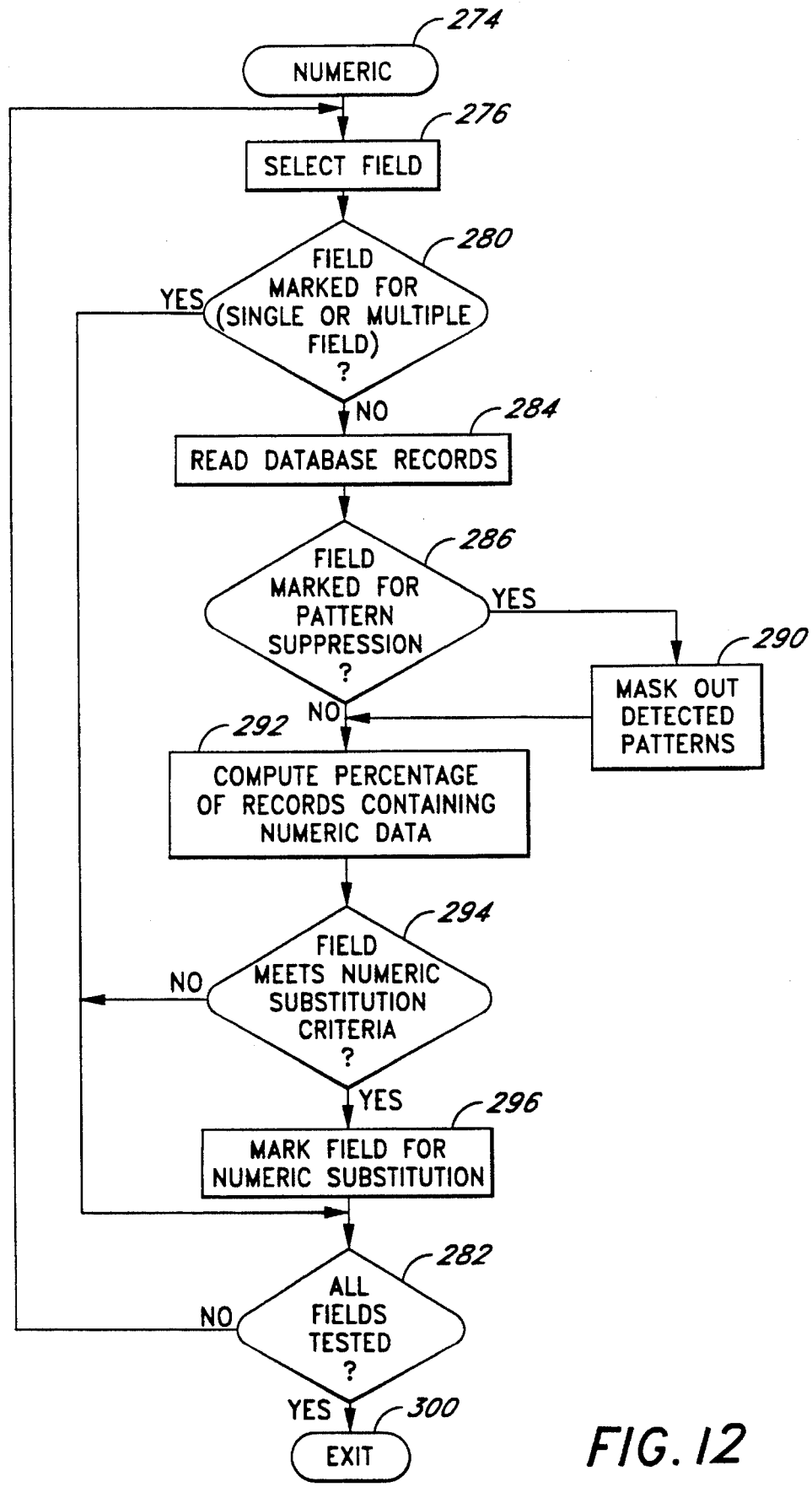
FIG. 12 is a detailed flowchart of a preferred field characteristic test pertaining to the numeric substitution compaction method.

As shown in FIG. 12, for the numeric test 274, a specific field is selected 276, then checked to determine if it is marked for encoding 280. If so, numeric substitution is inapplicable. If all fields have not been tested 282, another field is selected 276. Otherwise, the database records are read for this field 284. If the field is marked for pattern suppression 286, the detected patterns are masked out 290. Next, the field characteristic consisting of the percentage of records containing all numeric data values (after patterns are removed) is computed 292. If this characteristic meets the numeric substitution criteria 294, shown in FIG. 6, the field is marked for numeric substitution 296. When all fields have been tested in this manner 282, the numeric test is complete 300. The mostly numeric table is then created by listing the field numbers of all fields marked for numeric substitution.

Text compression is only applied to text fields. Text fields are unencoded fields containing multiple words of text in most records, with a relatively small number of different words in the field. Specifically, a field is determined as being a text field when at least half of its values contain multiple words and the total number of words is greater than the total number of records. Note that a "word" in this context means any sequence of alphanumeric characters separated from other alphanumeric characters by delimiters, such as spaces, commas, periods, etc. A word could include a sequence of numeric characters, for example. The criterion for text compression, shown in FIG. 6, is a maximum number of different words. The rationale for this criterion is the same as for single-field encoding—a tradeoff between storage savings by compression and storage overhead due to the resulting translation table. In a preferred embodiment, the criterion is $C_{11} \times (\text{number of delimiters})^k$, $k<1$ where delimiters are defined by the user or are, by default, a space, comma, period, slash, dash, colon, semicolon, quotation mark or end-of-line character. A sequence of delimiters is treated as a single delimiter. The number of delimiters is an estimate of the total number of words in the field. Hence, this criterion is analogous to the criterion $C_1 \times (\text{number of records})^k$, $k<1$ used for the single-field encoding method. That is, the translation table size is allowed to grow with the number of words, but is not allowed to grow in direct proportion to the size of the database. In the most preferred embodiment, $C_{11}=63,246$ and $k=0.5$, which yields the result that 100% of a field of 4,000 words can be different words, 6.3% can be different if there are 1,000,000 total words and 0.63% can be different if there are 10,000,000,000 words. In a preferred embodiment, $C_{11}$ is in the range of 10 to 100, and k is in the range of 0.25 to 0.75. One of ordinary skill in the art will recognize that other values of the build configuration parameter can be used in this formula, and different criterion can be used to achieve different tradeoffs.

Figure 13:
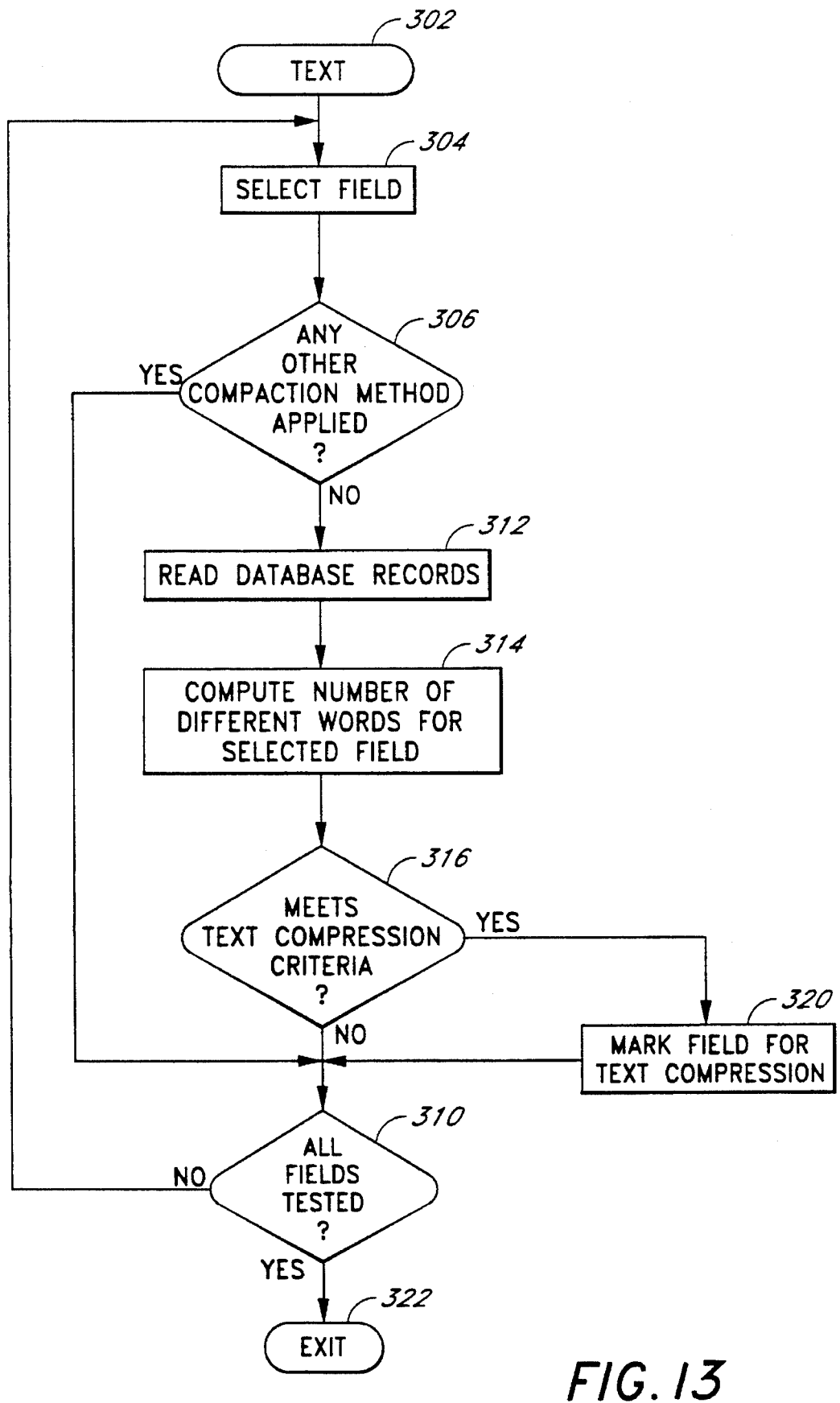
FIG. 13 is a detailed flowchart of a preferred field characteristic test pertaining to the text compression compaction method.

Referring to FIG. 13, the text compression test 302 begins by selecting a particular field 304. Next, it is determined if the field selected is marked for any other compaction method 306. If so, text compression is inapplicable. If all fields have not been tested 310, another field is selected 304. If no other compaction methods have been applied, the records for this field are read 312. The field characteristic tested is the number of different words in the field 314. This characteristic is compared to the text compression criterion 316, shown in FIG. 6. If the criterion is satisfied, this field is marked for text compression 320. Otherwise, the field is not marked, and if all fields have been tested 310, the text compression test is complete 322.

Figure 14:
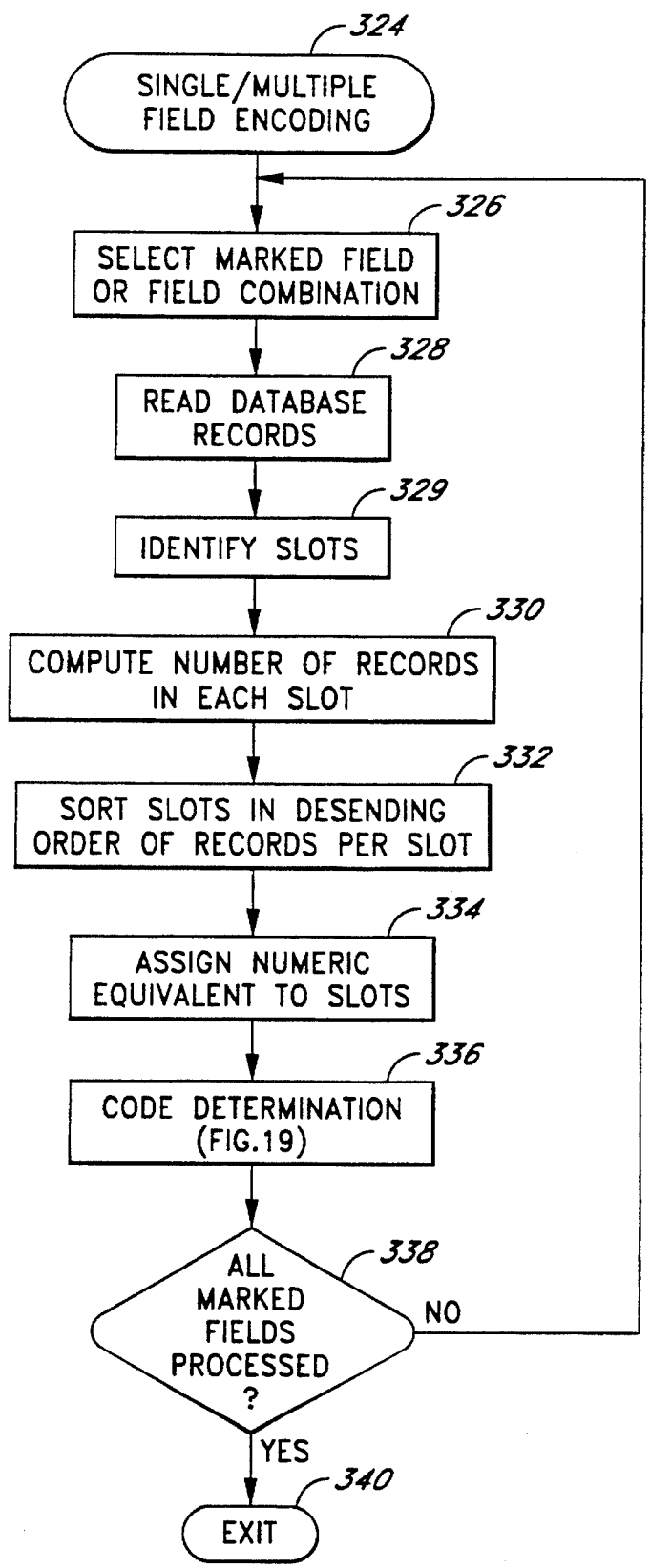
FIG. 14 is a detailed flowchart of a preferred translation table creation process applicable to single-field encoding and to multiple-field combining compaction methods.

Referring back to FIG. 7, after the fields are tested 86 to determine the applicable compaction methods for each field, the next step is selected 90 based on the compaction method marked for a field. Fields marked for single/multiple field encoding are encoded separately 94 from fields marked as text fields 102. All other fields skip the encoding step. As shown in FIG. 14, the single/multiple field encoding process 324 begins by first selecting a field marked for single-field encoding, including partial encoding or a set of fields marked for multiple-field combining 326. Then, the database records are read 328. Next, the slots are identified 329, and the number of records in each slot is determined 330. Slots are each different data value for single-field encoding or each different combination of data values for multiple-field combination. The slots are sorted in descending order by the number of records in each slot 332, with the slot having the most records (the "largest" slot) being first and the slot having the least records (the "smallest" slot) being last. Numbers are then assigned to this sorted list 334 by the position of the slot in the sorted list, with the largest slot assigned the number 0, the second largest slot assigned the number 1, etc. These assigned numbers are the numeric equivalents of the slots. That is, an assigned number can be used to uniquely identify a slot. The steps of identifying the slots 329, computing the number of records per slot 330, sorting the slots 332 and assigning numeric equivalents 334 create a single-field translation table or partial field translation table for a field or a multiple-field translation table for a field combination. The particular integer-byte-length code to use for this field (single-byte code, combination code or variable-byte code) is determined next 336, (see below). If another marked field or field combination exists 338, it is selected 326 and another translation table is created. Otherwise, the translation table creation process is complete 340.

Figure 15B:
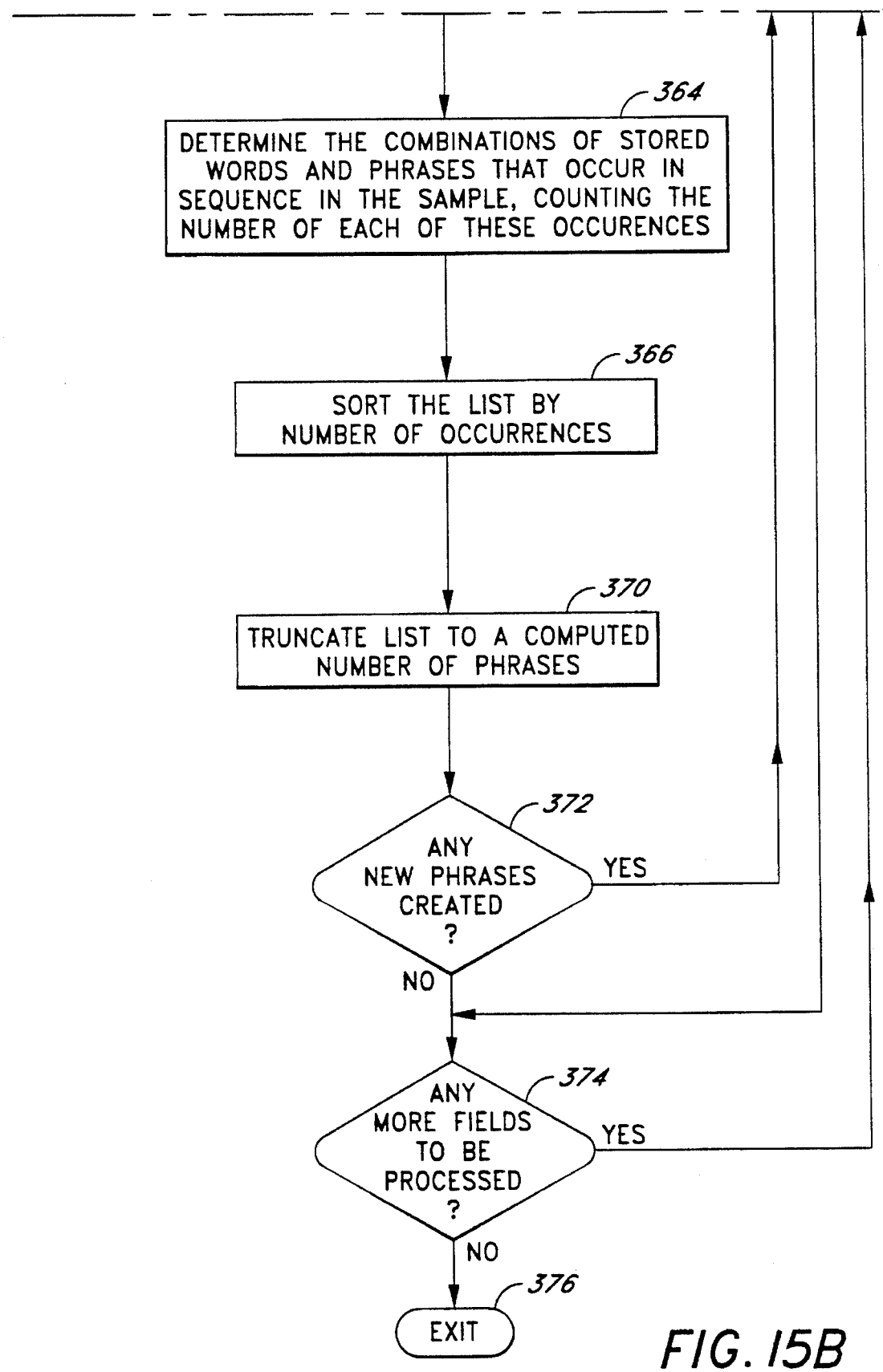
FIG. 15 comprising views shown in FIGS. 15A–B show a detailed flowchart of a preferred text parsing process applicable to the text compression compaction method.

Again referring to FIG. 7, a text field is encoded separately from other fields 102. FIG. 15 shows the text encoding process 342. A field marked for text compression is first selected 344. Next, the database records are read 346. Lists of different words and of different delimiters are created 348, and the number of occurrences for each different word and delimiter are determined 350. These lists of different words and delimiters are sorted separately in descending order by frequency of occurrence 352, with the most frequently occurring word and delimiter being first and the least frequently occurring word and delimiter being last. Words and delimiters are then assigned numbers 354, based on position in the sorted lists. The most frequently occurring word and delimiter are assigned the number 0 and the next most frequently occurring word and delimiter are assigned the number 1, etc. These assigned numbers are the numeric equivalents of the words and delimiters. The steps of listing the words and delimiters 348, computing the number of occurrences of these words and delimiters 350, sorting the lists 332 and assigning numeric equivalents 334 create a text phrase translation table (for single words) and a text delimiter translation table for a text field.

Besides single word compression, the text compression method also incorporates phrase compression. Hence, the translation table for a text field possibly includes phrases. A phrase is two or more words with embedded delimiters. A phrase component is a word or phrase used to test for larger phrases. For example, assume the "EQUIP/SERVICE" field of the "WORK_ORDER_INFO" table of FIG. 1B meets the criteria to be considered a text field. The words in the field are "radio," "console," "antenna," etc. The frequently occurring words "radio" and "console" are considered phrase components. These components are then used to determine if a combination of components occur in the field. The combination of phrase components "radio console" does occur. Assuming "radio console" appears frequently, it is declared a phrase. The resulting text phrase translation table is shown in FIG. 23E. The delimiter translation table is shown in FIG. 23F.

During phrase construction, phrases are constructed two components at a time on each pass through a text field. Passes continue until no new phrases are recognized. This procedure is analogous to that used for constructing multiple-field combinations, where fields are combined two at a time per pass. The number of possible two component phrases are: (number of phrase components)×(number of phrase components−1). To prevent the computations from becoming unwieldy, the number of phrase components considered are limited. In a preferred embodiment, this limit is: maximum number of phrase components=$C_{12}$×(number of delimiters)$^{1/8}$, where $C_{12}$=63.246. Because the number of delimiters is an estimate of the number of words in the text field, this limits phrase construction to about 200 components in a text field of 4,000 words and about 500 components in a text field of 10,000,000 words. This results in about 31.5 thousand phrases to be checked in a 4,000-word text field and about 224 thousand phrases to be checked in a 10,000,000-word text field. A text field is considered for phrase construction if its characteristic satisfies the phrase construction criterion. The relevant characteristic is the number of words represented by the most frequently occurring words, truncated at the maximum number of allowed phrase components. The criterion is a minimum percentage, $C_{13}$, of the total number of words in the field. In a preferred embodiment, $C_{13}$=10%. Hence, for a 4,000 word text field, phrase construction occurs if the 200 most frequently occurring words account for 400 of all words in the field. For a 10,000,000-word text field, the 500 most frequently occurring words must account for 1,000,000 of all words. The phrase construction passes are computed on a sample of the database. The same sampling interval and methodology is used for text compression as is used for multiple-field combination. (See discussion above).

After all different words have been assigned a numeric equivalent (the text phrase translation table is completed for single words), the field is tested to see if phrase construction should occur. As shown in FIG. 15, this phrase construction test begins by computing the number of phrase components to consider 356. Next, it is determined if the initial phrase components satisfy the phrase construction criterion 360, shown in FIG. 6. If so, a sample of the database is read 362. The sample database is scanned for all combinations of two words or phrases with an intervening delimiter that occur in sequence in the sample, counting the number of occurrences 364. The list of different words and phrases is sorted by number of occurrences 366. The words and phrases list is then truncated to the computed number of phrase components to consider 370. If any new phrases were created 372, another pass is made 362. Otherwise, the process is ended for this field. During the final pass, the list created by the sorting step 366 is assigned numeric equivalents to complete the text phrase translation table (including both single words and phrases) for this particular text field. If any more fields remain to be processed 374, another text field is selected 344. When all text fields are processed, the text compression process is complete 376.

Figure 16A:
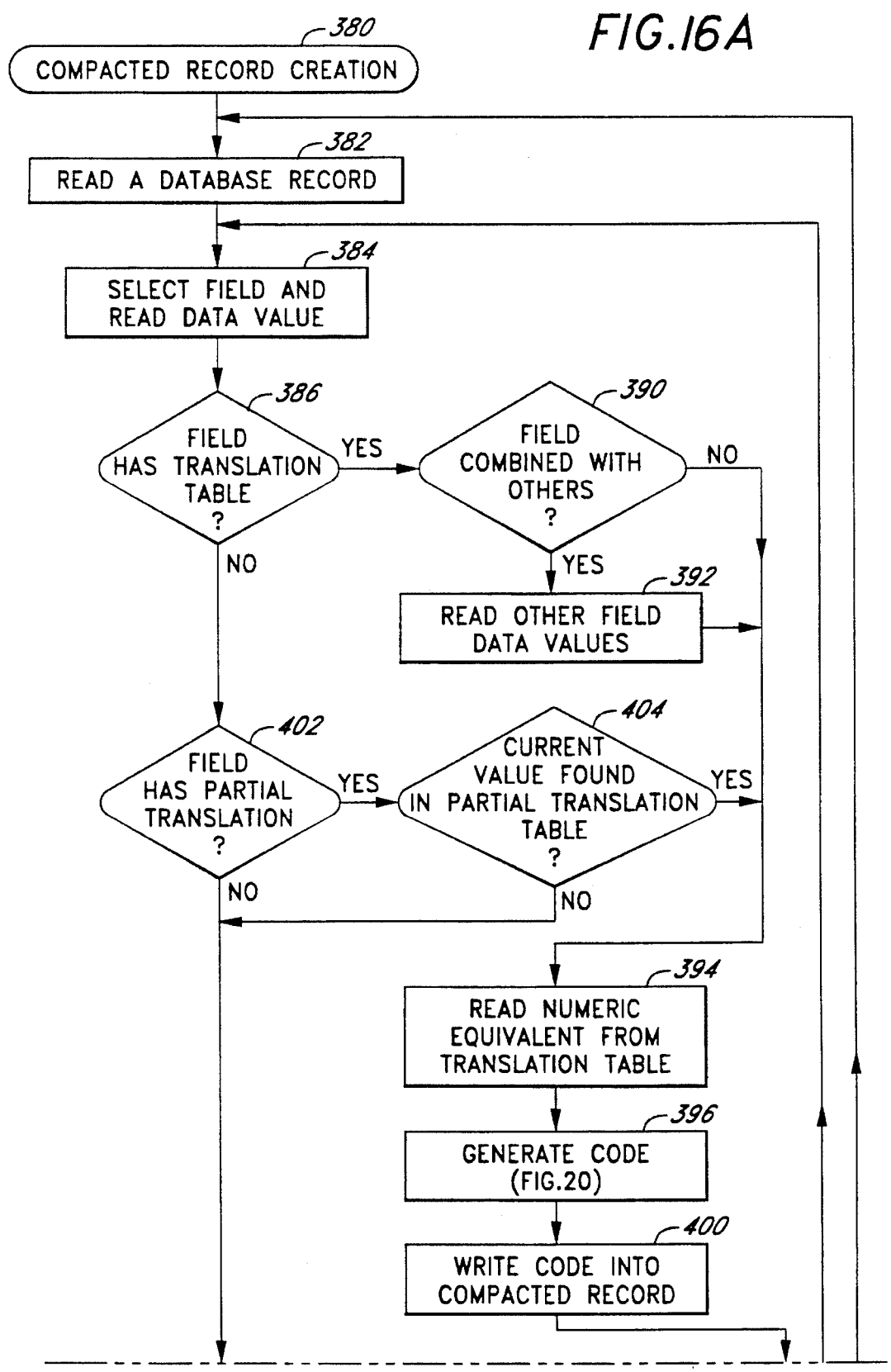
FIG. 16 comprising views shown in FIGS. 16A–C show a detailed flowchart of a preferred process for creating compacted records for the database image.
Figure 16B:
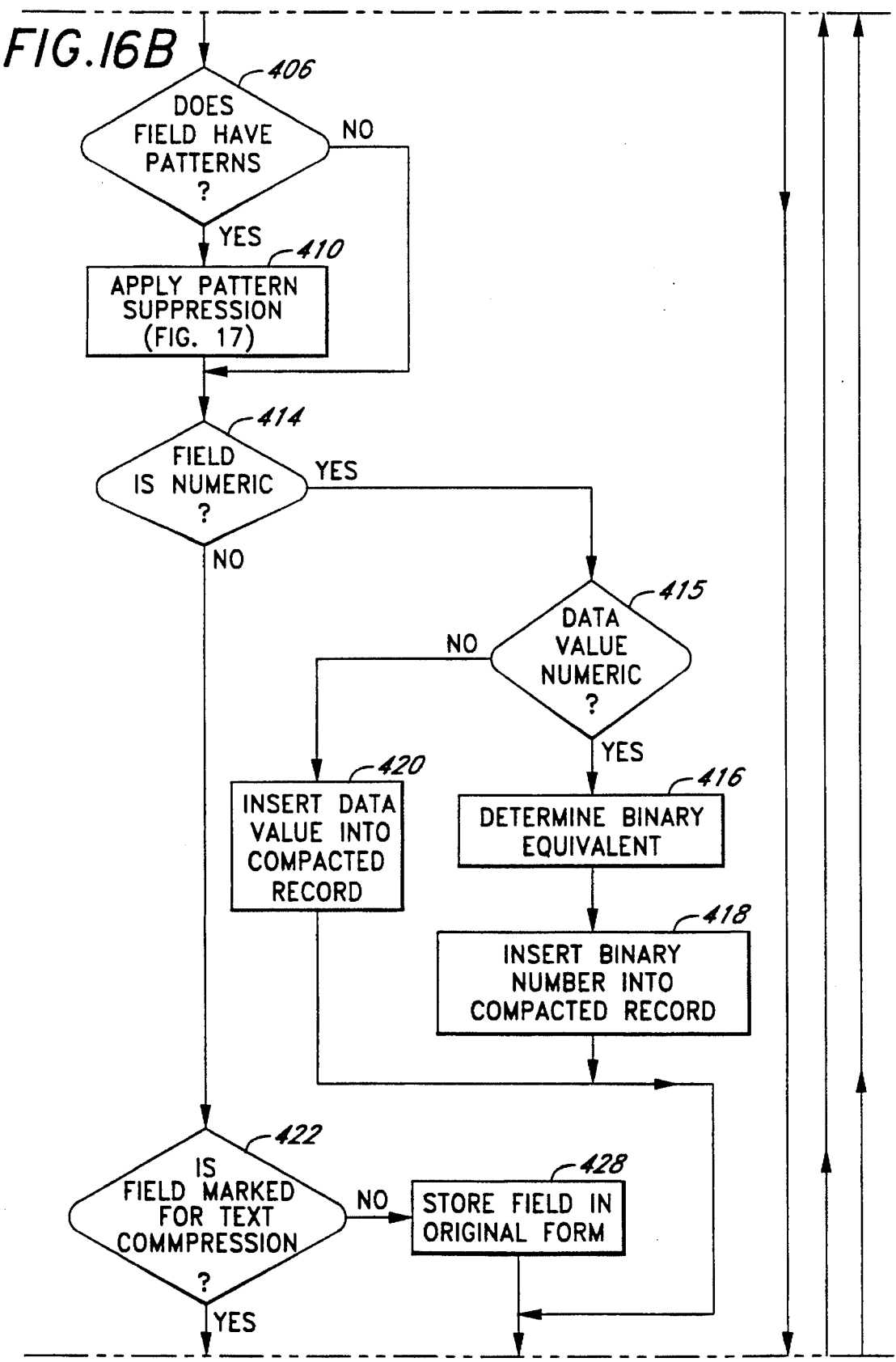
Figure 16C:
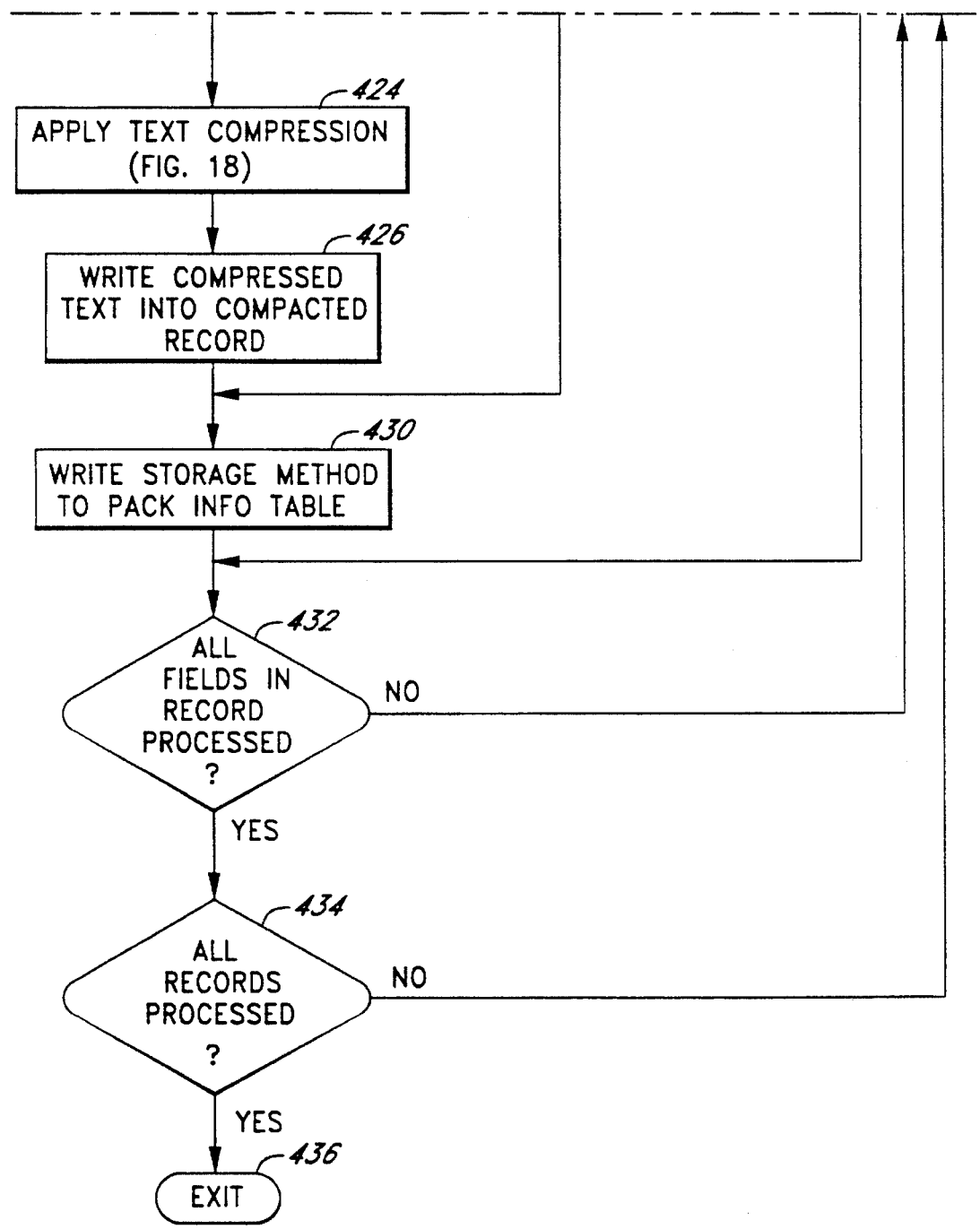

After all translations tables are constructed, enough information exists to create the compacted records which will eventually form the database image. As shown in FIG. 16, compact record creation 380 begins by reading a specific database record 382. A field is selected from within this record and its data value is read 384. A compacted data value is generated by determining the compaction method or methods applicable to this field. If the field has a translation table 386, it is determined if this field is combined with others 390. If so, the data values of the other fields are read 392. The numeric equivalent of this data value or these data values are read from the translation table 394 and the corresponding code is generated 396. The code is then inserted into the corresponding field of the compacted record 400. If the field selected has a partial translation table 402, then it is determined if the current value is in the table 404. If so, the numeric equivalent is read 394, the code is generated 396 and written into the compacted record 400. If the field selected has a pattern table 406, the pattern is suppressed from the data value 410. If the field is mostly numeric 414 and the data value read is marked as numeric 415, it is converted to its binary equivalent using the minimum necessary integral-number of bytes 416. This binary number is then inserted into the compacted record 418. Otherwise, the data value is directly inserted into the compacted record 420. Finally, if the field is a text field 422, text compression is applied 424 and the compressed text is inserted into the compacted record 426. In all other cases, the data value is inserted into the compacted record in original form 428. The number representing whatever storage method was used is then written to the pack information table 430. If all fields in the original record have not been processed 432, the next field is selected 384. Otherwise, it is determined if any records remain to be read 434. If so, the next record is read 382. Otherwise, the compacted record creation process is finished 436.

Figure 17:
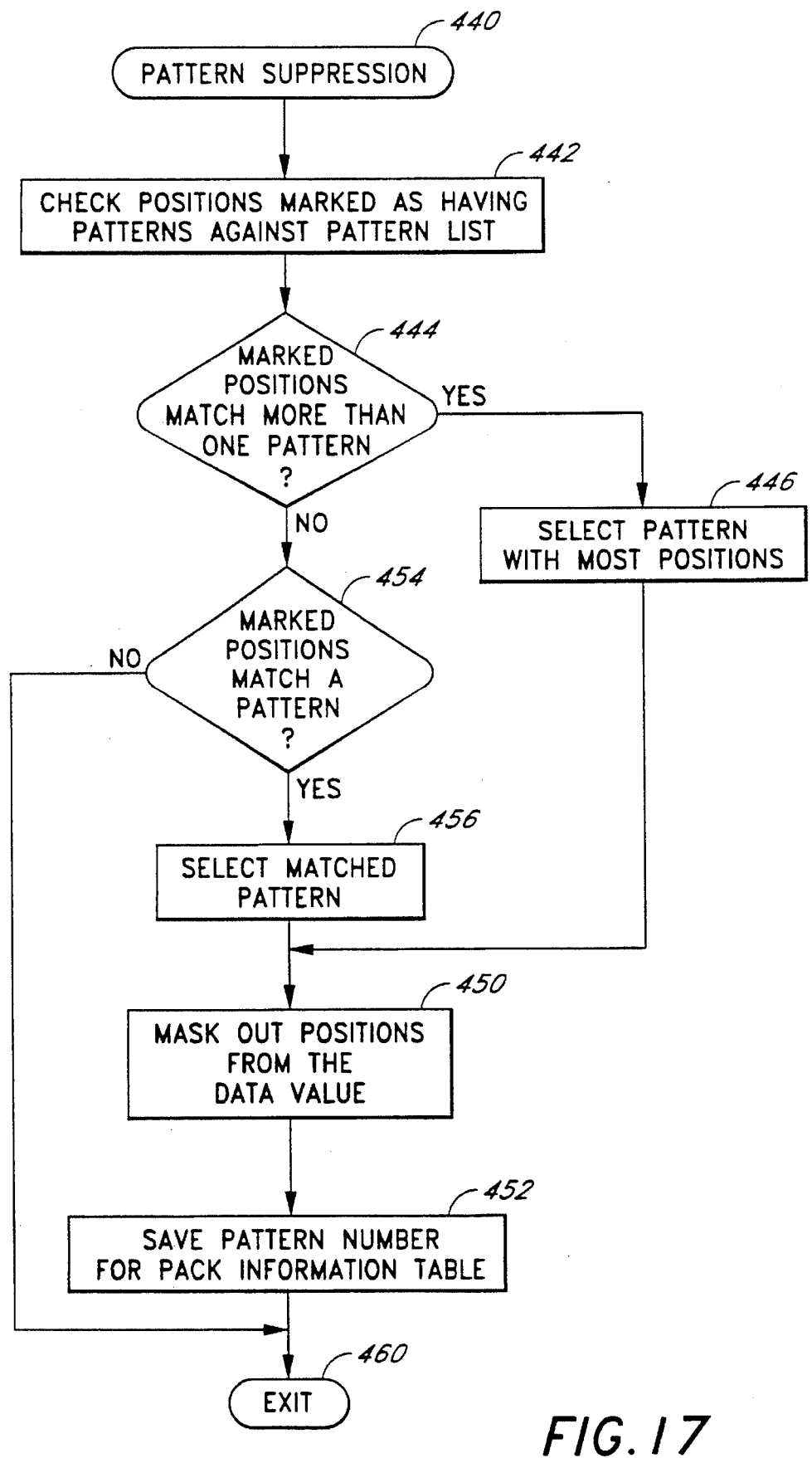
FIG. 17 is a detailed flowchart of a preferred pattern suppression process.

FIG. 17 shows pattern suppression 440. The current data value is compared with the patterns contained in the pattern information table for this field 442. If more than one pattern matches 444, the largest pattern is selected 446 and masked out of the data value 450. The pattern number is then saved for the pack information table 452. If there is only one match 454, that pattern is selected 456 and masked out of the data value 450. If there are no matches, pattern suppression is complete 460.

Figure 18A:
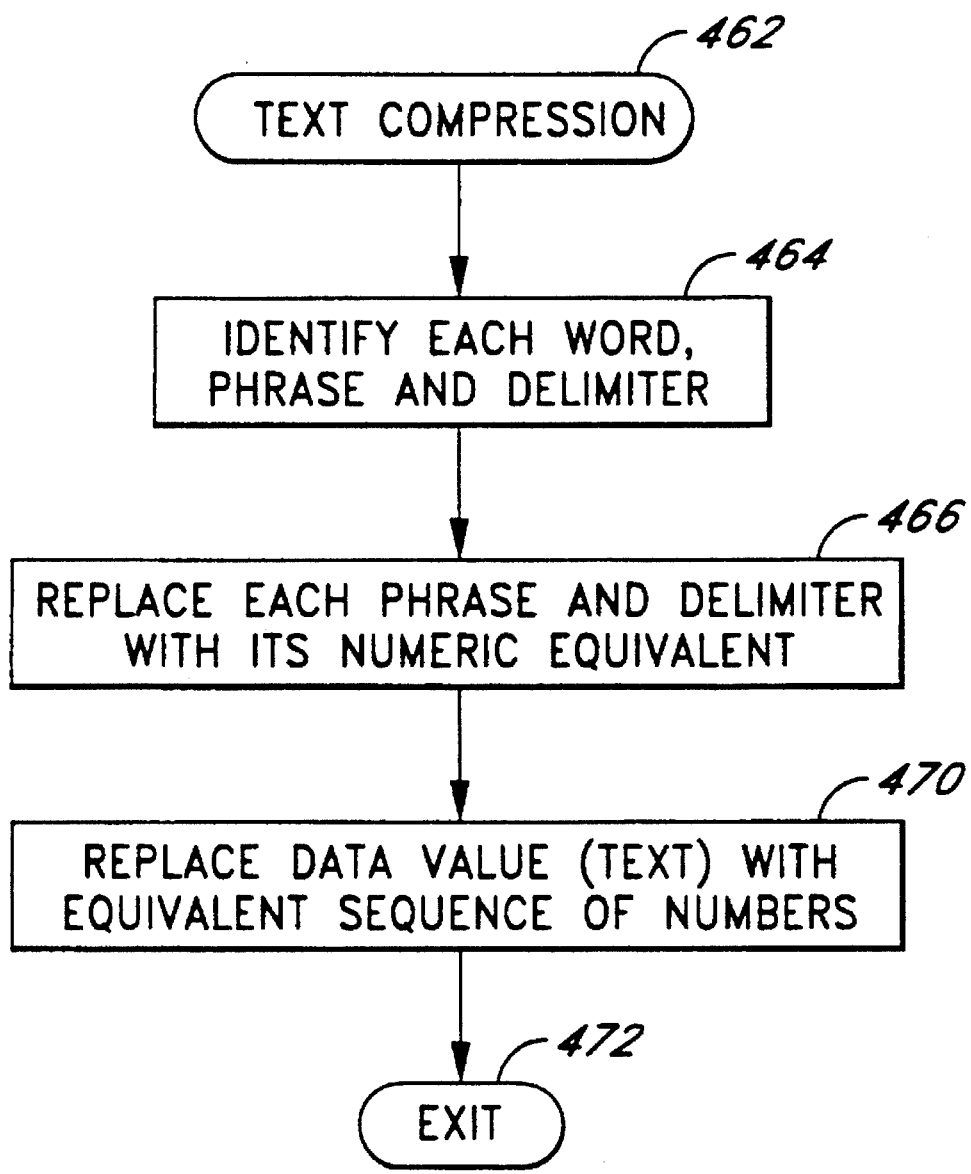
FIG. 18A is a detailed flowchart of a preferred text compression process.

Shown in FIG. 18A, text compression 462 begins by identifying each word, phrase and delimiter in the text field of the record being compacted 464. The longest phrases are attempted first, followed by shorter phrases and then words. Once a word, phrase or delimiter is identified, its numeric equivalent is read from the translation table or delimiter definition table 466. At this point, the numeric equivalents for all words, delimiters and phrases in the data value is known. These numeric equivalents are then used to create a sequence of numbers which are the equivalent of the data value 470. Each word, delimiter or phrase of the data value is represented by one number of the sequence, and these numbers are concatenated in the order of occurrence of the words, delimiters and phrases in the data value. This completes the text compression process 472.

A single data value of a text field may contain many words, delimiters and phrases. The concatenated sequence of numbers which represent the compressed text of the data value may be many bits long. FIG. 18B describes a preferred embodiment of the format for this potentially long sequence of numbers. In this embodiment, each of the sequence of numbers is of variable length, with the number itself describing its length and information content. Specifically, a number representing a word, delimiter or phrase is of 1, 2 or 3 bytes. The first 4-bits of the number describes how many bits are in the remainder of the number and what the remaining bits represent. For example, if a word or phrase has a numeric equivalent ranging from 16 through 4,111, it is represented by a two-byte number. The first 4-bits of this number would be the number 3, and the remaining 12-bits of this number would be the value of the numeric equivalent. If the first 4-bits are the number 15, this represents the end of the data value. FIG. 18B shows that the first 4-bits might be the number 0 or 1. These value are intended for applications in which some text words are not encoded (similar to partial encoding). For example, in applications that contain many numerics within the text fields, the numerics may not be encoded.

When the most prevalent delimiter occurs between two phrase components, where a phrase component is either a word or phrase, its numeric equivalent (equal to zero) is not stored. When the most prevalent delimiter occurs at the beginning or end of a record its numeric equivalent must be stored. Blanks are used as fillers to create a fixed-length record, as explained below.

As noted above, compaction methods are applied so as to create a limited number of fixed-length records, where length is defined as the number bits of required storage. A text field is likely to have a wide range in the number of phrase components per record, which implies a wide range in record length. In order to limit this inherent variation in record length, a small number of allowed data value lengths are defined for the text field, and the data values in the text field of each record is forced to one of these lengths. A preferred embodiment accomplishes this task by first identifying the record with the greatest number of characters in the text field, i.e. the greatest data value length. If L=(greatest data value length)/4, then four data value lengths are defined: L, 2×L, 3×L and 4×L. The shortest defined length which will fully contain the concatenated text data is used for each text data value. The unused portion of this allocated length is left blank, with a termination character indicating the end of data. Hence, a text field can have data values of four possible lengths. An entry in the pack information table for each record specifies the length used. Four lengths were chosen as a tradeoff between the number of subpartitions created and the blank storage wasted in each record. Other values could be used, and the number of lengths could be made a function of database parameters (such as total number of fields). One of ordinary skill in the art will recognize other possible variations in allowed text field data value lengths.

As explained above with respect to FIG. 16, during compacted record creation, codes are generated corresponding to the numeric equivalents contained in the single-field and multiple-field translation tables. In a preferred embodiment of the present invention, code generation creates a unique integral-byte length code for each numeric equivalent in a translation table. (A byte is typically considered to be 8-bits). Integral-byte codes are used to achieve a reasonable tradeoff between the number of possible record-lengths (and hence partitions) and code length. One of ordinary skill in the art will recognize that other code lengths are feasible. For example, integral-nibble length codes may be used. (A nibble is typically considered to be 4-bits, but here it could be from 2 to 7 bits). In a preferred embodiment, the codes selected, depending on the field characteristics, are the single-byte code, the combination code and the default variable-byte code.

The variable-byte code uses the minimum integral-number of bytes necessary to encode the different slots of a field. That is, the numeric equivalents of the 256 largest slots (those containing the most records) are encoded with a single byte (i.e. numeric equivalents 0 through 255 are encoded as $00_{16}$ through $FF_{16}$), the next 65,536 largest slots are encoded using two bytes (i.e. numeric equivalents 256 through 65,791 are encoded as $0000_{16}$ through $FFFF_{16}$), the next 16,774,216 largest slots are encoded using three bytes ($000000_{16}$ through $FFFFFF_{16}$), and so on.

In accordance with a preferred embodiment of this invention, if a field has a limited number of slots, the integral-byte length code used for field encoding can consist entirely of a one byte code. One byte can only represent 256 different values, but this range can be extended by utilizing a designation appended to each compacted record, called the type byte. The "single-byte code" consists of a first single-byte which represents the 256 largest slots (i.e. numeric equivalents 0 through 255 are encoded as $00_{16}$ through $FF_{16}$). A second single-byte represents the next 256 largest slots (i.e. numeric equivalents 256 through 511 are also encoded as $00_{16}$ through $FF_{16}$). A third single-byte represents the next 256 largest slots (i.e. numeric equivalents 512 through 767 are also encoded as $00_{16}$ through $FF_{16}$), and so on. The type byte specifies (among other things) whether a first, second, third, etc. single-byte represents the data. The type byte is explained in detail below in the discussion on partitioning. The advantage of the single-byte code over the variable-byte code is that all of the largest slots (those containing the most frequently occurring data values) are represented by a single byte, whereas only the 256 largest slots of the variable-byte code are represented by a single byte. Thus, the single-byte code achieves reduced storage requirements for the database data. However, use of the single-byte code can drastically increase database storage complexity as compared to use of the variable-byte code. By restricting application of the single-byte code to fields with a limited number of slots, the storage complexity and access time of the database is comparable to that achieved by use of the variable-byte code. The discussion below on partitioning clarifies this tradeoff.

In a preferred embodiment of this invention, if the number of slots in a field are too numerous to feasibly use a single-byte code, but a relatively small number of slots contain most of the records in a field, then an integral-byte code using a combination of single-byte and variable-byte codes can be used. This "combination-code" encodes the largest slots using one byte and the remaining slots using multiple bytes. Thus, the first single-byte of the combination code represents the 256 largest slots (i.e. numeric equivalents 0 through 255 are encoded as $00_{16}$ through $FF_{16}$). The second single-byte of the combination code represents the next 256 largest slots (i.e. numeric equivalents 256 through 511 are also encoded as $00_{16}$ through $FF_{16}$). The third single-byte of the combination code represents the next 256 largest slots (i.e. numeric equivalents 512 through 767 are also encoded as $00_{16}$ through $FF_{16}$), and so on. Then, two bytes are used to represent the next 65,536 largest slots. (For example, numeric equivalents 768 through 66,303 are encoded as $0000_{16}$ through $FFFF_{16}$). Then three bytes are used to represent the next 16,774,216 largest slots, and so on. The type byte distinguishes between the various single bytes (e.g. the first, second and third single-bytes as above) and also indicates use of the multiple-bytes. As the name suggests, the combination code falls between the single-byte code and the variable-byte code in achieving a tradeoff between reduced storage requirements and increased storage complexity.

As shown in FIG. 6, the single-byte code is used if the field's translation table contains a maximum $C_{14}$ number of entries. In a preferred embodiment, four single-bytes are used to represent the numeric equivalents 0–255, 256–511, 512–767 and 768–1023. The single-byte threshold is chosen to be: $C_{14}$=973. This value is the point where the last single-byte is 80% full, allowing further entries to the translation table. Four single-bytes provides a reasonable tradeoff between one-byte storage and the number of sub-partitions created by four code types for one field. One of ordinary skill in the art will recognize that more or less than four single-bytes can be used, and other values of $C_{14}$ can be specified to achieve other system tradeoffs.

If the single-byte code threshold is exceeded, a combination code might be used. As shown in FIG. 6, the combination code is used if the number of records contained in the slots assigned to translation table entries 256–511 exceeds the combination code threshold, $C_{15}$, which is a specified fraction of the number of database records. In a preferred embodiment, two one-byte combination codes are used to represent numeric equivalents in the ranges 0–255 and 256–511, a two-byte code represents the numeric equivalents 512–66047, a three-byte code represents the numeric equivalents from 66048–16843263. The combination code threshold is chosen to be: $C_{15}$=0.30. This achieves a reasonable tradeoff between the number of slots represented by single bytes and the number of subpartitions created by four code types. One of ordinary skill in the art will recognize that other values of $C_{15}$ can be specified or more than four combination-code types can be established with multiple threshold criteria to achieve other system tradeoffs. If neither the single-byte code nor the combination-code thresholds are satisfied, the default variable-byte code is used as noted above.

Figure 19:
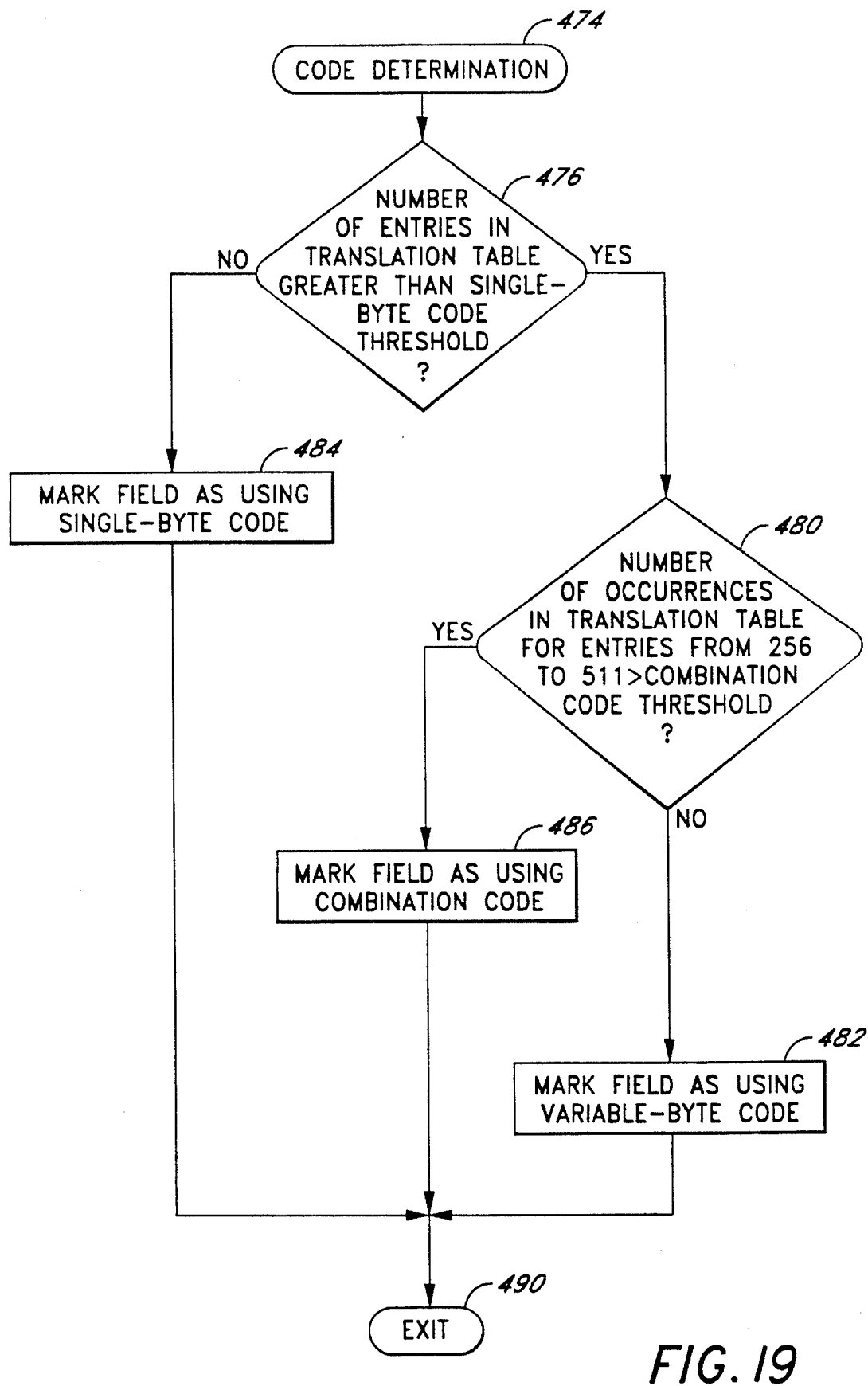
FIG. 19 is a detailed flowchart for a preferred code determination process.

Referring to FIG. 19, the code determination process 474 tests the characteristics of a field's translation table and marks the field for either single-byte codes, combination-codes or variable-byte codes. This process begins by comparing the number of translation table entries with the single-byte code threshold 476. If the number of entries is greater than this maximum, the single-byte code is rejected and the combination code is tested 480. For the combination code, the number of records in slots whose numeric equivalents range from 256 to 511 is compared with the combination-code minimum threshold. If the combination code threshold is not satisfied, then the combination code is rejected for this field and the field is marked for using a variable-byte code 482. Otherwise, if the single-byte code threshold is not exceeded, the field is marked for the single-byte code 484. If the single-byte code threshold is exceeded, but the combination-code threshold is met, then the field is marked for the combination code 486. When the field has been marked for one of the three codes, the code determination process is complete 490.

Figure 20A:
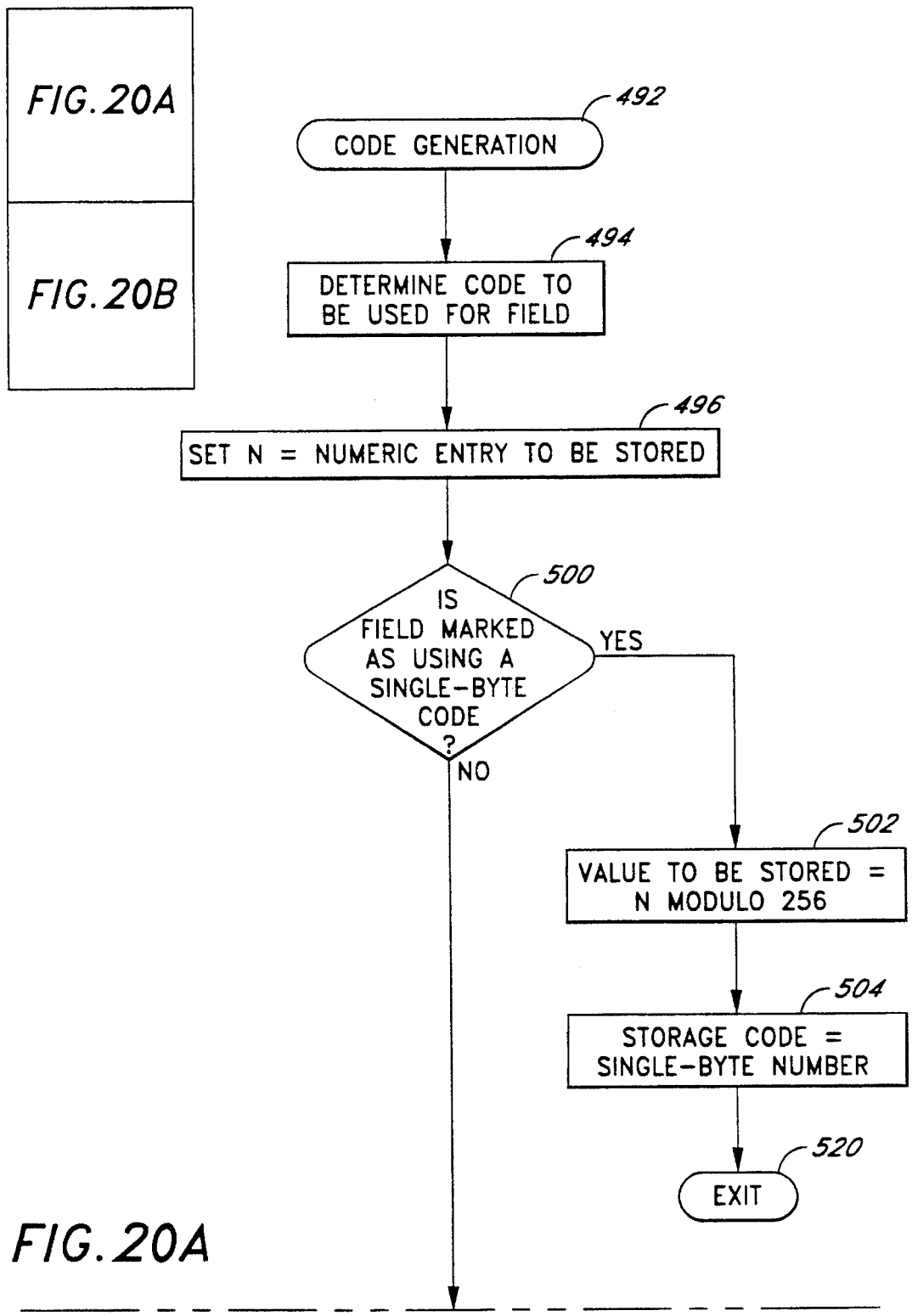
FIG. 20 comprising views shown in FIGS. 20A–B show a detailed flowchart of a preferred process for generating the integral-byte length codes, including single-byte, variable-byte and combination codes.
Figure 20B:
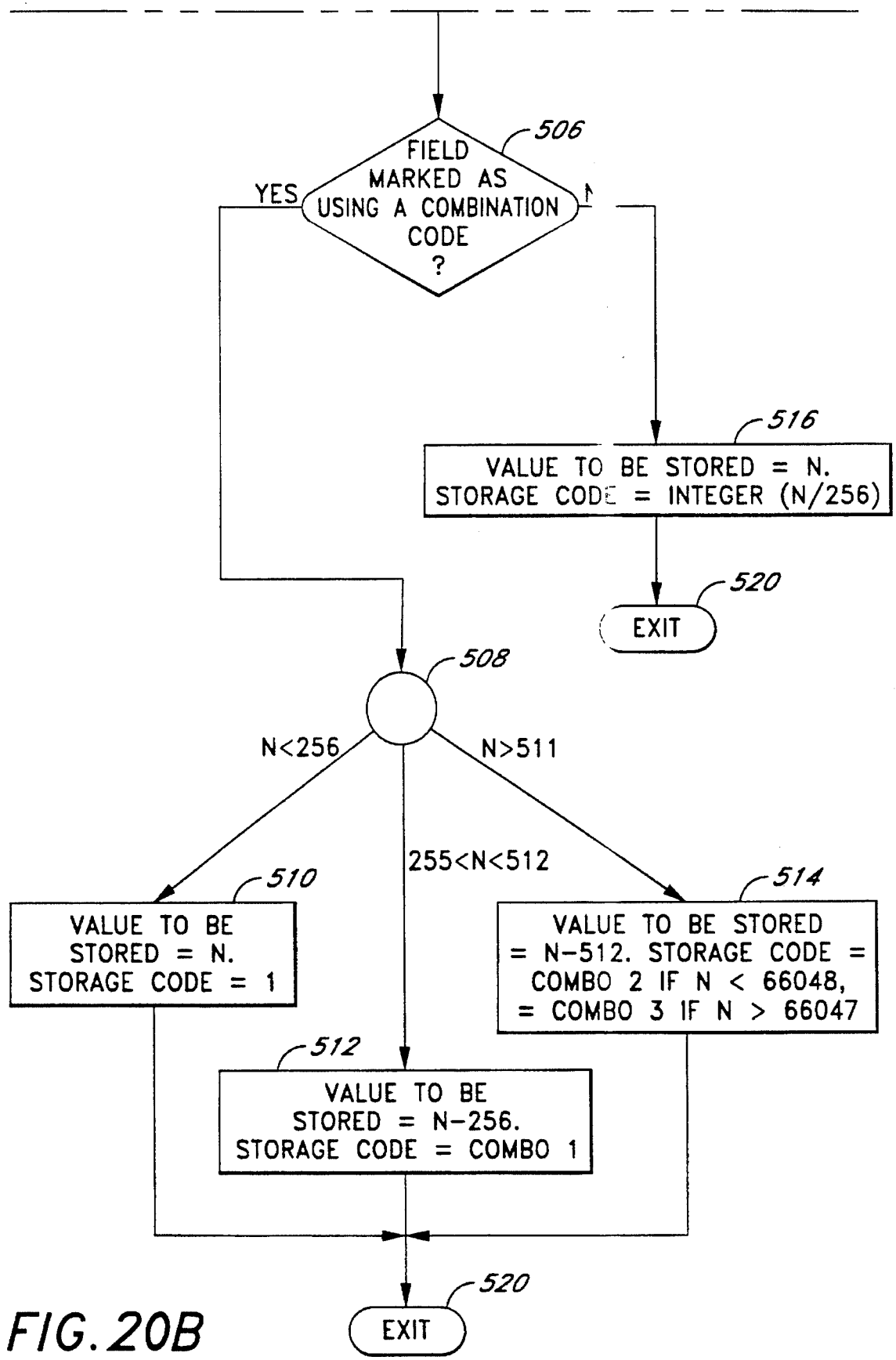

Referring to FIG. 20, the code generation process 492 takes a numeric equivalent from a translation table and converts it to an integral-byte-length binary code, which is then inserted in a compacted record. First, the code to be used for this field is determined 494. The field was marked for a particular code during the code determination process shown in FIG. 19. The number to be encoded, N, is specified 496. N is a numeric equivalent read from the field's translation table. It is determined if the field is marked for a single-byte code 500. If so, the single-byte generated is N modulo 256 502. The storage code is also generated 504, which specifies the particular single-byte code used. The single-byte code used is int [N/256], where int[ ] is the smallest integer greater than the number in brackets [ ]. Alternatively, if the field was marked for a combination code 506, then the combination code generated is a function of N 508. If N<256, then a one-byte code equal to N is generated 510, and the storage code=1. If 255<N<512, a one-byte code equal to (N−256) is generated 512, and the storage code equals "combination 1." If N>511, then a multiple-byte code equal to (N−512) is generated 514 using the minimum number of bytes. The storage code is set to "combination 2" if N<(65536+512)=66048, otherwise the storage code is set to "combination 3." As a default, a variable-byte code equal to N is generated 516, where the storage code is set to the minimum number of integral bytes required to represent N. After a code is generated for N, the process is finished 520.

The data value for each field of a compacted record may vary as to how the data value is compacted or "packed." That is, the data value variables are the specific patterns suppressed, the type of code generated (variable-byte, single-byte or combination code) and the number of bytes generated. A temporary pack information table is formed during creation of the compacted records in order to keep track of these variables. The pack information table consists of a row for each compacted record and a column for each field of the compacted records. At the intersection of each row and column is a one-byte entry, called a pack method identifier. The least significant half (4-bits) of the pack method identifier is the storage method number. The most significant half (4-bits) of the pack method identifier is the pattern number. The storage method numbers, as defined for a particular embodiment of this invention, are shown in FIG. 23M. The pattern numbers are obtained from a pattern definition table for a particular field. See, for example, FIG. 23I. A pattern number of zero specifies that no pattern was suppressed from this data value.

For example, suppose the fifth row and fourth column of the pack information table contained the pack method identifier $82_{16}$. This would indicate that the fourth field of the fifth compacted record contains a compacted data value from which was suppressed pattern number 8. Further, the storage method is 2. This implies that the fourth field has numeric substitution applied to it because patterns are not applied to fields with translation tables. Therefore, the numeric portion of this field is a value between 256 and 65,791, which can be determined by adding 256 to the compacted data value. The original uncompacted data value could then be reconstructed by converting the numeric portion of this field from binary to character representation and inserting pattern number 8 from the pattern table into this character representation.

With four bits available for the pattern identifier, the number of possible patterns suppressed in any particular field is limited to 15. If more than 15 patterns per field for a specific application were to be required, another byte could be added as part of the pack method identifier. The temporary pack information table is used to build the permanent record information table, which also specifies how each data value in each field of a compacted record is "packed" (see below).

The partitioning process creates the database image. The partitioning process groups the compacted records by length (the number of bytes of storage required by a compacted record). Equal-length compacted records are placed in contiguous storage areas, called partitions. In a preferred embodiment, each partition contains up to 16,777,216 compacted records. Each partition is assigned a partition number which is associated with the compacted records contained in the partition. Further, a type byte is appended to each compacted record which defines how each field of the compacted record was "packed." The result is a database image. Construction of the database image is detailed in the following discussion.

Central to the partitioning process is the record information table, which is constructed using the temporary pack information table. The pack information table is created concurrently with the compacted records and is described above in the discussion of code generation. Recall that there is one row of the pack information table for each compacted record, and that there is one column of the pack information table for each field of the compacted records. Also recall that at the intersection of each row and column is a pack method identifier indicating the pattern suppressed from the compacted data value and the code used to encode the numeric equivalent of the corresponding data value. Each different row of the pack information table is used to form one column of the record information table. Thus, there are fewer record information table columns than pack information table rows. Therefore, each row of the record information table corresponds to each field of the compacted records, and each column of the record information table corresponds to a "type" of compacted record. A type of compacted record is defined by the pack method identifiers contained in the record information table column. That is, all compacted records whose fields have the same patterns suppressed, the same codes applied (variable-byte, single-byte or combination) and the same resulting code lengths generated (one-byte, two-byte, etc.) will be represented by a single column of the record information table. After the record information table is created, there is no longer a need for the pack information table.

Due to the potential size of the pack information table, in a preferred embodiment, only one row of the pack information table is maintained by the build subsystem. After a row is built for a particular record, the record information table is checked for a column that matches this row. If a matching column is not found, a new record information table column is created. The pack information table row is then discarded. This procedure is repeated for every record in the database.

Each column of the record information table is assigned a unique two-byte value, the most significant byte is a partition number and the least significant byte is the type byte number. All compacted records of the same length (number of bytes of storage required) are stored in the same partition (unless that partition already contains 16,777,216 compacted records in which case another partition for compacted records of that length is created). The designated length of a partition is the length of the compacted records stored in the partition. Therefore, all columns of the record information table corresponding to compacted records of a particular length are assigned the partition number of a partition of that designated length.

As previously stated, each column of the record information table, besides being assigned a partition number, is also assigned a type byte number. The type byte, referenced above in the discussion on code generation, is an overhead byte appended to each compacted record. Each column of the record information table assigned a particular partition number can be assigned one of 256 type byte numbers. That is, there is a unique type byte number assigned to each column with the same partition number. The type byte number designates the type of "packing" specified by the record information table column to which it is assigned. The type byte of a compacted record has the value of the type byte number of the corresponding record information table column. The location of the type byte in the compacted record is not critical. The type byte may be located at the beginning, the end or anywhere in the middle of the compacted record. For ease of description, the type byte will be referred to as being appended to the end of a compacted record.

An example record information table is shown in FIG. 23J. The columns $0E17_{16}$ and $0E18_{16}$ designate that compacted records stored in partition number 14 ($E_{16}$) with type byte values 23 and 24 ($17_{16}$ and $18_{16}$) are packed according to the two columns shown. Specifically, field 2 of any compacted record in partition number 14 with type byte 24 has pattern number 11 ($B_{16}$) suppressed and the numeric equivalent is encoded using a four-byte variable byte code (see entry 4 of FIG. 23M).

Constructed in this manner, the record information table contains the information necessary to initiate retranslation of all the fields in any compacted record. That is, if a compacted record is read from the database image, the partition number it is read from and the value of the type byte appended to the record specify a column of the record information table. That column, in turn, specifies the storage method number and pattern number for each field within a compacted record. From this information, the uncompacted values for all fields may be determined using the appropriate translation and auxiliary tables.

Because the partition number is represented by one byte, there are 256 possible partitions. The 256 different values of the type byte form "subpartitions" within each partition, consisting of compacted records with the same type byte value. The largest value for the type byte, 255, designates that this particular record has been marked for deletion.

As noted above in the discussions on pattern suppression and on coding, a tradeoff exists between reduced database image storage requirements and increased database image storage complexity. Database image storage can be reduced by relaxing the criteria for identification of patterns or for use of smaller length codes (such as the single-byte code). Doing so, however, increases the number of possible storage methods and pattern numbers for each field. This, in turn, increases both the number of possible compacted record lengths (hence, the number of partitions) and the number of possible types of compacted records (hence, the number of subpartitions). The greater the number of partitions and subpartitions, the greater the storage complexity and the slower the access to data in the database image.

Figure 21B:
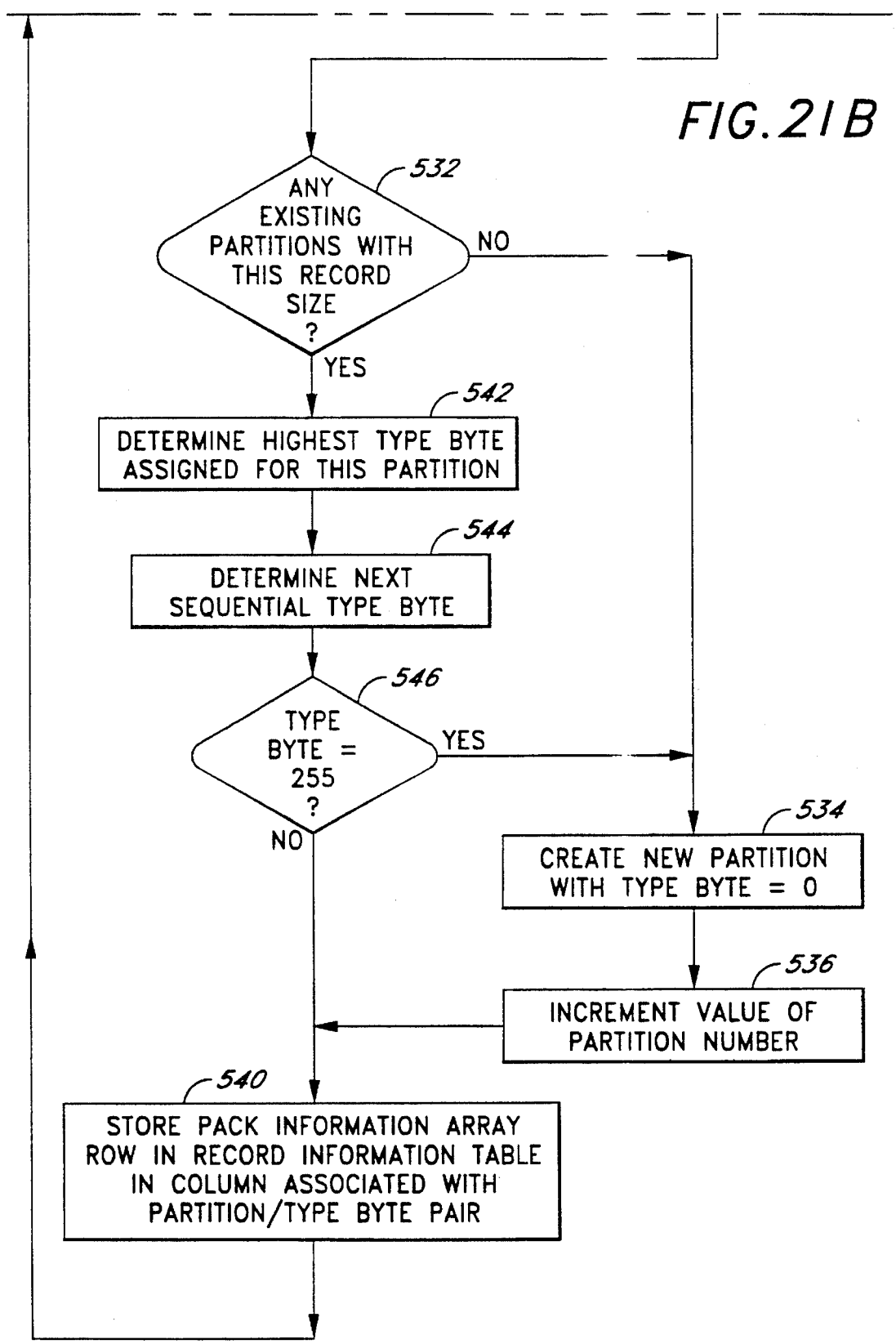
FIG. 21 comprising views shown in FIGS. 21A–B show a detailed flowchart of a preferred storage partitioning process advantageously used to produce a database image.

As shown in FIG. 21, the partitioning process begins with an empty record information table and the partition number value initialized to zero 524. A row of the pack information table is read 526. This row is then compared with columns in the record information table 530. If there is no match, this row becomes a new entry in the record information table. This new entry is created by first determining if there are any existing partitions containing records of equal size to the compacted record 532. If no such partition exists, a new partition is created with a type byte equal to zero 534. This new partition is designated by the current value of partition number. The partition number value is then incremented 536. The pack information row is then stored in the record information table at a column designated by the value of partition number and the value of type byte 540. If there is an existing partition of equal compacted record size, the highest existing type byte value in this partition is determined 542. The next sequential type byte value is determined 544. If the type byte value is equal to 255, the partition is full and a new partition is created 534. Otherwise, the pack information row is stored as a column in the record information table 540. If the pack information row matches an entry in the record information table, that entry specifies a corresponding partition number and type byte value 550. A type byte equal to the specified type byte value is appended to the compacted record which corresponds to the pack information row 552 and that compacted record is stored in the next sequential location of the partition equal to the specified partition value 554. This process is repeated until all rows in the pack information table are read 556. At this point, the partitioning process is finished 560, the record information table is complete and the compacted records have been formed into a database image.

As previously discussed with respect to FIG. 5, an index access structure provides an efficient data access means. As described above, the index access structure for the database image consists of an index table containing page pointers and a page table containing record pointers, for each specified index. Creation of these data structures first requires creation of a temporary index array for each indexing field. Each different data value in an indexing field becomes an index value. Each temporary index array is a sorted (e.g. alphabetically) list of index values. Associated with each index value is a 4-byte counter which specifies the number of occurrences of a particular index value in the index field. After a temporary index array is constructed, it is converted to an index table by replacing the occurrence counter with a pointer into a page table. A page table consists of one or more "pages," where each page is a portion of memory which contains 65,536 record pointers, and each record pointer is a 4-byte value which specifies a storage location of a compacted record within the database image. One byte of each record pointer specifies a partition number, and the other three bytes specify the relative record position within a partition. The record pointers for a particular index value are contained in a contiguous area or "block" of the page table, but this block of record pointers may span several pages. Initially, each page is only partially filled with record pointers in order to allow room for data expansion. As shown in FIG. 6, the number of pages in the page table=int [(number of records in the database)/($65,536 \times C_{16}$)], where $C_{16}$ is the initial page fill ratio and int[ ] is the smallest integer greater than the number in brackets [ ]. For a preferred embodiment, $C_{16}$=0.80. That is, 80% of each page of the page table is initially filled with data pointers. The page pointers in the index array are four bytes. One byte specifies a page number and two bytes specify the beginning of a block of record pointers. The remaining byte is reserved for future use.

Figure 22A:
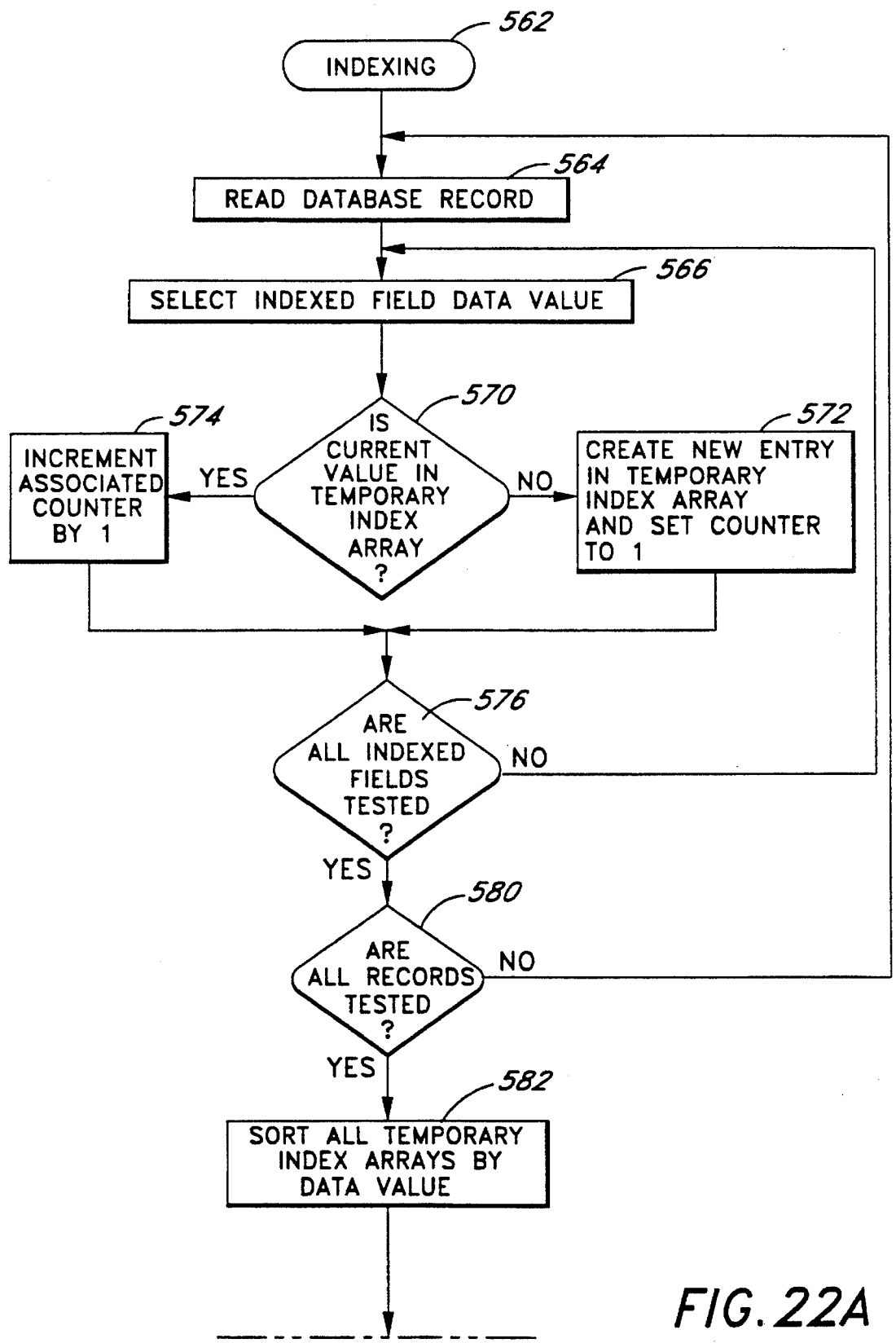
FIG. 22 comprising views shown in FIGS. 22A–C show a detailed flowchart of a preferred process for creating the index access structure for the database image.
Figure 22B:
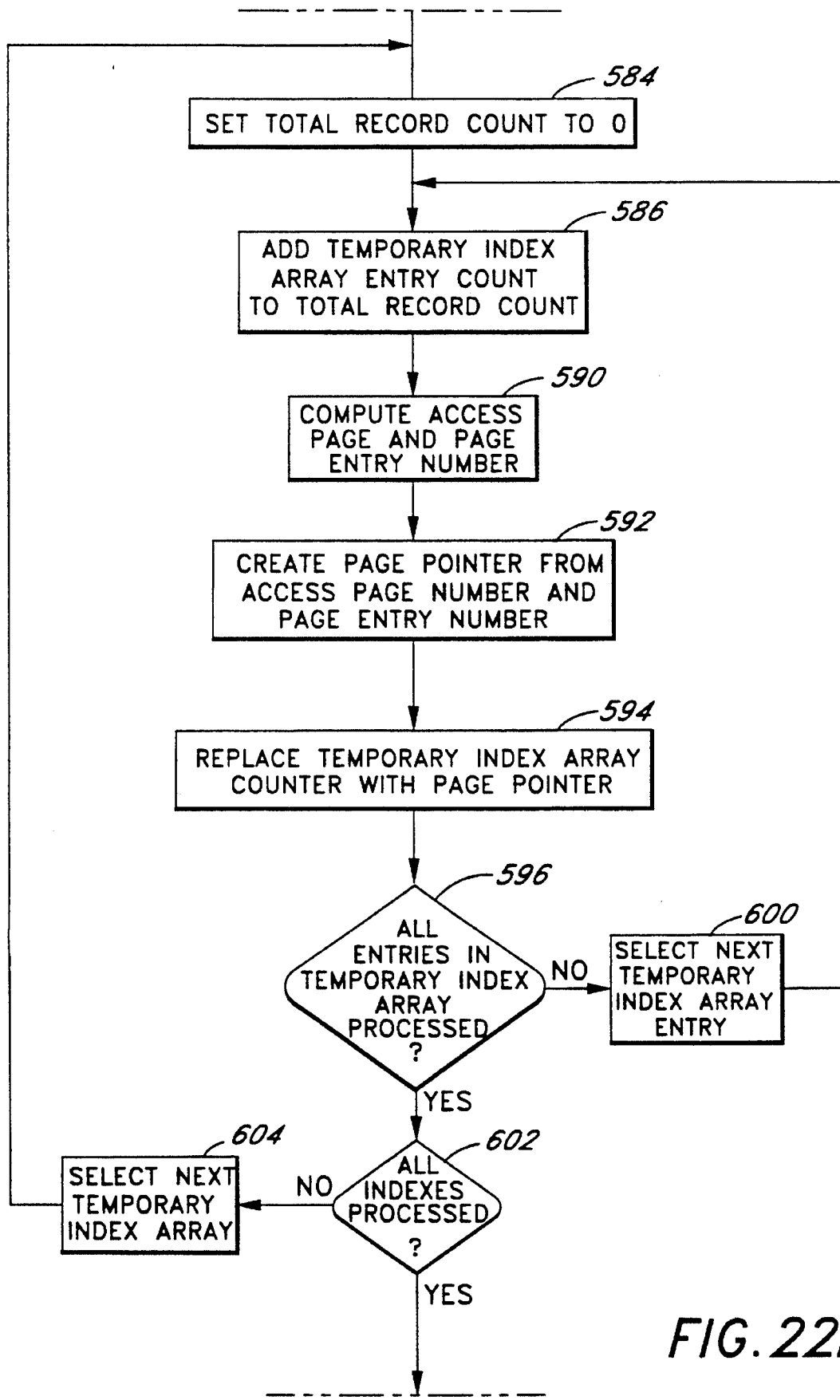
Figure 22C:
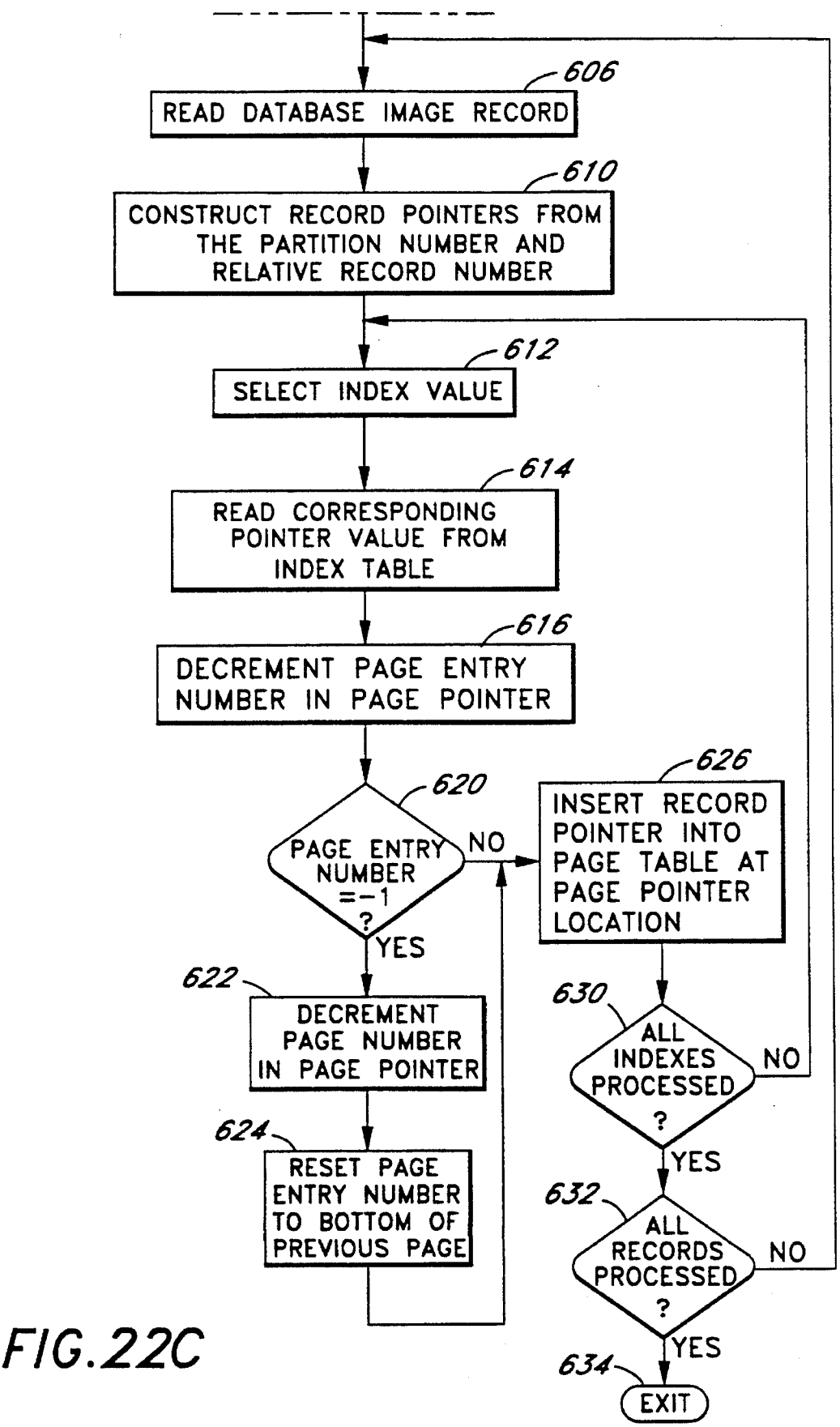

FIG. 22 shows the detailed construction of the index access structure 562. First, a temporary index array is created for each field specified as an indexing field. To do so, the database records are read 564, and an indexed field data value (index value) is selected 566. For each new index value encountered 570, an entry in this field's temporary index array is created, with the associated counter set to one 572. If an index value is encountered which is already in the array, the associated counter for that index value is incremented by one 574. If all indexed fields have not been processed 576, another index value is selected from the record 566. When all records have been read and processed in this manner 580, all temporary index arrays are sorted by index value 582.

Continuing with FIG. 22, the next step is to convert each temporary index array to an index table. To do this, a total record count is initialized to zero 584. Beginning with the first value in the temporary index array, the associated counter is added to the total record count 586. An access page and page entry number associated with this index value is computed 590. The computations are: access page=(total record count)/($65,536 \times C_{16}$) and page entry number=(total record count–1) modulo [$65,536 \times C_{16}$], where $C_{16}$ is the initial page fill ratio. A page pointer is created from the computed access page and page entry numbers 592. An index table entry is then created by replacing the counter in the temporary index array with the page pointer 594. If other entries in the temporary index array remain to be processed 596, the next array entry is selected 600 and the process is repeated 586. The result is a completed index table for a particular indexing field, containing a list of index values, each with pointers to an empty block in the page table. If other temporary index arrays remain to be converted to index tables 602, another array is selected 604 and processed in the same manner 584.

Continuing with FIG. 22, each block of a page table must next be filled with record pointers, which indicate the location of the compacted records containing a specific index value. A database image record is read 606, and a record pointer is constructed using the partition number and relative record location of the read record 610. Next, an index value is selected from the read record 612, and a page pointer corresponding to the index value is read from the index table 614. The page entry number in the page pointer is decremented 616. If the page entry number in the page pointer is negative one 620, the page number is decremented 622 and the page entry number is reset to the bottom of the previous page 624 (page entry number=$65,536 \times C_{16}$–1). The record pointer is then stored in the page table at the location specified by the page pointer 626. In this manner, each block of the page table is filled from the bottom up, completing the page table for a particular indexing field. If other indexes remain to be processed 630, the next index field in the record is selected 612. When all records are processed 632, the index access structure construction process is complete 634.

Figure 23A:
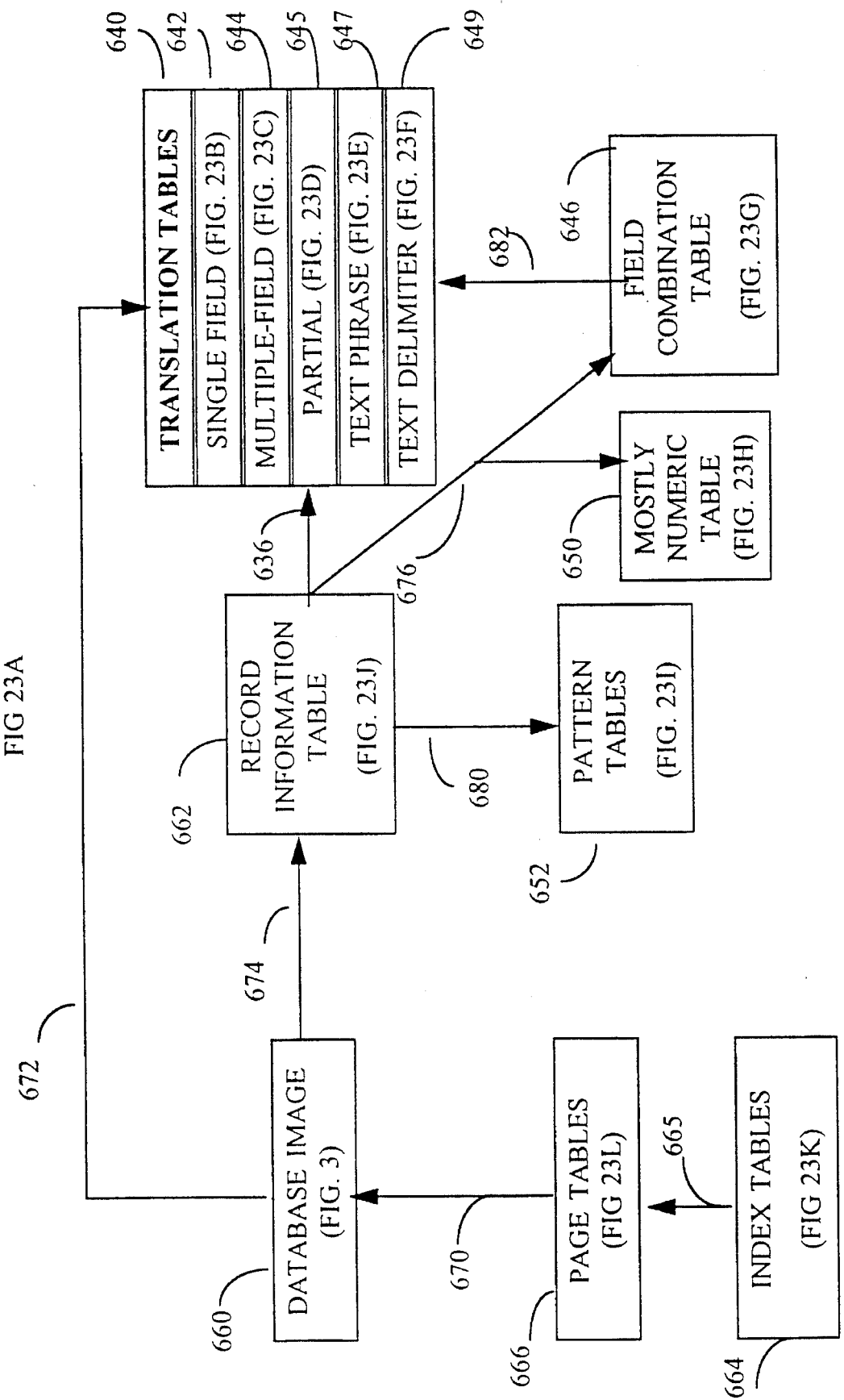
FIG. 23A is a top-level diagram illustrating an embodiment of the database data structures and information flow between data structures according to the present invention.

After completion of the index access structure, computer system storage contains the data and tables shown in FIG. 23A. The translation tables 640, discussed in detail above with respect to FIGS. 14 and 15, include the single-field 642, multiple-field 644, partial 645, text phrase 647 and text delimiter 649 translation tables. Each translation table contains a series of "slots" and a corresponding series of "numeric equivalents." There is one slot for every different data value in a single field translation table 642; every different data value combination in a multiple-field translation table 644; every different data value translated in a partial translation table 645; every different word or phrase in a text phrase translation table 647; or every different delimiter in a delimiter translation table 649. In each translation table, the slots are ordered based on slot size, i.e. the number of records in the slot. For example, the number of occurrences of a particular data value in a single field is the size of the slot for that data value. The corresponding numeric equivalents for the slots are consecutive integers, starting with 0, that represent the rank of the slots. That is, the largest slot has the numeric equivalent 0 and the next largest slot has the numeric equivalent 1, etc. Each data value (data value combination, word, phrase and delimiter) in a slot is assigned the same numeric equivalent, and when that numeric equivalent is converted to a code, the code becomes a compacted data value.

FIG. 23B is an example single-field translation table showing the slots and the corresponding numeric equivalents. The dashed lines in FIGS. 23B–L indicate entries which are not shown in the figures. "Valley" is the largest slot because it is assigned a numeric equivalent of 0. Hence, the data value "Valley" occurs more frequently in this field than any other data value. Regardless of the method used to encode the numeric equivalents (variable-byte, single-byte or combination codes), the compacted data value for "Valley" will be the single byte $00_{16}$. (See FIG. 23M, row number 1). Therefore, for every record where "Valley" appears in this field, the corresponding compacted record will contain the compacted data value $00_{16}$.

FIG. 23C shows an example multiple-field translation table. The largest slot in this combination of two fields is "Smith 91766." As above, regardless of how the numeric equivalents are encoded, the compacted data value for this slot will be $00_{16}$. Therefore, for every record where "Smith" is in one field and "91766" is in the other, the corresponding compacted record will have a single field with the compacted data value $00_{16}$.

FIG. 23D shows an example partial translation table. This table contains only numeric equivalents for the 256 largest slots. All other slots are unencoded. The numeric equivalents can be encoded with one byte. That is, the compacted data values will be $00_{16}$ for "Ship," $01_{16}$ for "Install," . . . and $FF_{16}$ for "Update." For every record in the original database containing a data value that is in one of the slots shown in the table, the corresponding compacted record will contain one of these compacted data values.

FIG. 23E shows an example text phrase translation table and FIG. 23F shows a corresponding example text delimiter translation table. The slots in the phrase table are words such as "Radio" or phrases such as "Control Console." The slots in the delimiter table are " ", "-" and ";" etc. If the text field in one record contained the data value "radio network antenna-system manuals," then the numeric equivalents for the phrases are 10, 3 and 7. The numeric equivalents for the delimiters are 0, 2 and 0. Using the coding of FIG. 18B, the corresponding sequence of numbers representing this data value is $2A238227_{16}$. Using the table of FIG. 18B to interpret this sequence, the "$2_{16}$" of "$2A_{16}$" indicates that this is a word from the text translation table and the remaining 4-bits "$A_{16}$" are the numeric equivalent (in this case 10, corresponding to the phrase "radio network"). Likewise "$23_{16}$" indicates a word with a numeric equivalent of 3, corresponding to "antenna." The delimiter " " between "radio network" and "antenna" is implied in the sequence of numbers, because " " is the most prevalent delimiter (the largest slot) in this case. The next number in the sequence is "$82_{16}$" which, according to FIG. 18B, is a delimiter with a numeric equivalent of 2, which is "-" according to FIG. 23F. The final number in the sequence is "27" representing a word with numeric equivalent 7, which is "manuals" according to FIG. 23E.

The field combination table 646, discussed above with respect to FIG. 10, indicates which fields were combined and which fields are part of each combination. FIG. 23G is an example field combination table. Of the fields shown, the table indicates that fields 0 and 4 are not combined with other fields and that fields 1, 2 and 3 are combined together.

The mostly numeric fields table 650, discussed above with respect to FIG. 12, indicates which fields were subject to numeric conversion. FIG. 23H is an example mostly numeric table. Of the fields shown, the table indicates that fields 0 and 2 are mostly numeric.

The pattern tables 652, discussed above with respect to FIG. 11, contain the patterns removed from each field, arranged according to the four bit value of the corresponding pack information table entry. FIG. 23I is an example pattern definition table. For this field, there are five patterns occurring in the first three positions of the field. These patterns are "AR0," "BR0," "B_0," "_R0" and "Q_."

Stored on disk, or in main memory if sufficient space exists, is the database image 660, discussed above with respect to FIG. 21. The database image consists of partitions of storage, where each partition contains compacted records of equal length (number of bits of required storage).

Also stored on disk, or potentially in main memory, is the record information table 662, also discussed with respect to FIG. 21. Given the partition number of a compacted record in the database image and the value of the type byte appended to the compacted record, the record information table identifies the pack method for each field of the compacted record. That is, the record information table provides information regarding the pattern number and storage method number for each field of the compacted record. FIG. 23J is an example record information table. This table shows that all compacted records contained in partition 0 with a type byte value of 1 are stored as follows: field 0 has no pattern and a four-byte variable byte code which represents a numeric equivalent whose value is between 16843007 and 4311810304; fields 1 and 17 have no pattern and a single byte numeric equivalent whose value is between 0 and 255; field 2 has a suppressed pattern number 5 and a single byte numeric equivalent between 0 and 255; field 26 and 27 have no pattern and is stored in original form.

For efficient access, there is also an index table 664 and a page table 666 for each indexing field, as discussed above with respect to FIG. 22. An example index table is shown in FIG. 23K, and a corresponding example page table is shown in FIG. 23L. As discussed above, the index table consists of an unpacked value for the indexing field and a 32-bit page pointer into the page table. The index table is sorted alphabetically by this unpacked value. The page table consists of multiple pages each of which are assigned a page number. Each page of the page table initially contains 52,428 record pointers (65,536 record pointer capacity×80% initial fill ratio). In a particular embodiment, the first 8-bits of a page pointer correspond to the page number, the next 16-bits correspond to a record pointer number on that page and the last eight bits are reserved for future use.

As shown in the example index table of FIG. 23K, the first entry is "Central." Because "Central" is the first index value, its page pointer is $00000000_{16}$, corresponding to page number 0 ($00_{16}$) and record pointer number 0 ($0000_{16}$) within page 0. The second entry of the index table is the index value "Chestnut." Assuming that there are 257 records in the database containing the index value "Central," the corresponding record pointers occupy the first 257 locations of page 0 (numbers 0–256) . Hence, the page pointer of "Chestnut" is $00010100_{16}$, corresponding to page number 0 ($00_{16}$) and record pointer number 257 ($0101_{16}$) within page 0. Assuming that there are 52,334 records in the database containing the index value "Chestnut," the corresponding record pointers occupy the remaining 52,171 locations of page 0 (52,428 initial capacity—257 locations associated with "Central") and the first 163 locations of page 1 (numbers 0–162). Therefore, the third index value, "Figueroa," starts on the second page ($01_{16}$) of the page table, at location 163 ($00A3_{16}$), and its page pointer, therefore, is $0100A300_{16}$.

FIG. 23L shows the beginning of an example page of the page table. The first entry is "52428" corresponding to the number of entries on the page. This is followed by that number of record pointers. These record pointers correspond to the records in the database. The first 8-bits of a record pointer specify the partition number of a record in the database. The remaining 24-bits specify the a record's position in that partition. For example, the third record pointer shown in FIG. 23L is $10000020_{16}$. This specifies partition number 16 ($10_{16}$) and record 33 ($000020_{16}$) of that partition.

Referring back to FIG. 4, there are two operational subsystems for a preferred embodiment of this database system, a build subsystem 10 and an access subsystem 40. The build subsystem 10 converts a conventional database 30 residing in mass storage 14 into a database image 12, translation tables 20 (single-field, multiple-field, partial, text phrase and text delimiter tables), auxiliary tables 22 (field combination, mostly numeric, pattern and record information tables) and access tables 24 (index and page access tables). A preferred embodiment of the build subsystem accomplishes this task in five passes, where each pass involves reading through the entire conventional database 30 either by reading each record (an unsampled pass) or skipping records using a sampling technique as described above (a sampled pass). The build subsystem constructs the database image and all tables in mass storage 14. The access subsystem 40 then loads the translation 20 and auxiliary 22 and access tables 24 in RAM 16 prior to use of the database. Based on how much RAM 16 is in a particular system, the access subsystem 40 will leave the database image entirely in mass storage 14 or may load part of the database image in RAM 16. A temporary "field information array" is used to store information regarding the properties of each field. A field is marked for a particular compaction method by storing status data in the field information array. The field information array also has pointers (storage addresses) to the locations within storage (mass storage or RAM) where the database image, translation tables, auxiliary tables and access tables were stored by the build subsystem.

Advantageously, the first pass through the database is an unsampled pass. Referring to FIG. 23A, this pass creates the single-field translation tables 642, the single-column pattern portion of the pattern tables 652 and the mostly numeric table 650. During this pass, fields are tested and marked (via the temporary field information array described above) for single-field encoding, pattern suppression, numeric substitution and text compression; the different data values for fields marked for single-field encoding are determined and the single-field translation tables are constructed; the single-position patterns are identified and stored in the pattern tables; and the temporary index arrays are constructed, which will be used to create the index tables 664 during the last pass.

If a text field was detected during the first pass, a second unsampled pass will be used to identify the different text words and delimiters and create the text delimiter table 649. This process is described in detail above in connection with FIG. 15.

The third pass is a sampled pass which creates the partial translation tables 645, the field combination table 646, the remaining portion of the pattern tables 652 containing multiple-position patterns, and the text phrase translation tables 647. Database sampling is described in detail above with respect to the multiple-field combining compaction method. During this pass, fields are tested and marked for multiple-field combining and partial translation; the different data values for fields marked for partial translation are determined and the partial translation tables 645 are constructed; multiple-position patterns are identified, using the single-position patterns from the first pass, and stored in the pattern tables 652; text phrases are determined using the text words identified during the first pass; the text words and phrases are encoded; and the text phrase tables 647 constructed.

The fourth pass is unsampled and creates the multiple-field translation tables 644. During this pass, the different data value combinations from the fields marked for combining are identified and encoded.

The fifth pass is the final pass and is used to create the database image 660, the record information table 662, the page access tables 666 and the index tables 664. During the fifth pass, the compacted records are created in accordance with the method outlined in above with respect to FIG. 16. Also, the temporary pack information table is generated, indicating the patterns and storage method for each field of each record. The record information table 662 is created from the temporary pack information table during this pass. Each different row of the pack information table creates a column in the record information table and each such column is assigned a partition number and type byte. After the compacted records are created, the compacted records are grouped in partitions, and a type byte is appended to the compacted records. With this last step, the database image 660 is complete. The locations of compacted records within the partitions of the database image are used to create the page access tables 666, and these tables are used with the temporary index array created during the first pass to create the index tables 664. At this point, the work of the database build subsystem is finished.

Referring to FIG. 4, the access subsystem 40 operates to enable use of the database structure created by the build subsystem 10. Initially, the access subsystem 40 takes the database image and tables, which at this point still reside in mass storage 14, and places the tables in RAM 16 and the database image 12 in either mass storage 14 or in RAM 16 or split between both. Once in this configuration, the database structure can be accessed. FIG. 23A shows the interrelationship of the database image 660 and various tables during operation of the access subsystem. The data structures of the database in accordance with the present invention are shown in FIG. 23A as boxes. The information flow between data structures, that is, the data obtained from one data structure which is used to access data in another data structure, is shown in FIG. 23A as connecting arrows between boxes.

To access data, an index value (a data value in an index field) specified by a user is used by an index table 664 to specify a page pointer 665. As discussed below, if more than one index values are specified, the access subsystem chooses the most efficient index value to use. The page pointer 665, in turn, is used by a page table 666 to specify a block of record pointers 670. These record pointers 670 specify locations of compacted records within the database image 660, which can then be read, modified or deleted. Alternatively, if no index is specified, one or more fields and one or more data values in each field are specified by the user, the data values are compacted and the database image 660 is directly searched for compacted records containing these compacted data values. Note that the database image 660 is searched without uncompacting. This would not be possible if the database was compressed using a context specific compression algorithm (such as the Huffman code). Each compacted data value in the database image 660 uniquely corresponds to uncompacted data values through reference to the record information table 662, translation tables 642, pattern tables 652, mostly numeric table 650 and field combination table 646. This feature allows database image processing using compacted data and avoids processing delays associated with database decompression.

Further information flow is required between data structures if it is required to uncompact the compacted records located by the user access request into records containing user readable data values. The compacted data values 672 from the compacted records are used by the translation tables 640 to obtain equivalent data values. The number of the partition containing a compacted record and the value of the compacted record's type byte 674 specify a column of the record information table 662 which contains pattern and storage method numbers for each field. The rows of the record information table 662, specify field numbers 676, which are used by the mostly numeric field table 650 and the field combination table 646. If a particular field is a mostly numeric field or is combined with other fields, its field number will be found in these tables. In turn, these tables notify the database access system that the compacted data values 672 are either numeric values or represent codes associated with multiple fields in the original database. Pattern numbers 680 from the record information table 662 are used by the pattern table 652 to specify particular patterns which are to be replaced in compacted data values to recreate the original data values. Storage method numbers 636 from the record information table 662 are used with the translation tables 640 to recreate data values from compacted data values. The storage method numbers 636, specify whether fields are partial or fully translated, whether fields are encoded with variable-byte, single-byte or combination codes, and the particular variable-byte, single-byte or combination byte used.

Figure 24:
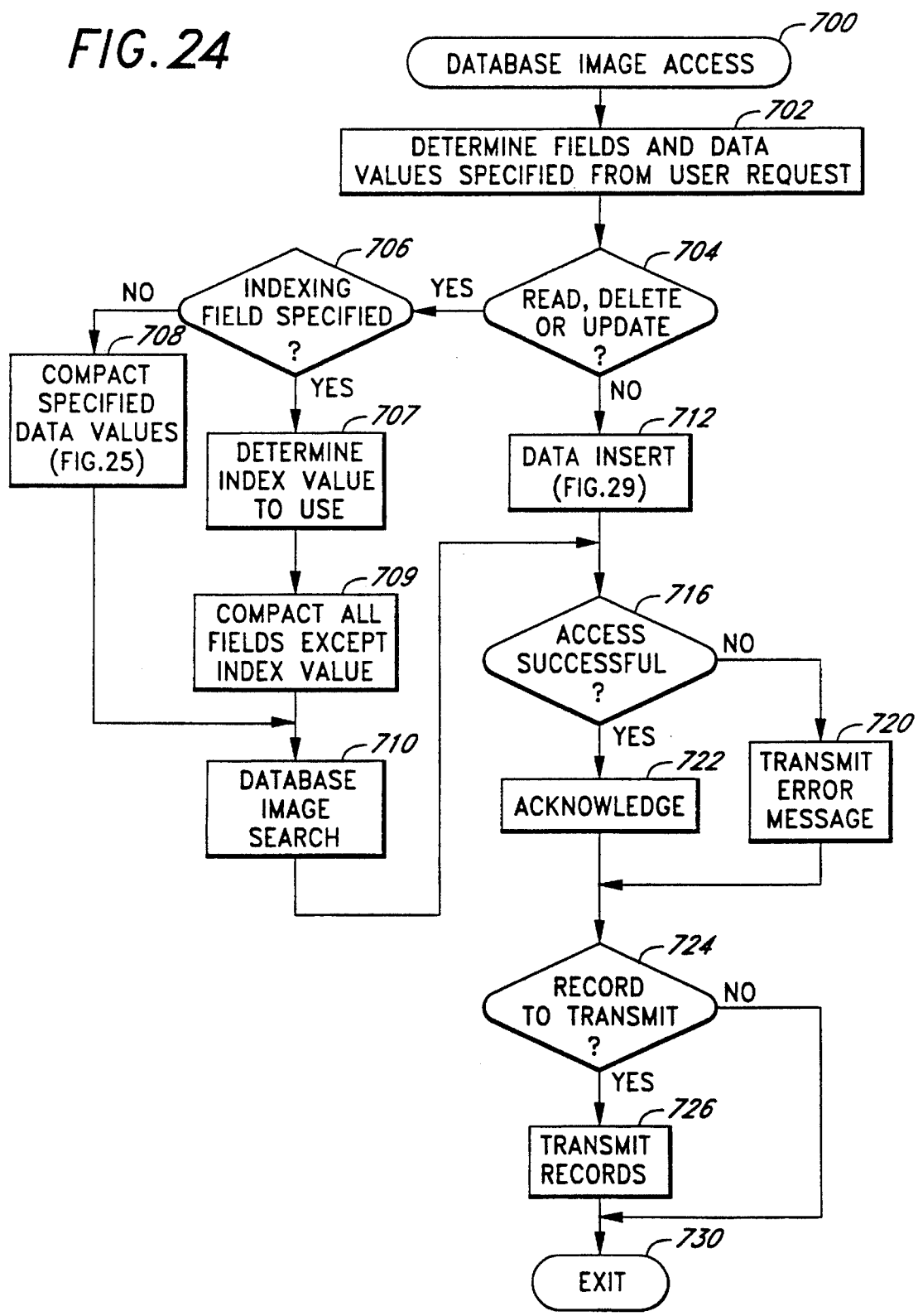
FIG. 24 is a top-level flowchart of a preferred database image access process for data reads, data deletes and data updates.

FIG. 24 illustrates the process for accessing data in the database image 700. The access begins with a request for data from the user of the database. The user request contains specified fields and data values. These are determined from the user request 702. If the request is for a read, delete or update 704, a search for records satisfying the request will occur. Recall that an index field, like an index for a textbook, provides an efficient means of accessing data. The user request might not specify an index field, might specify a single index field or might specify multiple index fields (if more than one index field was created during the build process). If an indexing field is not specified by the user 706, the data values specified must first be compacted 708 to the equivalent representations in the database image. Then the database image can be searched 710 for records satisfying the user request. If at least one index field is specified 706, all data values specified by the user within an index field (called index values) are identified and the index value to be used is determined 707. As discussed above using FIG. 1A as an example, the "Last Name" field was made an index field. If a user requested data on "people whose last names are "Grant," then the "Last Name" field is a specified index field and "Grant" is a specified index value.

The index value used during an access is the one which will most limit the search. In the case where only one index value is specified by the user, that index value is selected. In the case where more than one index values are specified, the index which results in the least number of records to be searched is selected. As previously discussed, an index value is contained in an index table with a corresponding page pointer. A page pointer specifies a block of record pointers that span one or more pages of at most 65,536 record pointers each. The position of a record pointer within a page is called its page entry number. The number of records to be searched is determined by the "distance" between the page positions specified by two page pointers, the page position corresponding to a specified index value and the page position corresponding to the next index value in the index table for that index field. The difference between two page pointers is a function of the pages they point to. If they point to the same page, the difference is the difference in their page entry numbers. If they do not point to the same page, the difference is the total number of entries on the page pointed to by the first value, less the first value's page entry number added to the sum of the second value's page entry number and the number of entries in all intervening pages. In the special case where the last index value is supplied, a "dummy" page pointer is created, pointing to one more than the last page entry. This "dummy" entry is used as the second page pointer for number-of-record computations.

Referring again to FIG. 24, all fields supplied other than the selected index are compacted 709. The database image search 710 can then be accomplished using the selected index table directly without compacting the specified index value. If a read, delete or update were not requested 704, then a data insert is performed 712. If the requested access fails 716 (e.g. the data requested does not exist) an error message is returned to the user 720. A successful access is acknowledged 722. If a data read is requested and records are located 724, the records are transmitted to the user 726 and the access is complete 730.

Figure 25B:
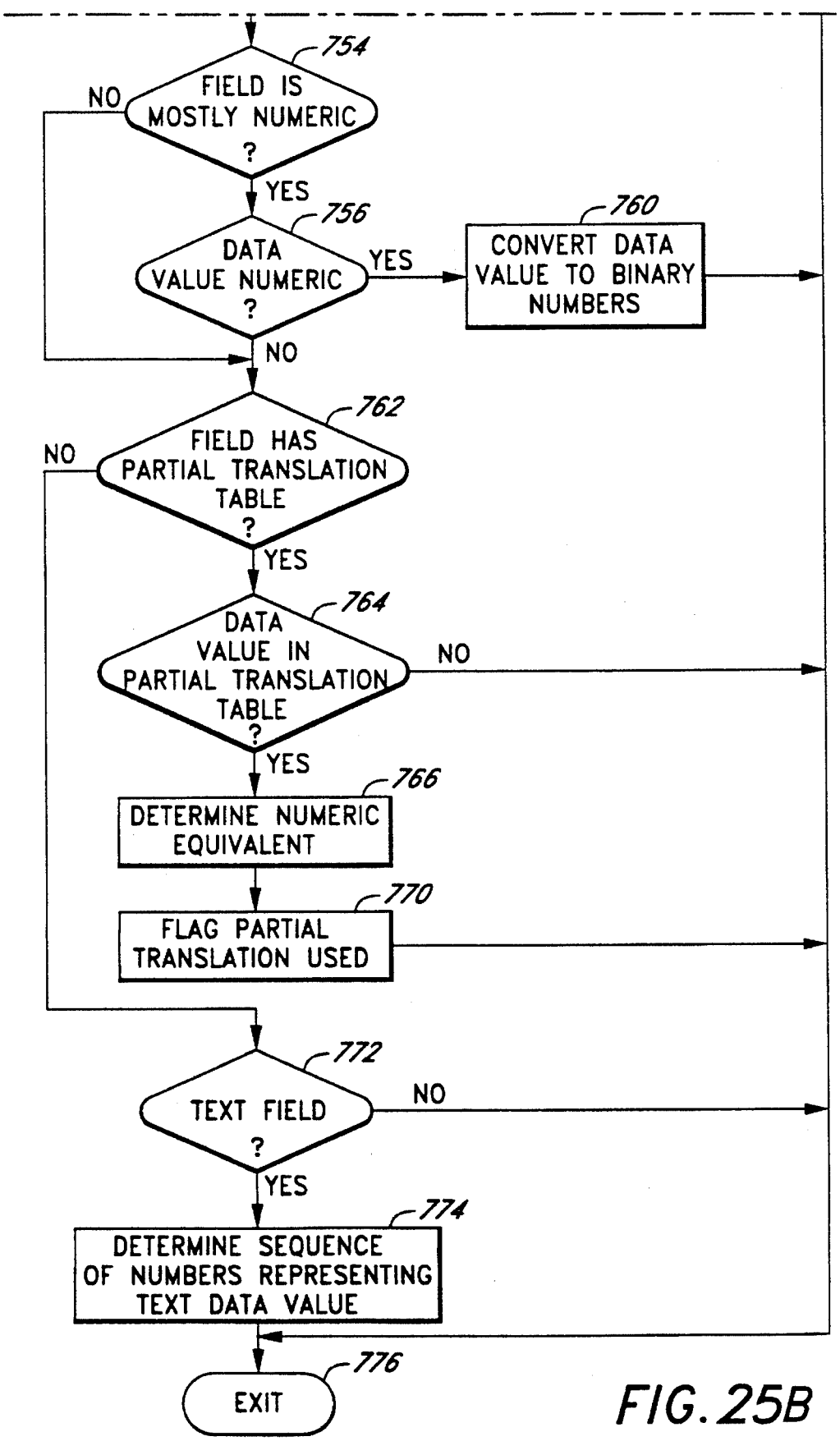
FIG. 25 comprising views shown in FIGS. 25A–B show a detailed flowchart of a preferred data compaction subprocess used in the access process of FIG. 23A.

One type of read request is: "find all records in a field of the database with a data value equal to the one supplied." That is, a field and data value are specified. As shown in FIG. 25, this type of data read request begins by determining the form of the specified data value as it is stored in the database image 732. If the specified field has a translation table 734, the specified data value is replaced with its numeric equivalent 736. If the field is part of a multiple field combination 740, the data value is replaced by a set of one or more numeric equivalents 742, where each numeric equivalent corresponds to a different data value combination containing the specified data value in the specified field. If there is no numeric equivalent in a translation table associated with a field to the value supplied for that field, the database is not read and a "no record found" status message is sent to the user. If the field has a pattern information table 744 and the data value has a pattern 746, the pattern is removed from the data value 750 and the pattern number is flagged for use in pack information identification 752. If the field is in the mostly numeric table 754 and the data value is a numeric 756, it is converted to a binary number 760. If the field has a partial translation table 762 and the data value is one of the 256 entries in this table 764, the data value is replaced with its numeric equivalent 766 and a flag is set 770 that indicates a partial translation was used, for pack information identification. If the field is a text field 772, the sequence of numbers representing the text data value is determined 774. At this point, the specified data value has been converted to its compacted form 776. Then the entire database image can be searched for compacted data values matching the compacted data value or set of compacted data values calculated above.

Figure 26B:
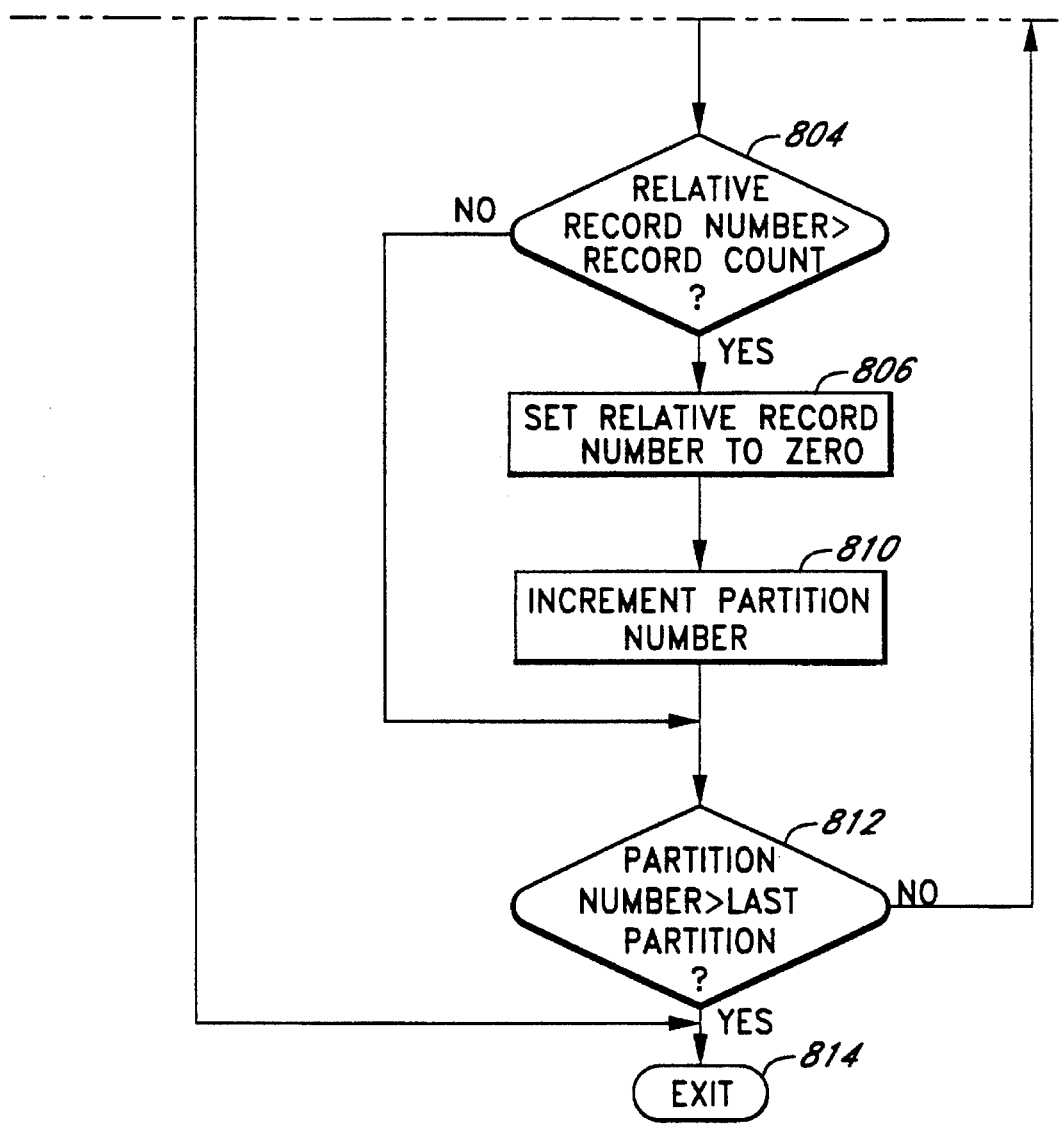
FIG. 26 comprising views shown in FIGS. 26A–B show a detailed flowchart of a preferred data search subprocess used in the access process of FIG. 23A.

As shown in FIG. 26, a complete database search 780 begins by determining if an indexing field is specified 782. If not, the current record and partition number are initialized to zero 784. A compacted record is retrieved from the current partition/record location specified 786. The type byte appended to the record is read 790 and used to retrieve a column from the record information table 792. If the type byte is equal to 255, the record is ignored. The record information table column indicates the location within the compacted record of the field of interest 794. The compacted data value is retrieved and compared with the compacted data value computed above 796. If there is a match, the compacted record is processed 800. If no match, the current record number is incremented 802. If the current record number is greater than the number of records in the current partition 804, the current record is set to zero 806 and the current partition is incremented by one 810. If the current partition is greater than the number of partitions 812, the end of the database image is reached and the data search is concluded 814. Otherwise, the next record is read 786.

If an index field is specified for the data access 782, it is unnecessary to first convert the requested data value to compacted form, because the index table contains sorted data values in uncompacted form. The data access occurs by locating the specified data value in the index table 816. If the supplied value is not found in the index table, the database is not read and a "no record found" status message is sent to the user. The page pointer is read 820, which specifies the beginning of a block of record pointers containing this index value. This block of record pointers is then used to access compacted records satisfying the data request. A record pointer is read from the page block 822. The record pointed to is read 824, the record is processed 826 and the page pointer is incremented 830 to the next record pointer in the page block. The page pointer is tested for an end of block condition 832. An end of block condition exists when the page pointer is equal to the next index value's page pointer or the end of the database is reached. If an end of block condition is not reached, the next record pointer is read 822. Otherwise, the access is complete 814.

Figure 27:
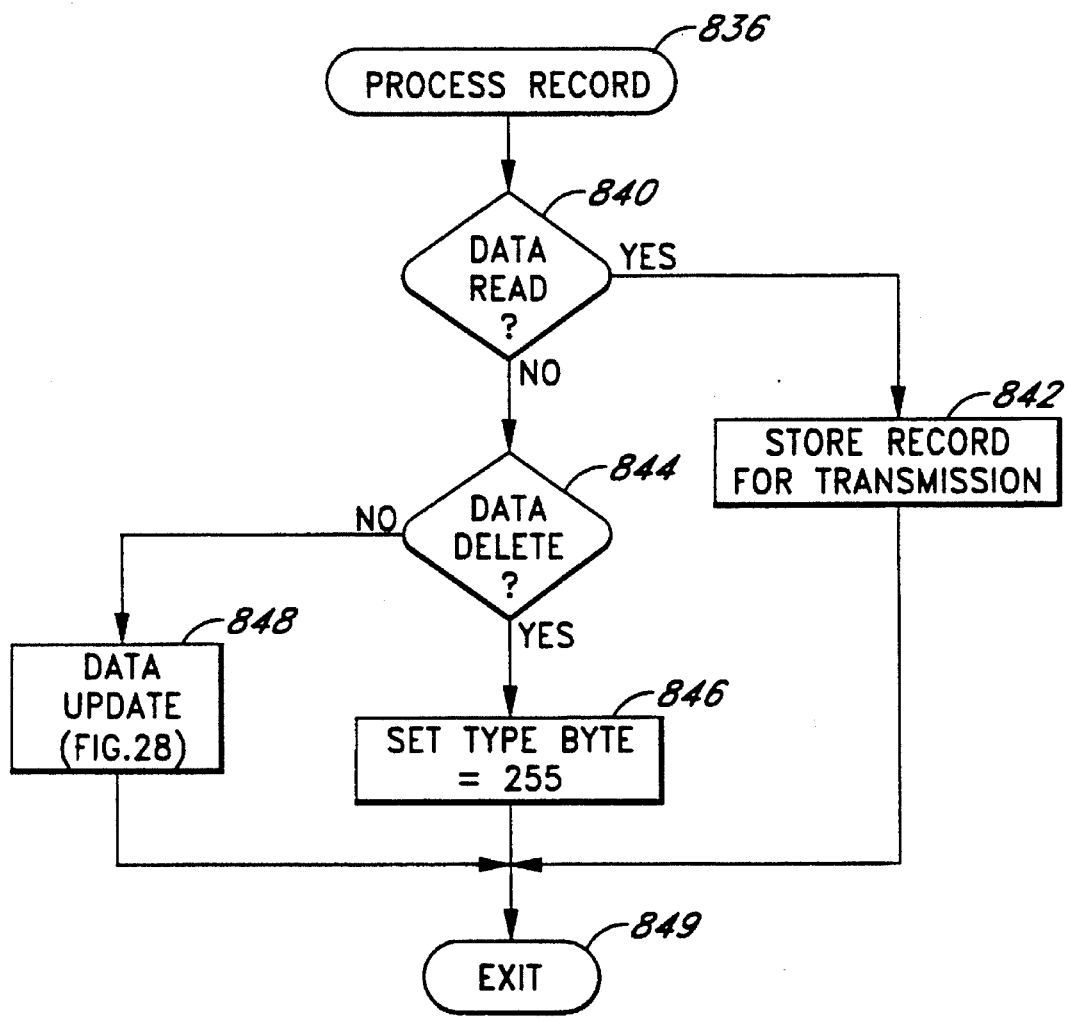
FIG. 27 is a detailed flowchart of a preferred record processing subprocess used in the access process of FIG. 23A.

FIG. 27 shows the record processing 836 required for reads, deletes and updates. For reads 840, a compacted record located during the database image search is stored for transmission 842, completing the record processing 849. If the compacted records found during a read are to be output to the user, the compacted records are uncompacted at this point as described above in relation to FIG. 23A.

Other types of data reads are possible using the same methods. For instance, the read request: "find all records in the database logically related to the specified data value" (e.g. greater than) or "find all records in the database satisfying a partial field description" (eg. all data values in the "Name" field starting with "S"). One of ordinary skill in the art will recognize how to perform other types of data read accesses, given the structure of the database image and associated tables.

One type of data delete request is: "delete each record from the database in which the fields specified contain the data values specified." As shown in FIG. 24, the data delete is similar to the data read described above, in that a record or records matching a specified field and data value must be found. If one or more indexing fields are specified 706, the index value used to limit the search is determined 707, all other supplied values are compacted 709, and the database image is searched for the records to delete 710. Otherwise, the specified data value must first be converted to compacted form 708. The record processing 836, once a record is found, however, is different. As shown in FIG. 27, if the access is a data delete 844, records accessed have the appended type byte set to 255 to indicate a deletion 846, completing the record processing 849.

A data update changes one or more field values in an existing record or records. An update request consists of data describing the record to be updated (record constraints) and new values for specified fields. As shown in FIG. 24, the data update is similar to the data read and data delete described above, in that a record or records matching a specified field and data value must be located. If one or more indexing fields are specified 706, the index value used to limit the search is determined 707, all other supplied values are compacted 709, and the database image is searched for the records to update 710. Otherwise, the specified data value must first be converted to compacted form 708. As shown in FIG. 27, however, the record processing 836 once a record is found is different for an update 848 from a read 842 or delete 846.

Figure 28:
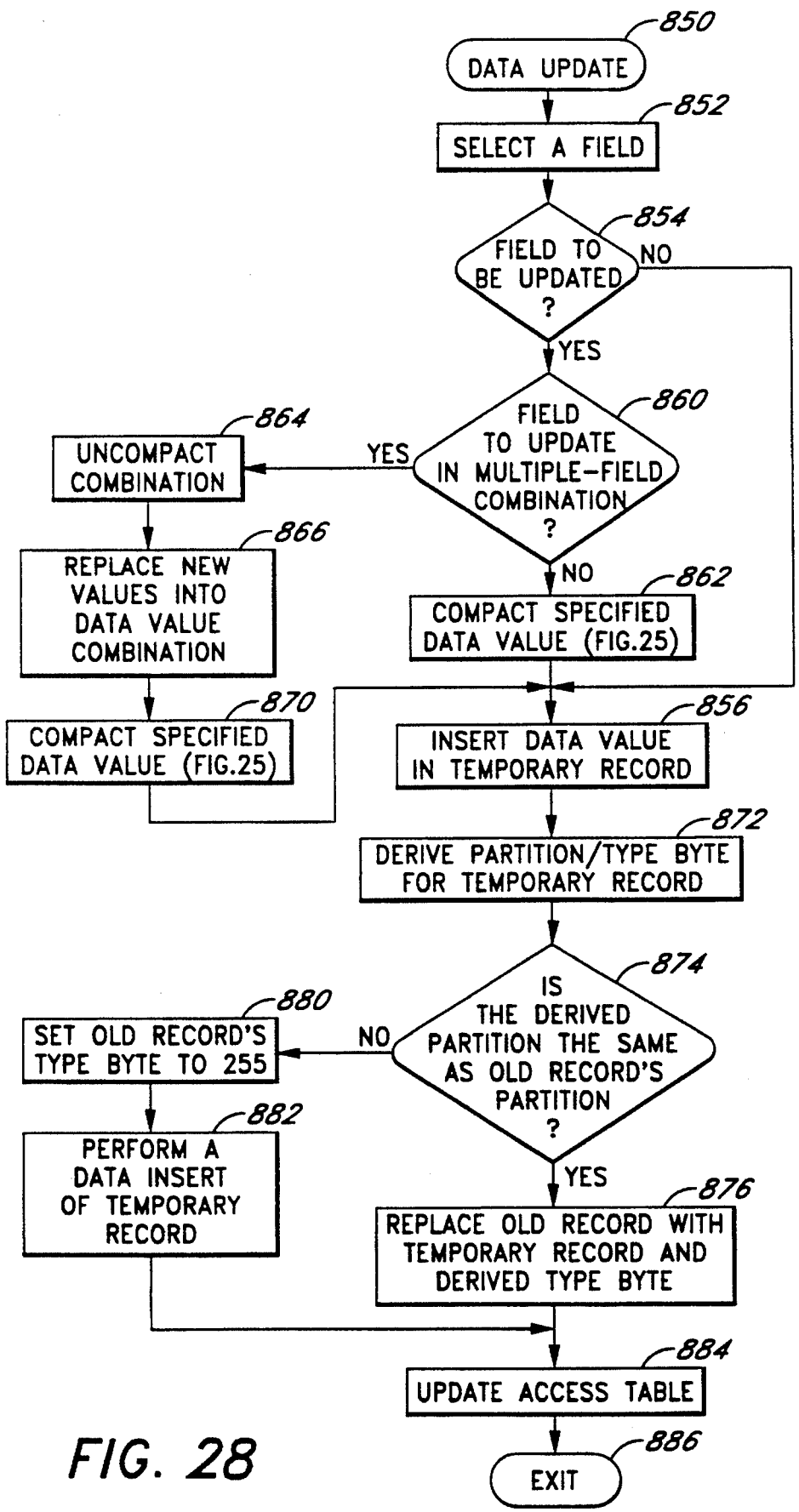
FIG. 28 is a detailed flowchart of a preferred access process for data updates.

As shown in FIG. 28, processing a record for a data update 850 begins by selecting a field within the record 852. Next, it is determined if the field selected is one of those specified to be updated 854. If not, the data value in the field is unchanged and directly inserted into a temporary record 856. If the field is specified for updating, it is determined if the field is in a multiple-field combination 860. For fields which are not contained within multiple field combinations, the new data value given for the field is compacted 862 and inserted in the temporary record 856. If the field is contained in a multiple field combination, the data values in the record are uncompacted 864 and the resulting data value combination is modified with the new data value or values 866. This updated data value combination is then recompacted 870 and inserted in the temporary record 856. The partition number and type byte for the temporary record are then derived 872. If the partition number is the same as that of the existing record 874, the existing record is overwritten by the temporary record and its type byte 876. If not, the existing record's type byte is set to 255 880 to indicate its deletion, and a data insert is performed using the temporary record 882. The access tables for all indexes are then updated 884.

Figure 29:
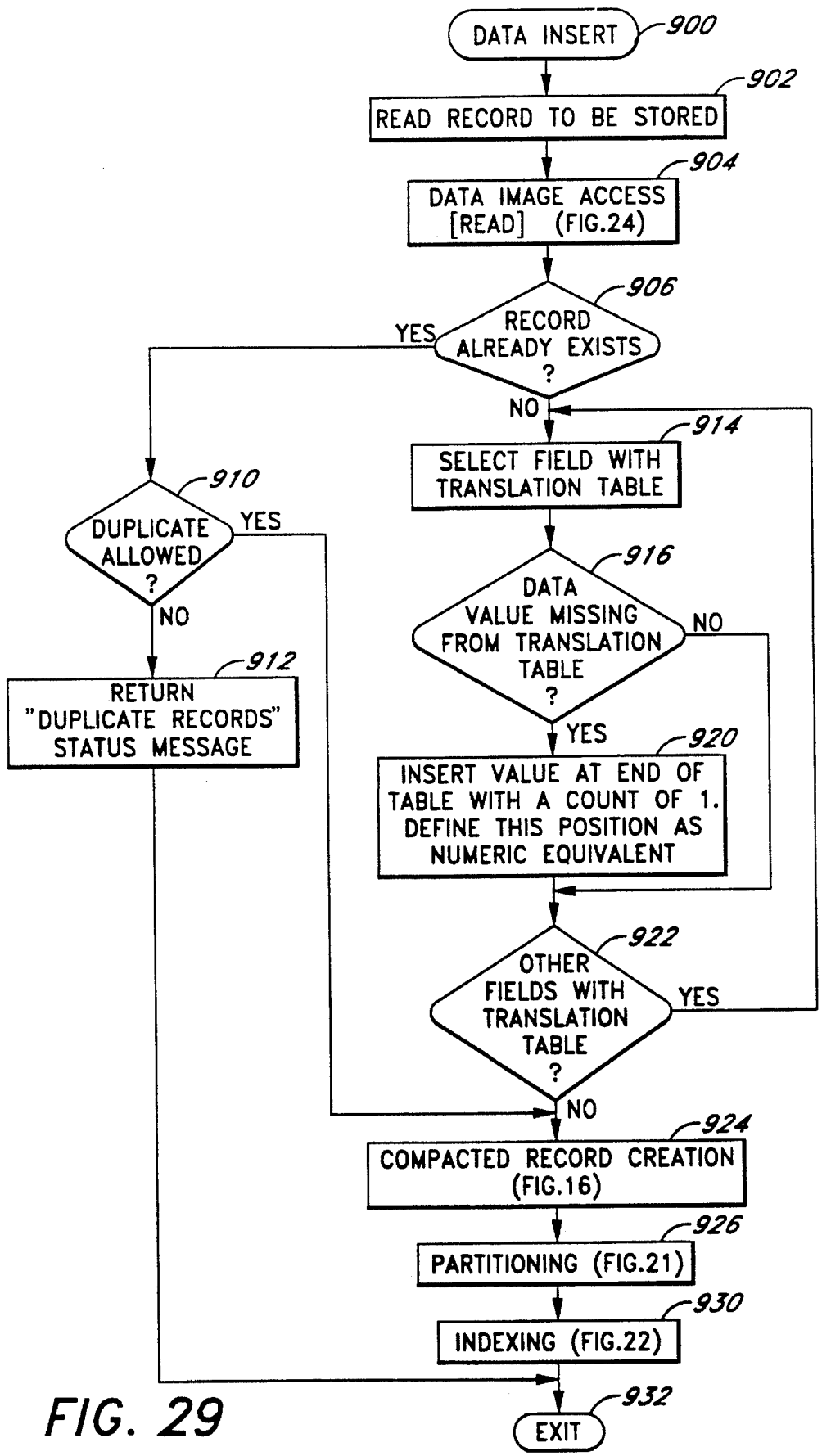
FIG. 29 is a detailed flowchart of a preferred access process for data inserts.

A data insert adds a complete new record to the database. As shown in FIG. 29, a data insert 900 begins by reading the record to insert 902. A data read is then performed 904. If the record already exists 906 and the rules associated with this database do not permit duplicate records 910, a "duplicate record" status message is returned to the user 912 and the process is terminated 932. If no duplicate exists, it is determined, for every field with a translation table 914, if the data value to insert is missing from the corresponding translation table 916. If the data value is not found, the value is added to the end of the translation table with a count of one 920. The numeric equivalent of this data value is the numeric equivalent of the previous entry in the translation table plus one. All fields with translation tables are checked in this manner 922. The record is then packed 924 and placed in the proper partition 926. This step might create a new column in the record information table. If the partition determined from the record information table has any deleted records, the compacted record is copied to that location. Otherwise, the compacted record is copied to the end of the appropriate partition and the partition record count is incremented. Finally, the access tables for all indices are updated 930 and the process is terminated 932.

An application may require access to the database from a remote location, that is, a location different from the host computer where the database data is normally stored and processed. This access is accomplished by linking a remote device to the host computer via a communications channel. This communications channel may be "wireless," such as a radio link, or it may be a conventional telephone line or similar "wireline" link.

Remote access using a database in accordance with the present invention requires less total data to be transmitted across the communications channel (reduced communications channel traffic) as compared with using a conventional database. Conventional database data is transmitted in an uncompacted form, although such data might be compressed at the transmitting end of the communications channel and decompressed at the receiving end. Database image data, however, can be transmitted between the host computer and the remote device in compacted form. This compacted data can also be compressed at the transmitting end of the channel and decompressed at the receiving end by conventional techniques. Reduced data flow across the communications channel is achieved by transmitting a "code" (a compacted data value) in place of the data value. This requires the host computer and the remote device both to "know" the code, as defined by the translation and auxiliary tables.

In order to achieve efficient remote access of the database image, as noted above, the remote device must be capable of transmitting and receiving database data in compacted form. The remote device must also be capable of translating the data to and from its original form and its compacted form for interfacing with a remote user. The remote device, therefore, must store the translation and auxiliary tables, which are necessary to compact and uncompact the data. Further, the remote device must perform the associated computational functions on these tables. Referring to FIG. 4, the remote device must have RAM 16 in which the translation tables 20 and the auxiliary tables 22 are stored. The remote device must also have a CPU 46 and an associated operating system 50 capable of executing the functions of the database image access processor 42 which operate on the translation tables 20 and auxiliary tables 22. The remote device must also have input and output devices 36 for the remote user interface. The remote device might also have a non-volatile memory of sufficient size to contain the translation tables 20 and auxiliary tables 22. If so, then these tables can be loaded into RAM 16 from the non-volatile memory upon power-up of the remote device. In cases where a remote device performs operations on a limited subset of the data, the remote device might only require a partial version of the translation and auxiliary tables. Likewise, different remote devices might each contain a different set of partial translation and auxiliary tables.

Utilizing the inherent structure of the database according to the present invention allows further reductions in communications traffic across the communications channel compared with the remote access of conventional databases. In addition to transmitting the data values contained in a database, remote access also requires the transmission of storage format information. That is, the receiving end (remote device or host computer) needs to know what was sent in addition to the value sent. Conventional database records containing multiple fields of data would have to be accompanied by information effectively describing the record length, the number of fields in the record and the storage length of each field. This may be accomplished in several ways. For example, each transmitted record and each field within a record could be set to a known, fixed length by adding filler (bytes containing no information). Alternatively, each transmitted record could be preceded by a header specifying the record length, the number of fields in the record and the length of each field. Another possibility is to transmit "start" and "stop" codes between each record and between each field of each record. The fixed-length field, header and the start/stop code methods all result in excess transmitted information.

The record information table residing in both the host computer and remote device contains storage format information for all the compacted records and the fields within these compacted records. Thus, given the number of the partition where a compacted record is stored within the database image and the type byte appended to the compacted record, the storage format for all fields of the compacted record can be determined from the record information table. Therefore, only the partition number and type byte (two bytes total) need be transmitted with the compacted record in order to completely describe the transmitted information to the receiving device.

If only a partial compacted record is transmitted (less than all of the fields), a field identification "bit map" also needs to be transmitted with the compacted data values, partition number and type byte in order to describe the information transmitted. This bit map is simply a series of bits, where the least significant bit represents the first field of the compacted record and the most significant bit represents the last field of the compacted record. A bit is set to "1" to indicate that a field is transmitted and is set to "0" to indicate that a field is not transmitted. For example, if 8 fields are in a compacted record, the field identification bit map "$00101101_2$" indicates that the 1st, 3rd, 4th and 6th fields are transmitted. Therefore, this bit map and the compacted record's partition number and type byte are all that needs to be transmitted with the 4 compacted data values to enable the receiving device to interpret this transmitted information.

If the database image contains a combination field (two or more fields processed by the multiple-field combination compaction method), the field identification bit map and the corresponding transmitted data is slightly more complicated. This complication arises because either an entire combination field (i.e. all single-field constituents of a combination field) may be transmitted or fewer than all the constituent fields may be transmitted. The field identification bit map needs to distinguish these two possibilities. Also, because a constituent field must be transmitted in uncompacted form (it is only compacted when combined with all other constituent fields of a combination field), an indication of the amount of uncompacted data transmitted must accompany the transmission.

To apply the field identification bit map to both single fields and combination fields, a correlation between specific bits of the bit map and constituent fields of a combination field needs to be established. This correlation is best illustrated by example. Assume that a compacted record of a specific database image contains 8 fields, where the 4th and 6th fields are combination fields, the 4th field consists of 3 constituent fields and the 6th field consists of 4 constituent fields. The bit map has 13 bits, 6 bits for the single fields and 7 bits for the constituent fields of the 2 combination fields. The 3 least significant bits of the bit map represents the first 3 (single) fields, the next 3 bits of the bit map represents the 3 constituent fields of the 4th (combination) field, the next bit represents the 5th (single) field, the next 4 bits represent the 4 constituent fields of the 6th (combination) field, and the 2 most significant bits of the bit map represent the 7th and 8th (single) fields. Thus, the bit map "$1001100100100_2$" indicates the 3rd single-field, the 3rd constituent field of the 4th (combined) field, the 2nd and 3rd field of the 6th (combined) field and the 8th single-field are all transmitted. For transmitted constituent fields (those that are part of a combination field which is not transmitted in its entirety), a "length byte" is sent which precedes each constituent field's data value. This byte is equal to the number of bytes of uncompacted data transmitted (up to 255 bytes). If the bits for all constituent fields of a combination field are set to "1," this indicates that the combination field is transmitted in its entirety and is in compacted form.

As noted above, data communicated between a host computer and a remote device is, for the most part, in compacted form. This data remains compacted for all access operations. Data is returned to its original form only for presentation to its user (e.g., print or display). This compacted form reduces the communication channel traffic compared with the traffic if the original form of the data had been transmitted. In addition, certain transactions can be performed in their entirety at the remote device. For example, a request for data containing a field associated with a translation table will return "no data found" if there is no entry corresponding to the supplied data in that translation table.

In some cases, it is desirable to distribute portions of a database (remote partial database copies) to remote locations while maintaining the complete database at a central location. These remote partial database copies need not be the same at each remote location. Each remote partial database copy employs two unique sets of translation and auxiliary tables. The requirements of each remote location define its remote partial database copy and translation and auxiliary tables. Use of remote partial database copies allow for most of the processing to be performed at remote locations without communications with a central location. Each remote partial database copy applies the same methods of compaction and access as the database at the central location. For example, the company of FIGS. 1A–E has several locations as shown in FIG. 1E. FIG. 1B shows the company's work order information as maintained at its central location. Each remote location could have a remote partial database copy of this WORK_ORDER_INFO table which consists of only those records which contain the WRK LOC values associated with its location.

The database structure and method of building the same have been disclosed in detail in connection with the preferred embodiments. These embodiments are disclosed by way of examples only and are not to limit the scope of the present invention, which is defined by the claims that follow. One of ordinary skill in the art will appreciate many variations and modifications within the scope of this invention.

What is claimed is:

1. A database storage method for encoding a database structure having a plurality of data records and a plurality of data fields, said method comprising the following steps:

selecting a field of the database structure from the plurality of data fields;

reading a plurality of data values from the selected field, each individual data value being read from a separate record;

determining a plurality of field characteristics and a plurality of compaction criteria, the field characteristics being dependent on the data values within the selected field and the compaction criteria corresponding to a plurality of compaction methods wherein each compaction method has a relative priority level;

identifying a first field characteristic from said plurality of field characteristics which satisfies a corresponding one of said compaction criteria, said first field characteristic corresponding to a first compaction method with the highest priority level of any remaining compaction methods which also have compaction criteria satisfied by a corresponding field characteristic;

applying the first compaction method to the selected field to create a plurality of compacted data values, the compacted data values being reduced storage equivalents of the data values; and storing the compacted data values in a plurality of compacted records.

2. A database storage method according to claim 1, wherein one of the compaction methods is single-field encoding, comprising the steps of:

assigning a numeric equivalent to each data value; and creating a plurality of compacted data values corresponding to the numeric equivalents.

3. A database storage method according to claim 2, wherein the assigning step comprises the steps of:

listing the different data values;

sorting the list by frequency of occurrence of the data values within the field; and associating a unique number with each listed data value, each number corresponding to the rank of the listed data value, where the smallest number corresponds to the most frequently occurring data value and the largest number corresponds to the least frequently occurring data value, the associated number being the numeric equivalent of the data value.

4. A database storage method according to claim 2, wherein the creating step comprises the steps of:

encoding each numeric equivalent with a binary number; and replacing each data value with the binary number which is the encoded numeric equivalent of the data value, the binary numbers being the compacted data values.

5. A database storage method according to claim 1 wherein the compaction methods comprise single-field encoding, multiple-field combining, pattern suppression, numeric substitution, and text compression; and the relative priority levels of the compaction methods are from highest to lowest priority as follows: multiple-field combining, single-field encoding, pattern suppression, numeric substitution, and text compression.

6. A database storage method according to claim 1, wherein one of the compaction methods is multiple-field combining, said method further comprising the steps of:

selecting a second field of the database structure;

reading a second plurality of data values from the second field, each individual data value from the second plurality of data values being read from a separate record;

identifying a plurality of data value combinations, each of which comprise one data value and one second data value occurring together in the same record;

assigning a numeric equivalent to each data value combination; and creating a plurality of compacted data values corresponding to the numeric equivalents.

7. A database storage method according to claim 6, wherein the assigning step comprises the steps of:

listing the different data value combinations;

sorting the list by frequency of occurrence of the data value combinations within the field and second fields; and associating a unique number with each listed data value combination, each number corresponding to the rank of the listed data value combination, where the smallest number corresponds to the most frequently occurring data value combination and the largest number corresponds to the least frequently occurring data value combination, the associated number being the numeric equivalent of the data value combination.

8. A database storage method according to claim 6, wherein the creating step comprises the steps of:

encoding each numeric equivalent with a binary number; and replacing each data value combination with the binary number which is the encoded numeric equivalent of the data value combination, the binary numbers being the compacted data values.

9. A database storage method according to claim 1, wherein one of the compaction methods is pattern suppression, comprising the steps of:

identifying a pattern, the pattern being a character which occurs repeatedly at a specific character position of the data values;

identifying those data values which contain the pattern;

creating a plurality of compacted data values, the compacted data values being the data values, with the pattern deleted from the data values which contain the pattern; and associating one of a plurality of storage method designations with each of the compacted data values, such that each of the designations indicate whether the pattern was deleted from one of the compacted data values contained in one of the compacted records.

10. A database storage method according to claim 1, wherein one of the compaction methods is numeric substitution comprising the steps of:

identifying any data values which are numeric;

computing a binary equivalent of each data value that is numeric; and creating the compacted data values by replacing the data values that are numeric with the binary equivalent of the data values.

11. A database storage method according to claim 1, wherein one of the compaction methods is text compression, comprising the steps of:

identifying a plurality of text portions of the data values, the text portions selected from the group consisting of a delimiter, word or phrase;

assigning a numeric equivalent to each text portion; and creating a plurality of compacted data values corresponding to the numeric equivalents.

12. A database storage method according to claim 11, wherein the assigning step comprises the steps of:

listing the different text portions;

sorting the list by frequency of occurrence of the text portions within the field; and associating a unique number with each listed text portion, each number corresponding to the rank of the listed text portion, where the smallest number corresponds to the most frequently occurring text portion and the largest number corresponds to the least frequently occurring text portion, the associated number being the numeric equivalent of the text portion.

13. A database storage method according to claim 11, wherein the creating step comprises the steps of:

encoding each numeric equivalent with a binary number; and replacing each text portion with the binary number which is the encoded numeric equivalent of the text portion, the binary numbers being concatenated to form the compacted data values.

14. A database storage method according to claim 1 wherein the step of reading a plurality of data values comprises the steps of:

determining an average sample interval;

reading the data value from the field in one of the records;

skipping at least one of the records; and repeating the steps of reading the data value and skipping until all of the records have been processed by one of the reading and skipping steps, such that an average of the records skipped is equal to the average sample interval.

15. A database storage method comprising the following steps:

selecting a field of a database, the database containing a plurality of records;

reading a plurality of data values from the field, one data value being read from each record;

calculating a field characteristic, which is the number of different data values in the field;

calculating a threshold equal to a constant of proportionality multiplied by the number of records in the database raised to a power of less than one;

comparing the field characteristic to the threshold, to determine if the field characteristic satisfies the criterion that the number of different data values in the field is less than the threshold applying the compaction method only if the field characteristic satisfies the criterion, the compaction method creating a plurality of compacted data values, the compacted data values being reduced storage equivalents of the data values;

storing the compacted data values in a plurality of compacted records, such that each compacted record contains one compacted data value.

16. A database storage method according to claim 15, wherein the constant of proportionality is in the range of 10 to 100 and the power is in the range of 0.25 to 0.75.

17. A database storage method according to claim 16, wherein the constant of proportionality is 31.623 and the power is 0.5.

18. A database storage method comprising the following steps:

selecting a first field of a database, the database containing a plurality of records;

reading a first plurality of data values from the first field, one data value from the first plurality being read from each record;

selecting a second field of the database;

reading a second plurality of data values from the second field, one data value from the second plurality being read from each record;

identifying a plurality of data value combinations, each of which comprises one data value from the first plurality and one data value from the second plurality occurring together in the same record;

calculating first and second field characteristics, respectively for the first and second fields, which are an estimated mean of the number of records per slot for each field and an estimated standard deviation of the number of records per slot for each field, where the estimated mean is equal to a sample mean multiplied by a sample interval and the estimated standard deviation is equal to a sample standard deviation multiplied by the square root of the sample interval;

calculating a threshold equal to a constant of proportionality multiplied by the number of records in the database raised to a power of less than one;

comparing the field characteristics to the threshold, to determine if the field characteristics satisfy the criteria that the estimated mean is greater than one half of the threshold, the estimated mean plus the estimated standard deviation is greater than the threshold and the estimated mean is greater than the estimated standard deviation;

applying a multiple-field compaction method whereby each data value combination is represented with a corresponding numeric equivalent only if the field characteristics satisfy the criteria, the compaction method creating a plurality of compacted data values, the compacted data values being reduced storage equivalents of the data values based on the numeric equivalents of the corresponding data value combinations; and storing the compacted data values in a plurality of compacted records, such that each compacted record contains one compacted data value.

19. A database storage method according to claim 18, wherein the constant of proportionality is in the range of 0.001 to 0.01 and the power is in the range of 0.5 to 0.99.

20. A database storage method according to claim 19, wherein the constant of proportionality is 0.0056 and the power is 0.75.

21. A database storage method comprising the following steps:

selecting a field of a database, the database containing a plurality of records;

reading a plurality of data values from the field, one data value being read from each record;

identifying a pattern, the pattern being a character which occurs repeatedly at a specific character position of the data values;

identifying those data values which contain the pattern;

calculating first and second field characteristics, which are a per character percentage and a pattern determination percentage, respectively;

setting a first threshold equal to a first constant and a second threshold equal to a second constant;

comparing first and second field characteristics to the first and second thresholds respectively, to determine if the field characteristics satisfy the criteria that the per character percentage is greater than the first threshold and that the pattern determination percentage is greater than the second threshold;

applying a pattern suppression compaction method only if the field characteristic satisfies the criterion, the compaction method creating a plurality of compacted data values with the pattern deleted from those data values which contain the pattern, the compacted data values being reduced storage equivalents of the data values;

associating one of a plurality of storage method designations with each of the compacted data values, such that the designations indicate whether the pattern was deleted from the associated compacted data value; and storing the compacted data values in a plurality of compacted records, such that each compacted record contains one compacted data value.

22. A database storage method according to claim 21, wherein:

the maximum number of characters used in calculating the pattern determination percentage is in the range of 3 to 5 characters;

the first constant is in the range of 5% to 20%; and the second constant is in the range of 40% to 60%.

23. A database storage method according to claim 22, wherein the maximum number of character used in calculating the pattern determination percentage is 4, the first constant is 10% and the second constant is 50%.

24. A database storage method comprising the following steps:

selecting a field of a database, the database containing a plurality of records;

reading a plurality of data values from the field, one data value being read from each record;

calculating a field characteristic, which is the percentage of records which are numeric;

setting a threshold equal to a constant;

comparing the field characteristic to the threshold, to determine if the field characteristic satisfies the criterion that the percentage of records which are numeric is greater than the threshold;

performing the following numeric substitution steps if the field characteristic satisfies the criterion:

(1) computing a binary equivalent of each data value which is numeric;

(2) creating a plurality of compacted data values by replacing the data values that are numeric with the binary equivalent of the data values, the compacted data values being reduced storage equivalents of the data values; and (3) storing the compacted data values in a plurality of compacted records, such that each compacted record contains one compacted data value.

25. A database storage method according to claim 24, wherein the threshold is in the range of 75% to 100%.

26. A database storage method according to claim 25, wherein the threshold is 90%.

27. A database storage method comprising the following steps:

selecting a field of a database, the database containing a plurality of records;

reading a plurality of data values from the field, one data value being read from each record;

identifying a plurality of text portions of the data values, the text portions selected from the group consisting of a delimiter, word or a phrase;

calculating a field characteristic, which is the number of different words;

calculating a threshold equal to a constant of proportionality multiplied by the number of delimiters in the field raised to a power less than one;

comparing the field characteristic to the threshold, to determine if the field characteristic satisfies the criterion that the number of different words is less than the threshold;

applying a compaction method to the data values only if the field characteristic satisfies the criterion, the compaction method comprising the following steps:

(1) assigning a numeric equivalent to each text portion;

(2) creating a plurality of compacted data values based on the numeric equivalents of the corresponding text portions, the compacted data values being reduced storage equivalents of the data values; and (3) storing the compacted data values in a plurality of compacted records, such that each compacted record contains one compacted data value.

28. A database storage method according to claim 27, wherein the constant of proportionality is in the range of 10 to 100 and the power is in the range of 0.25 to 0.75.

29. A database storage method according to claim 28, wherein the constant of proportionality is 63.246 and the power is 0.5.

30. A database storage method, which comprises:

reading a plurality of records from a database;

applying a plurality of compaction methods to the records to create a corresponding plurality of compacted records, each of the compacted records having a record length equal to the number of bits in the compacted record;

creating a plurality of storage partitions, each storage partition designated for storing compacted records of identical record length; and storing the compacted records in the partitions to create a database image, such that each of the compacted records is stored in one and only one of the partitions and the record lengths of each of the compacted records in a specific one of the partitions are identical.

31. A database storage method according to claim 30, wherein the record length of each compacted record is an integral number of 8-bit bytes.

32. A database storage method according to claim 30, wherein the record length of each compacted record is an integral number of nibbles, where a nibble is in the range of 2 to 7 bits.

33. A database storage method according to claim 30, comprising the additional step of:

creating a plurality of subpartitions comprising the compacted records, all of the compacted records associated with a particular one of the subpartitions having an identical record type designation specifying a plurality of field-dependent pack methods.

34. A database storage method according to claim 33, comprising the additional step of:

building a record information table equating the record type designation to one of the subpartitions.

35. A compaction method, which comprises:

selecting a first group of fields from a database;

reading a first group of data values from a record of the database, each individual data value being read from a separate field from within the first group of fields to form a first data value combination;

assigning a numeric equivalent to the first data value combination, such that the numeric equivalent uniquely determines the first data value combination;

replacing the first data value combination with a representation of the numeric equivalent to create a compacted data value only if a field combining criterion based on the first group of fields, and dependent on a concentration level of unique data value combinations, is satisfied, the compacted data value being a reduced storage equivalent of the first data value combination; and creating a translation table which contains an entry that equates the data value combination with the assigned numeric equivalent, to provide for retranslation from the numeric equivalent to the data value combination.

36. A compaction method according to claim 35 further comprising the following steps:

selecting a second group of fields from the database;

reading a second group of data values from a record of the database to form a second data value combination, each individual data value being read from a separate field from the second group of fields;

determining a first figure-of-merit based on the concentration of unique data value combinations occurring in the first group of fields;

determining a second figure-of-merit based on the concentration of unique data value combinations occurring in the second group of fields;

replacing the first data value combination with a representation of the numeric equivalent to create a compacted data value only if the first figure-of-merit is greater than the second figure-of-merit.

37. A compaction method according to claim 35 wherein said first group of fields comprises two separate fields of the database.

38. A compaction method according to claim 35 wherein said first group of fields comprises three separate fields of the database.

39. A compaction method according to claim 35 wherein said first group of fields comprises a first field and a second field, said first field being an uncompacted field from said database and said second field being a previously combined field representing two uncompacted fields from said database.

40. A compaction method, which comprises:

selecting one of a plurality of fields of a database;

reading a plurality of data values from the selected field;

identifying a single-position pattern, the single-position pattern being a character which occurs repeatedly within the selected field at a specific character position of the data values;

creating a plurality of compacted data values from the data values by deleting the single-position pattern from each of the data values within which the single-position pattern occurs;

storing a particular one of the compacted data values in the selected field of a compacted record; and associating with the compacted record a designation, the designation indicating a pack method for each of the fields within the compacted record including that the selected field of the compacted record contains the particular compacted data value with the single-position pattern deleted.

41. A compaction method according to claim 40 wherein the designation is a type byte appended to the compacted record and specifying a subpartition, the compacted record being stored in the subpartition, the subpartition being associated with the pack method.

42. A compaction method, which comprises:

selecting one of a plurality of fields of a database;

reading a plurality of data values from the selected field;

identifying a multiple-position pattern, the multiple-position pattern being a plurality of characters and a plurality of character positions in one-to-one correspondence with the characters, such that all of the characters occur together at the corresponding character positions within more than one of the data values within the selected field;

creating a plurality of compacted data values from the data values by deleting the multiple-position pattern from each of the data values within which the multiple-position pattern occurs;

storing a particular one of the compacted data values in the selected field of a compacted record; and associating with the compacted record a designation, the designation indicating a pack method for each of the fields within the compacted record including that the selected field of the compacted record contains the particular compacted data value with the multiple-position pattern deleted.

43. A compaction method according to claim 42 wherein the designation is a type byte appended to the compacted record and specifying a subpartition, the compacted record being stored in the subpartition, the subpartition being associated with the pack method.

44. A method of compacting data values within a database comprising the following steps:

selecting one of a plurality of fields of a database;

reading a plurality of data values from the selected field;

identifying a numeric pattern having at least two characters which occur repeatedly within the selected field at a plurality of specific character positions of the data values;

creating a plurality of compacted data values from the data values by deleting the numeric pattern from each of the data values within which the numeric pattern occurs, converting the numeric pattern into a binary equivalent, and appending the binary equivalent to the data values within which the numeric pattern occurs;

storing a particular one of the compacted data values in the selected field of a compacted record; and associating with the compacted record a designation, the designation indicating a pack method for each of the fields within the compacted record including that the selected field of the compacted record contains the particular compacted data value with the numeric pattern deleted and the binary equivalent appended.

45. A database encoding method, which comprises:

selecting a field of a database;

identifying a plurality of data items within the field selected from a group consisting of a data value, a data value combination, a word or a phrase;

listing the different data items;

sorting the list by frequency of occurrence of the data items within the field to provide a rank for each data item;

associating a unique number with each listed data item to create a translation table, each unique number corresponding to the rank of the listed data item, where the smallest unique number corresponds to the most frequently occurring data item and the largest unique number corresponds to the least frequently occurring data item, the associated unique number being a numeric equivalent of the data item;

specifying a code length having a fixed number of bits L;

determining a first threshold as a function of the code length, said first threshold representing the maximum allowable numeric equivalents within the translation table;

determining a second threshold representing an acceptable number of occurrences of individual data item entries within a range of the numeric equivalents wherein said range is a function of L;

comparing the amount of numeric equivalents to the first threshold and the total number of individual data item entries within the range to the second threshold;

encoding all the numeric equivalents with a single-length code of length L if the comparison step indicates that the first threshold is not exceeded;

encoding the numeric equivalents with a combination code if the comparison step indicates that the first threshold is exceeded and the second threshold is exceeded, where the combination code is of length L for the numeric equivalents less than or equal to the maximum value of the range, and of length n*L for all other numeric equivalents, where n is the smallest positive integer necessary to represent a particular numeric equivalent as a binary number;

encoding all the numeric equivalents with a variable-length code if the comparison step indicates that first threshold is exceeded and the second threshold is not exceeded, where the variable length code is of length n*L; and creating a plurality of compacted data values by replacing the data items with the encoded numeric equivalents.

46. A database encoding method according to claim 45, wherein L equals 8 and the single-length code comprises each numeric equivalent modulo 256.

47. A database encoding method according to claim 45, wherein L equals 8 and the combination code comprises:

a one byte binary number equal to the each numeric equivalent less than 256;

a one byte binary number for each numeric equivalent in the range of 256 to 511 which is equal to the numeric equivalent minus 256; and a binary number equal to each numeric equivalent greater than 512 which uses the smallest necessary integral-number of bytes and is equal to the numeric equivalent minus 512.

48. A database encoding method according to claim 45 wherein L is equal to 8 bits, the first threshold is approximately between 960 to 990, the range of the numeric equivalents contains those having a rank of 256 to 511, and the second threshold is approximately between 0.25 to 0.35 times the total number of database records.

49. A database structure comprising:

a plurality of compacted data values;

a plurality of compacted records each having a record length and comprising a plurality of fields, the fields containing the compacted data values;

a plurality of subpartitions comprising the compacted records, all of the compacted records associated with a particular one of the subpartitions having an identical record type designation specifying a plurality of pack methods dependent on the fields;

a plurality of storage partitions comprising the subpartitions, all of the compacted records associated with a particular one of the partitions such that the compacted records of each partition are of identical record length;

a database image comprising the partitions; and a record information table equating the subpartitions to the record type designations.

50. A database structure according to claim 41, which further comprises a translation table containing a plurality of entries, each entry associating a specific compacted data value to an equivalent uncompacted data value.

51. A database structure according to claim 41, further comprising an index, for efficiently searching the database image.

52. A database structure according to claim 41, further comprising a plurality of indices for efficiently searching the database image, such that a single index that results in the least number of records to be searched can be chosen from the plurality of indices.

53. A database structure according to claim 49, further comprising:

a mass storage medium capable of being accessed by a computer system, the database image and record information table being stored on the mass storage medium.

54. A database structure according to claim 53, wherein the mass storage medium is a CD-ROM.

55. A database system, which comprises:

a computer system, comprising a random access memory, a mass storage memory, an input device, an output device, a processor and a bus for coupling the random access memory, the mass storage memory, the input device, the output device and the processor;

an operating system, executable by the processor, for controlling the functions of the computer system;

a database structure, comprising a database image residing in the mass storage memory and a translation table and a record information table residing in the random access memory, the database image comprising a plurality of partitions, the partitions comprising a plurality of subpartitions, the subpartitions comprising a plurality of compacted records, the compacted records comprising a plurality of fields, the fields comprising a plurality of compacted data values, the record information table equating the partitions and subpartitions to a plurality of record type designations, such that a particular one of the partitions comprises a subset of the compacted records all having an identical length and a particular one of the subpartitions comprises a subset of the compacted records all having a particular one of the record type designations, the particular record type designation specifying a plurality of pack methods dependent on the fields;

an access subsystem, executable by the processor, for performing a user request entered on the input device, which comprises reading a subset of the compacted records from the database image, reading the compacted data values from these compacted records, translating the compacted data values into the uncompacted data values and outputting the uncompacted data values to the output device.

56. A database system according to claim 55, which further comprises a build subsystem, executable by the processor, for creating the database image, the record information table and the translation table from a database, the database comprising a plurality of records, each of the records containing the uncompacted data values.

57. A database system according to claim 56, wherein the build subsystem includes a build preprocessor for inputting data into the database.

58. A database system according to claim 55, further comprising:

a remote device, comprising a second random access memory, a non-volatile memory, a second input device, a second output device, a second processor and a second bus for coupling the second random access memory, the non-volatile memory, the second input device, the second output device and the second processor, for accessing data in the database image at a location separate from that of the computer system;

a copy of the record information table and translation table, stored in the non-volatile memory; and a communications channel connecting the remote device to the computer system.

59. A database system according to claim 58, wherein a partial copy of the database image is stored in the nonvolatile memory.

60. A database system according to claim 55, further comprising:

a database management system; and an uncompacted database accessible by the database management system, such that deletes, inserts and updates are performed both by the access subsystem on the database image and by the database management system on the uncompacted database, a subset of database access requests are processed only by the access subsystem on the database image and database access requests which are not in the subset are processed only by the database management system on the uncompacted database.

61. A database system according to claim 55, wherein the access subsystem further comprises:

a statistical analysis subprocess for reading the table to derive information about relationships between the uncompacted data values; and a reporting subprocess for creating a report based on the information derived by the statistical analysis subprocess and transmitting the report to the output device.

62. A database access method, comprising:

providing a user access request to a computer system comprising a mass storage memory, a random access memory, a database image stored in the mass storage memory, and a record information table and a translation table stored in the random access memory, the database image comprising a plurality of partitions, the partitions comprising a plurality of subpartitions, the subpartitions comprising a plurality of compacted records, the compacted records comprising a plurality of fields, the fields comprising a plurality of compacted data values, the record information table equating the partitions and subpartitions to a plurality of record type designations, such that a particular one of the partitions comprises a subset of the compacted records all having an identical length and a particular one of the subpartitions comprises a subset of the compacted records all having a particular one of the record type designations specifying a plurality of pack methods dependent on the fields;

identifying from the user access request a requested one of the fields and a requested one of the compacted data values;

searching the database image for a requested one of the compacted records, such that the contents of the requested field corresponds to the requested compacted data value; and reading the requested compacted record from the database image.

63. A database access method according to claim 62, further comprising:

preparing a report which specifies the frequency of occurrence of the data values within the field, based on the translation table; and outputting the report to the user.

64. A database access method according to claim 62, wherein the providing step comprises the steps of:

inputting a user request to a remote device, the remote device comprising a non-volatile memory in which are stored a second translation table identical to the translation table and a second record information table identical to the record information table, the remote device being in a location separate from the computer system and connected to the computer system with a communications channel;

interpreting the user access request, using the remote device, to determine the requested field and a requested data value within the requested field;

determining a compaction method which was applied to the requested field during the build of the database image;

reading a requested compacted data value from the second translation table corresponding to the requested data value; and transmitting a message to the computer system via the communications channel, the message identifying the requested field and the requested compacted data value.

65. A database access method according to claim 64, wherein the identifying step comprises:

receiving the message from the remote device over the communications channel to the computer system; and determining from the message the requested field and the requested compacted data value.

66. A database access method according to claim 64 wherein the transmitting step comprises:

creating a storage format identifier from the second record information table based on the requested field and the compaction method applied to the requested data value to create the requested compacted data value;

creating a field identifier based on the requested field; and sending the message from the remote device to the computer system over the communications channel, the message comprising the requested compacted data value, the storage format identifier and the field identifier.

67. A database access method according to claim 66, wherein the storage format identifier is a type byte and a partition number, such that the type byte describes a subpartition which contains the requested compacted data value and the partition number describes a partition of the database image which contains the subpartition.

68. A database access method according to claim 66, wherein the field identifier is a field identification bit map comprising a plurality of bits which are in one-to-one correspondence with a plurality of fields of the database image, a specific bit corresponding to the requested field being turned-on to indicate that the requested field is transmitted.

69. A method of accessing a database comprising the following steps:

specifying a compacted data record to be retrieved from a database; retrieving the compacted data record from within a partition and a subpartition of the database;

determining a partition number associated with the partition and a subpartition number associated with the subpartition;

specifying a field of the compacted data record;

reading a compacted data value from the field;

determining a field number associated with the field;

locating a pack method in a record information table, the pack method dependent upon the partition number, the subpartition number and the field number; and creating a data value from the pack method and the compacted data value, the data value associated with the specified compacted data record.

70. A database access method according to claim 69 wherein the pack method specifies a storage number; and the creating step comprises the following steps:

locating a code in a storage definition table, the code equated to the storage number;

calculating a numeric equivalent associated with the compacted data value and the code; and locating a data value in a translation table, the data value equated to the numeric equivalent.

71. A database access method according to claim 69 wherein the pack method specifies a pattern number; and the creating step comprises the following steps:

locating a position number and a position value in a pattern definition table, the position number and the position value equated with the pattern number;

forming a new character position at a location in the compacted data value consistent with the position number; and inserting the position value at the new character position.

72. A database access method according to claim 69 wherein the pack method specifies a storage number; and the creating step comprises the following steps:

locating a code in a storage definition table, the code equated to the storage number;

calculating a numeric equivalent associated with the compacted data value and the code;

locating a field number combination in a field combination table, the field number combination comprising the field number and a second field number; and locating a data value combination in a multiple-field translation table, the data value combination equated to the numeric equivalent and comprising the data value.

73. A database access method according to claim 69 wherein the pack method specifies a storage number; and the creating step comprises the following steps:

locating a status value in a text table, the status value equated to the field number and indicating that the associated field is text;

locating a code in a storage definition table, the code equated to the storage number;

calculating a numeric equivalent associated with the compacted data value and the code; and locating a data value in a text translation table, the data value equated to the numeric equivalent.

74. A database access method according to claim 69 wherein the pack method specifies a storage number; and the creating step comprises the following steps:

locating a first status value in a mostly numeric table, the first status value equated to the field number and indicating that the associated field is mostly numeric;

locating a second status value in a storage definition table, the second status value equated to the storage number; and converting the compacted data value to character values if the second status value indicates that the compacted data value is numeric.

75. A method of compacting a database containing data values stored in a plurality of records wherein each record contains a plurality of fields, said method comprising the following steps:

selecting a field of the database from the plurality of fields, the field containing a plurality of data values corresponding to the plurality of records of the database;

analyzing the data values within the field to determine a first compaction characteristic for the field;

analyzing the data values within the field to determine a second compaction characteristic for the field, wherein one said first and second compaction characteristics is based at least in part on the number of times a type of data occurs in the field;

applying a first compaction method to the field when the first compaction characteristic satisfies a first criterion;

applying a second compaction method to the field when the second compaction characteristic satisfies a second criterion; and storing a set of compacted data values within a group of storage partitions, the set of compacted data values representing the data values which have been compacted according to the first and second compaction methods.

76. The method of compacting a database according to claim 75 wherein the first compaction method is numeric substitution and the second compaction method is pattern suppression.

77. The method of compacting a database according to claim 75 further comprising the following steps:

selecting a second field of the database from the plurality of fields, the second field containing a second plurality of data values corresponding to the plurality of records of the database;

analyzing the second plurality of data values within the second field to determine a third compaction characteristic for the second field;

applying a third compaction method to the second field when the third compaction characteristic for the second field satisfies a third criterion;

storing a second set of compacted data values within the group of storage partitions, the second set of compacted data values representing the second plurality of data values which have been compacted according to the third compaction method.

78. A method of compacting a database containing data values stored in a plurality of records wherein each record contains a plurality of fields, said method comprising the following steps:

selecting a first field of the database from the plurality of fields, the first field containing a first plurality of data values corresponding to the plurality of records of the database;

applying a first compaction method to the first plurality of data values within the first field to create a first set of compacted records;

selecting a second field of the database from the plurality of fields, the second field containing a second plurality of data values corresponding to the plurality of records of the database;

applying a second compaction method to the second plurality of data values within the second field to create a second set of compacted records, the second compaction method different than the first compaction method, wherein at least one of said compaction methods is selected based at least in part on the number of times a type of data occurs in the corresponding field; and storing the first and second set of compacted records to form a compacted database image.

79. The method of compacting a database according to claim 78 wherein:

the step of applying a first compaction method further comprises the following steps:

analyzing the first plurality of data values within the first field to determine a first compaction characteristic for the first field; and applying a first compaction method to the first field when the first compaction characteristic satisfies a first criterion; and the step of applying a second compaction method further comprises the following steps:

analyzing the second plurality of data values within the second field to determine a second compaction characteristic for the second field; and applying a second compaction method to the second field when the second compaction characteristic satisfies a second criterion.

80. The method of compacting a database according to claim 78 wherein the first compaction method is single-field encoding and the second compaction method is numeric substitution.

81. A distributed network for accessing and transmitting a compacted database image between a host computer and a remote device comprising:

a host computer comprising a CPU, a host memory storage device, and a communication link;

a database image residing in the host memory storage device comprising a plurality of compacted records corresponding to a database;

a first record information table and a first translation table stored in the host memory storage device, the first record information table and the first translation table associated with the database image to enable translation of the compacted records into uncompacted records;

a remote computer comprising a CPU and a remote memory storage device, the remote computer communicating with the host computer over the communication link; and a second record information table and a second translation table stored in the remote memory storage device, the second record information table and the second translation table associated with the database image to enable translation of compacted records transmitted over the communication link to the remote computer.

82. The distributed network of claim 81 wherein the second record information table and the second translation table are a subset of the first record information table and the first translation table, the information contained in the second record information table and the second translation table corresponding to a limited set of operations performed by the remote computer.

83. The distributed network of claim 82 wherein each compacted record has a unique translation designation attached thereto, the translation designation corresponding to a particular location of the second record information table, the particular location of the second record information table providing details of compaction methods used to compact a corresponding compacted record.

84. The distributed network of claim 83 wherein the translation designation comprises a storage partition number for the compacted record and a type byte indicating a method of compaction for the compacted record.

85. The distributed network of claim 83 wherein the translation designation for each compacted record transmitted over the communication link has a length which is a fixed number of bytes.

* * * * *

UNITED STATES PATENT AND TRADEMARK OFFICE
CERTIFICATE OF CORRECTION

PATENT NO. : 5,546,575

DATED : August 13, 1996

INVENTOR(S) : Basil E. Potter and Marc A. Potter

It is certified that error appears in the above-indentified patent and that said Letters Patent is hereby corrected as shown below:

```
Column 19, line, 57 change "63,246" to --63.246--.
```

Signed and Sealed this

Seventeenth Day of June, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,546,575
APPLICATION NO. : 08/247691
DATED : August 13, 1996
INVENTOR(S) : Basil E. Potter et al.

Page 1 of 1

It is certified that error appears in the above-identified patent and that said Letters Patent is hereby corrected as shown below:

Column 50, line 51, delete "41" and insert --49--.

Column 50, line 55, delete "41" and insert --49--.

Column 50, line 58, delete "41" and insert --49--.

Signed and Sealed this

Twenty-fifth Day of December, 2007

JON W. DUDAS
*Director of the United States Patent and Trademark Office*